United States Patent
Kurosaki et al.

(10) Patent No.: US 7,962,935 B2
(45) Date of Patent: Jun. 14, 2011

(54) DATA PROCESSING APPARATUS, DATA PROCESSING METHOD AND PROGRAM, AND DATA PROCESSING SYSTEM

(75) Inventors: Daisuke Kurosaki, Chiba (JP); Yasuo Nomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 902 days.

(21) Appl. No.: 10/527,822

(22) PCT Filed: Sep. 30, 2003

(86) PCT No.: PCT/JP03/12459
§ 371 (c)(1),
(2), (4) Date: Mar. 15, 2005

(87) PCT Pub. No.: WO2004/032491
PCT Pub. Date: Apr. 15, 2004

(65) Prior Publication Data
US 2006/0010470 A1    Jan. 12, 2006

(30) Foreign Application Priority Data
Oct. 1, 2002  (JP) ................................ 2002-288623

(51) Int. Cl.
H04N 5/445    (2006.01)
(52) U.S. Cl. ................. 725/40; 725/39; 725/46
(58) Field of Classification Search ............... 725/9–25, 725/39, 46
See application file for complete search history.

(56) References Cited

U.S. PATENT DOCUMENTS

| | | | | |
|---|---|---|---|---|
| 5,671,411 A * | 9/1997 | Watts et al. | | 725/43 |
| 5,798,785 A * | 8/1998 | Hendricks et al. | | 725/46 |
| 5,801,747 A * | 9/1998 | Bedard | | 725/46 |
| 5,867,226 A * | 2/1999 | Wehmeyer et al. | | 725/46 |
| 6,005,597 A * | 12/1999 | Barrett et al. | | 725/46 |
| 6,029,176 A * | 2/2000 | Cannon | | 707/104.1 |
| 6,177,931 B1 * | 1/2001 | Alexander et al. | | 725/52 |
| 6,532,589 B1 * | 3/2003 | Proehl et al. | | 725/40 |
| 6,637,029 B1 * | 10/2003 | Maissel et al. | | 725/46 |
| 6,660,503 B2 * | 12/2003 | Kierulff | | 435/101 |
| 6,704,931 B1 * | 3/2004 | Schaffer et al. | | 725/46 |
| 6,708,335 B1 * | 3/2004 | Ozer et al. | | 725/20 |
| 6,774,926 B1 * | 8/2004 | Ellis et al. | | 348/14.01 |
| 6,822,661 B2 * | 11/2004 | Sai et al. | | 715/716 |
| 6,898,762 B2 * | 5/2005 | Ellis et al. | | 715/716 |
| 7,047,550 B1 * | 5/2006 | Yasukawa et al. | | 725/44 |
| 7,062,777 B2 * | 6/2006 | Alba et al. | | 725/39 |

(Continued)

FOREIGN PATENT DOCUMENTS

EP    1 107 586 A2    6/2001

(Continued)

Primary Examiner — Son P Huynh
(74) Attorney, Agent, or Firm — Oblon, Spivak, McClelland, Maier & Neustadt, L.L.P.

(57) ABSTRACT

The present invention relates to a data processing apparatus, a data processing method and a program, and a data processing system which are configured to provide an EPG as a user interface that further facilitates decision on whether to view or record a program. By aggregating information uploaded from a user side, statistical data, such as the number of persons who viewed a program during its broadcast time, an audience rating of a program during its broadcast time, or a good impression level representing how the user feels about a program, are calculated, whereby an EPG page is automatically generated in which the statistical data and program guide data that gives guidance on programs are superimposed. The present invention is applicable to, e.g., a broadcasting system that broadcast television broadcasting programs.

30 Claims, 52 Drawing Sheets

U.S. PATENT DOCUMENTS

| | | | |
|---|---|---|---|
| 7,076,202 B1* | 7/2006 | Billmaier | 455/3.04 |
| 7,100,184 B1* | 8/2006 | Kahn | 725/39 |
| 7,185,355 B1* | 2/2007 | Ellis et al. | 725/46 |
| 7,188,356 B1* | 3/2007 | Miura et al. | 725/46 |
| 7,293,275 B1* | 11/2007 | Krieger et al. | 725/40 |
| 7,571,452 B2* | 8/2009 | Gutta | 725/46 |
| 7,631,331 B2* | 12/2009 | Sie et al. | 725/46 |
| 7,735,102 B1* | 6/2010 | Billmaier et al. | 725/37 |
| 7,784,081 B2* | 8/2010 | Hassell et al. | 725/133 |
| 2001/0023401 A1 | 9/2001 | Weishut et al. | |
| 2002/0055087 A1* | 5/2002 | Hardesty | 434/127 |
| 2002/0066099 A1* | 5/2002 | Ohno | 725/39 |
| 2002/0083448 A1* | 6/2002 | Johnson | 725/39 |
| 2002/0112239 A1* | 8/2002 | Goldman | 725/46 |
| 2002/0174433 A1* | 11/2002 | Baumgartner et al. | 725/58 |
| 2003/0018977 A1* | 1/2003 | McKenna | 725/115 |
| 2003/0020744 A1* | 1/2003 | Ellis et al. | 345/723 |
| 2003/0066085 A1* | 4/2003 | Boyer et al. | 725/104 |
| 2003/0149988 A1* | 8/2003 | Ellis et al. | 725/87 |
| 2003/0154484 A1* | 8/2003 | Plourde et al. | 725/58 |
| 2004/0025178 A1* | 2/2004 | Gordon et al. | 725/37 |
| 2004/0034867 A1* | 2/2004 | Rashkovskiy et al. | 725/40 |
| 2004/0117831 A1* | 6/2004 | Ellis et al. | 725/53 |
| 2004/0218905 A1* | 11/2004 | Green et al. | 386/83 |
| 2005/0002649 A1* | 1/2005 | Boyle et al. | 386/83 |
| 2005/0149964 A1* | 7/2005 | Thomas et al. | 725/9 |
| 2005/0204387 A1* | 9/2005 | Knudson et al. | 725/52 |
| 2005/0204388 A1* | 9/2005 | Knudson et al. | 725/58 |
| 2007/0277201 A1* | 11/2007 | Wong et al. | 725/40 |
| 2009/0019485 A1* | 1/2009 | Ellis et al. | 725/40 |

FOREIGN PATENT DOCUMENTS

| | | |
|---|---|---|
| EP | 1 107 586 A3 | 6/2001 |
| JP | 11-25541 | 1/1999 |
| JP | 2000-50180 | 2/2000 |
| JP | 2000-92406 | 3/2000 |
| JP | 2000-270276 | 9/2000 |
| JP | 2002-10153 | 1/2002 |
| JP | 2002-135809 | 5/2002 |
| JP | 2002-209153 | 7/2002 |
| JP | 2002-218332 | 8/2002 |
| JP | 2002-230039 | 8/2002 |
| JP | 2003-92773 | 3/2003 |
| WO | WO 01/35663 A1 | 5/2001 |
| WO | WO 01/67752 A2 | 9/2001 |
| WO | WO 01/67752 A3 | 9/2001 |

* cited by examiner

42 WEB BROWSER

EPG PAGE (FOR A DAY)

```
Content-type : application/x-tv-program-info : charset=shift_jis
version : 1
command : Command=reserve this program
station : DAI-NIPPON TELEVISION
year : 1999
month : 04
date : 06
start : 21:00
end : 22:00
program-title : TUESDAY SUSPENSE QUIZ
program-subtitle : WHO'S GUILTY?
```

COMMAND FILE

FIG. 37

```
11, 0, 0, 11, MHK GENERAL,MHK GENERAL,MHK
13, 0, 0, 13, MHK EDUCATION,MHK EDUCATION,MHK2
14, 0, 0, 14, DAI-NIPPON TEREBI, DAI-NIPPON TEREBI,DAI-NITTERE,
              DAI-NIPPON TELEVISION BROADCASTING NETWORK,
              DTV
15, 0, 0, 15, SCOPE, SCOPE
16, 0, 0, 16, YOKOHAMA BROADCASTING,YOKOHAMA BROADCASTING,YBS TEREBI,YBS
              BROADCASTING,YBS TEREBI,YBS
18, 0, 0, 18, F TEREBI,F TEREBI,F TELEVISION,F TELEVISION
```

CHANNEL CONVERSION FILE

FIG. 38

```
NEW SCHEDULE··· CHANNEL AND START DATE/TIME SETTING
CHANNEL AND START DATE/TIME FOR SCHEDULED RECORDING
WILL BE SET

CHANNEL     [14ch DAI-NIPPON TELEVISION ▼]

START       [DATE APRIL 6, 1999  ▼]

START TIME  [ 21 ▼]  [ 00 ▼]

[ CANCEL ]   [ NEXT ]   [ HELP ]
```

FIG. 40

NEW SCHEDULE···CONFIRM SETTINGS

SCHEDULED RECORDING WILL BE MADE UNDER FOLLOWING SETTINGS. OK?

START TIME : APRIL 6, 1999  21:00
END TIME : APRIL 6, 1999  22:00
CHANNEL : CHANNEL 14ch DAI-NIPPON TELEVISION
RECORDING MODE : STANDARD
PERIODIC SCHEDULE : 1 TIME
VALID TIME LIMIT OF CONTENT : NONE
CONTENT NAME : TUESDAY SUSPENSE QUIZ
LIBRARY TO SAVE TO : TEMPORARY STORAGE
MEMO :

[CANCEL]  [BACK]  [FINISH]  [HELP]

FIG. 47

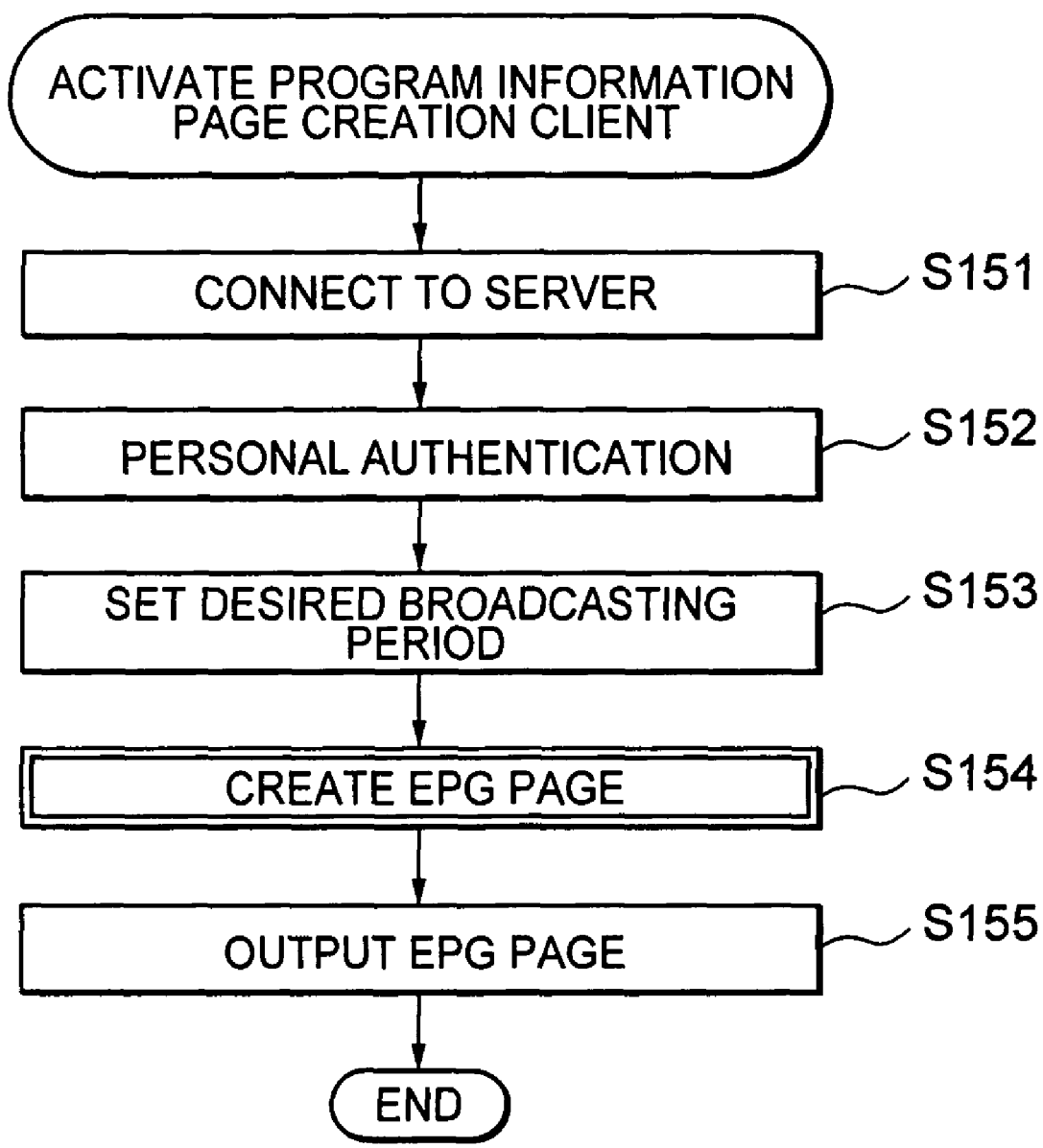

DATA PROCESSING APPARATUS, DATA PROCESSING METHOD AND PROGRAM, AND DATA PROCESSING SYSTEM

TECHNICAL FIELD

The present invention relates to a data processing apparatus, a data processing method, and a program, and a data processing system, and to a data processing apparatus, a data processing method and a program, and a data processing system that allow a user to decide whether to view or record a program only through a glance at an EPG, by displaying, in the EPG, statistical data representing level of user interest in programs together with program guide data that gives guidance on the programs.

BACKGROUND ART

As statistical data representing degree of interest in a program such as a television broadcasting program shown by users (viewers), audience rating is known, for example.

In Japanese Patent Application Publication No. 2001-320743, a feature is disclosed such that an audience rating is fed back in real time for display on one's own television, and that an audience rating as of a playback at a later time using a recording apparatus is also displayed during the playback.

Further, in Japanese Patent Application Publication No. 2002-10153, a feature is disclosed, that predicted audience rating rankings are displayed on a television monitor 7 so as to be used for users to select channels.

Furthermore, in International Publication Pamphlet No. WO98/26608, a feature is disclosed such that, in an Internet-connectable television, a program viewed by a user is determined from a viewing channel and a viewing time, and a program ID of the program is transmitted to an aggregation center, whereas in the aggregation center, an audience rating is obtained from the program ID.

By the way, as the number of television broadcasting channels is so increasing as today, it becomes cumbersome to select a program for viewing by taking a look at a program guide that is a paper medium or an EPG (Electronic Program Guide) that is an electronic medium, on which program guide data, such as program titles and their outlines, for giving guidance on programs are displayed.

Thus, as disclosed in the above-mentioned Japanese Patent Application Publication No. 2002-10153, by displaying the predicted viewing rating rankings on the television monitor 7 so as to be used by users to select channels, the users can easily select programs for viewing, using the predicted audience rating rankings as a barometer for judging their popularity.

However, according to the method disclosed in Japanese Patent Application Publication No. 2002-10153, only the predicted audience rating rankings are displayed, and thus it is difficult to check, e.g., which program broadcast, when on which channel is ranked, where in the predicted audience rating rankings. That is, e.g., of program broadcast on respective channels during the same time, it is hard to make a comparison as to which programs on which channels have a higher reserved audience ratings. Further, it is also difficult to check audience ratings of program to be broadcast on a certain channel, or audience ratings of program to be broadcast during a certain date.

On the other hand, program guide data that gives guidance on (explains) programs to be broadcast on respective channels is displayed by division into broadcast time periods or broadcast times. Therefore, if an EPG can display therein statistical data representing degree of interest in each of the programs shown by users, such as audience ratings of the program, together with program guide data on the program, the user would be allowed to decide whether to view or record the program more easily by merely taking a look at the EPG.

DISCLOSURE OF THE INVENTION

The present invention has been made in view of such circumstances, and makes it possible to provide an EPG that serves as a user interface and further facilitates decision or the like on whether to view or record a program.

A data processing apparatus according to the present invention is characterized by including EPG generating means for generating an EPG in which program guide data and statistical data are superimposed.

A data processing method according to the present invention is characterized by including an EPG generating step of generating an EPG in which program guide data and statistical data are superimposed.

A program according to the present invention is characterized by including an EPG generating step of generating an EPG in which program guide data and statistical data are superimposed.

A data processing system according to the present invention is characterized in that one of a server and a user terminal has EPG generating means for generating an EPG in which program guide data and statistical data are superimposed.

In the data processing apparatus, the data processing method and the program, and the data processing system according to the present invention, an EPG in which program guide data and statistical data are superimposed is generated.

BRIEF DESCRIPTION OF DRAWINGS

FIG. 23 is a diagram showing a screen of the EPG layer.

FIG. 36 is a diagram showing a command file.

FIG. 37 is a diagram showing a channel conversion file.

FIG. 38 is a diagram showing a window displayed when a recording schedule is made.

FIG. 40 is a diagram showing a window displayed when the recording schedule is made.

FIG. 47 is a diagram showing a customized EPG page.

FIG. 52 is a flowchart explaining a process performed by a program information page creation client 301.

BEST MODE FOR CARRYING OUT THE INVENTION

Figure 1:
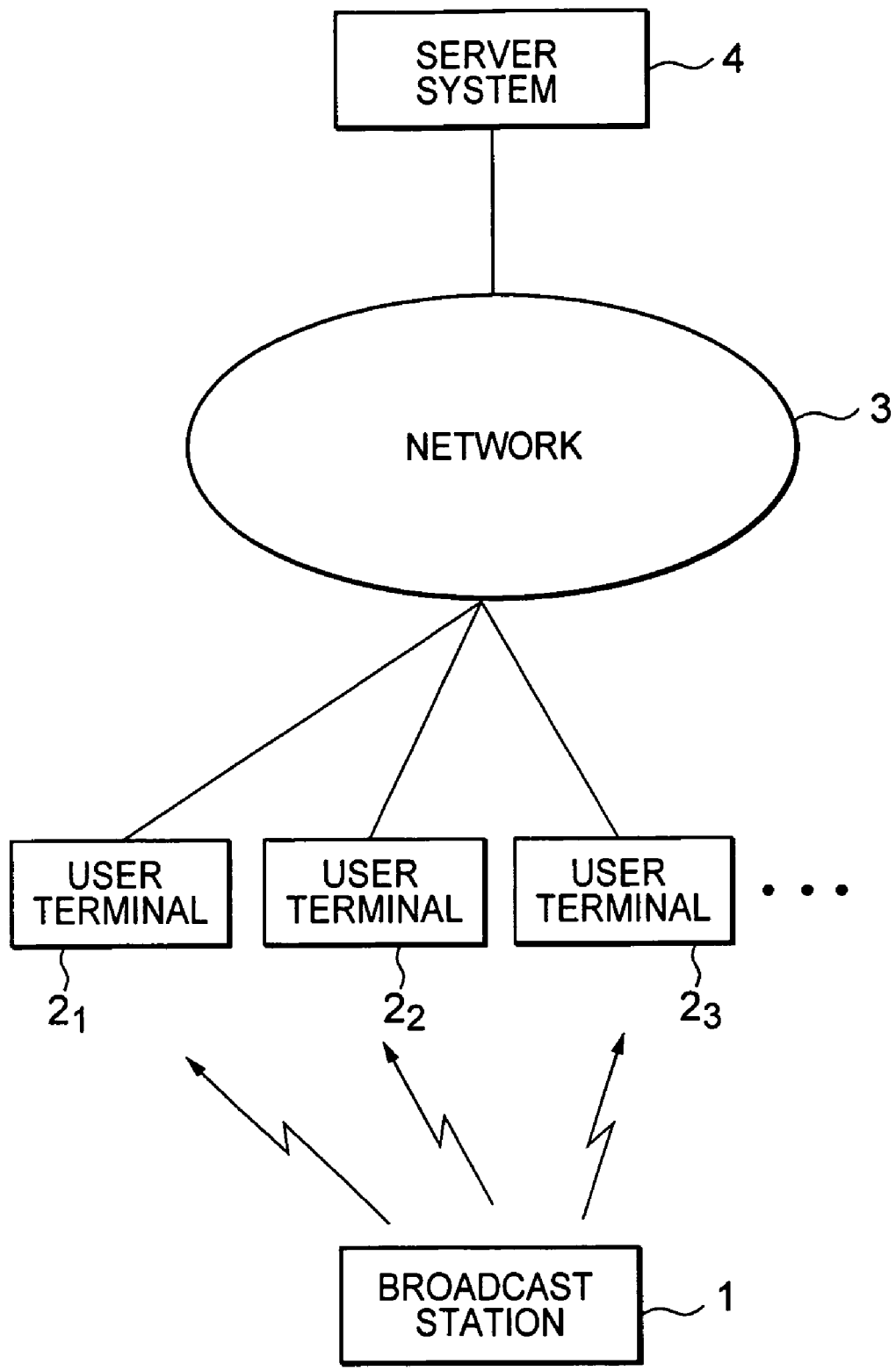
FIG. 1 is a block diagram showing an example configuration of an embodiment of a broadcasting system to which the present invention is applied.

FIG. 1 is a block diagram showing an example configuration of an embodiment of a broadcasting system to which the present invention is applied.

A broadcast station 1 broadcasts, e.g., image data and sound data as television broadcasting programs wirelessly or through wire. It should be noted that although there is shown only one broadcast station 1 in FIG. 1, a plurality of broadcast stations may be provided. Further, the broadcast station 1 may include any broadcast stations that broadcast programs by terrestrial broadcasting, satellite broadcasting, CATV (Cable Television) networks, Internet television broadcasting, and any other means. Furthermore, although the broadcast station 1 performs television broadcasting here, the broadcast station 1 may further perform, e.g., radio broadcasting, various data broadcasting including computer programs and data such as games.

User terminals $2_1$, $2_2$, $2_3$, . . . receive a program broadcast from the broadcast station 1, and display images corresponding to the program and also outputs sound corresponding to the program. As a result, users of the respective user terminals $2_1$, $2_2$, $2_3$, . . . can view the program broadcast from the broadcast station 1.

Here, the user terminals $2_1$, $2_2$, $2_3$, . . . will hereinafter be referred to collectively as "user terminal 2" whenever applicable unless otherwise required to be individually identified.

In addition to the viewing of a program broadcast from the broadcast station 1 as mentioned above, the user terminal 2 may also record the program. Further, the user terminal 2 may view the recorded program by playback.

Furthermore, the user terminal 2 may be connected to a server system 4 via a network 3. The user terminal 2 uploads information, such as actions related to program viewing taken by the user, to the server system 4. Furthermore, the user terminal 2 downloads an EPG or data necessary for generating an EPG from the server system 4, and displays the EPG.

Although the network 3 may include a wired or wireless telephone line, a CATV network, the Internet, and any other networks here, the Internet is herein adopted.

The server system 4 aggregates information transmitted from the user terminal 2, and obtains statistical data representing degree of user interest in individual programs. Further, the server system 4 manages program guide data on programs to be broadcast by the broadcast station 1, and transmits the program guide data and statistical data to the user terminal 2, or generates an EPG in which these program guide data and statistical data are superimposed for transmission to the user terminal 2.

As a result, the user terminal 2 displays the EPG in which the program guide data and the statistical data are superimposed (reflected).

Figure 2:
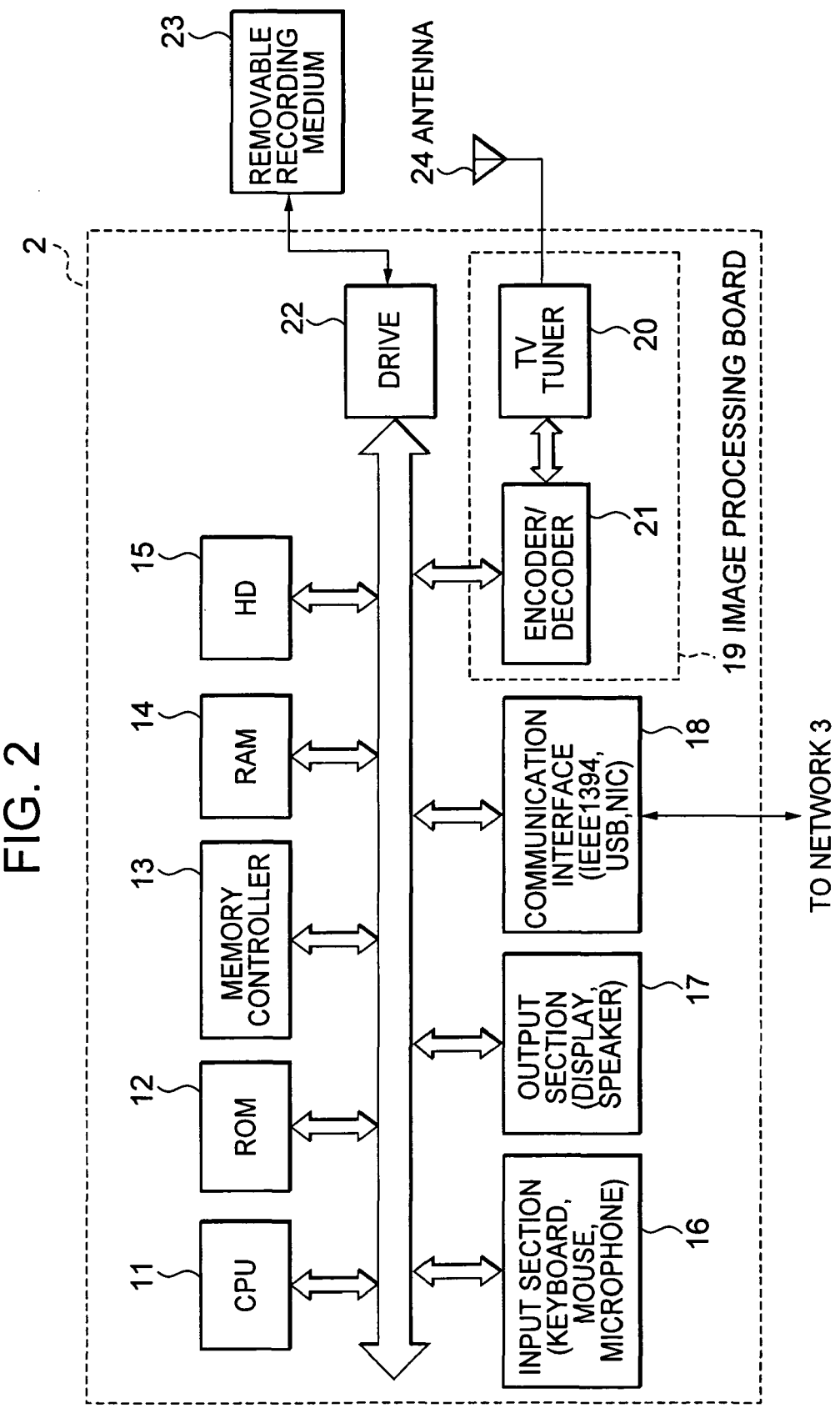
FIG. 2 is a block diagram showing an example hardware configuration of a user terminal 2.

Next, FIG. 2 shows an example hardware configuration of the user terminal 2 of FIG. 1.

In the present embodiment, the user terminal 2 is configured with a computer of a so-called notebook type, desktop type, or the like, which serves as a base.

For example, when a user, e.g., operates an input section 16 to input a command, a CPU (Central Processing Unit) 11 executes programs stored in a ROM (Read Only Memory) 12 in accordance therewith. Alternatively, the CPU 11 loads a program stored in a HD (Hard Disk) 15, a program transferred from a satellite or the network, received by a communication section 18, and installed in the HD 15, or a program read from a removable recording medium 23 attached to a drive 22, such as a flexible disk, a CD-COM (Compact Disc Read Only Memory), a MO (Magneto Optical) disk, a DVD (Digital Versatile Disc), a magnetic disk, or a semiconductor memory, and installed in the HD 15, into a RAM (Random Access Memory) 14, for execution. As a result, the CPU 11 performs processes according to flowcharts to be described later.

The ROM 12 stores programs such as, e.g., an IPL (Initial Program Loading), and a BIOS (Basic Input Output System), and other firmware. It should be noted that a rewritable EEPROM (Electrically Erasable Programmable ROM) may be adopted instead of the ROM 12. In this case, it is possible to accommodate version up of the firmware.

A memory controller 13 may include a DMA (Direct Memory Controller) controller, and controls reading/writing of data from/to the RAM 14. The RAM 14 temporarily stores programs executed by the CPU 11 and data necessary for the CPU 11 to execute processing. The HD 15 stores programs (including application programs, as well as OSs (Operating Systems), and the like) installed in the computer, and data necessary for the CPU 11 to execute processing. Further, the HD 15 also stores data, such as data for output from an image processing board 19 to be described later, onto a bus.

The input section 16 may include, e.g., a keyboard, a mouse, and a microphone, and is, e.g., operated by the user. The input section 16 supplies a signal (including a command by sound) in response to the operation or the like performed by the user, to the CPU 11. An output section 17 may include, e.g., a display and a speaker, and displays or outputs images or sound supplied thereto, respectively. The communication I/F (Interface) 18 may include, e.g., an IEEE (Institute of Electrical and Electronics Engineers) 1394 port, a USB (Universal Serial Bus) port, a NIC (Network Interface Card) for connection to a LAN (Local Area Network) or the like, and performs communication control conforming to their specific standards. Further, the communication I/F 18 has means capable of connecting to the network 3, which is the Internet, through telephone lines such as an analog modem, a TA (Terminal Adapter) and a DSU (Digital Service Unit), an ADSL (Asymmetric Digital User Line) modem, whereby the user terminal 2 can establish a connection to the network 3 from the communication I/F 18.

The image processing board 19 includes a TV (Television) tuner 20 and an encoder/decoder 21. The TV tuner 20 detects, demodulates a signal of a predetermined channel from a signal carrying a program broadcast by the broadcast station 1 or the like supplied from an antenna 24, and supplies image data and sound data as the program resulting from the demodulation, to the encoder/decoder 21. The encoder/decoder 21 outputs the image data and the sound data supplied from the TV tuner 20 directly onto the bus, or encodes them in accordance with a predetermined standard, such as a MPEG (Moving Picture Experts Group) system or a DV (Digital Video) system, and outputs the resulting encoded data onto the bus. Further, the encoder/decoder 21 decodes encoded data supplied via the bus in accordance with a predetermined standard such as the MPEG system or the DV system, and outputs the resulting image data and sound data onto the bus.

The drive 22 allows the removable recording medium 23 to be removably attached thereto, and reads data (including programs) recorded on the removable recording medium 23 for output onto the bus, and further writes (records) data supplied via the bus on the removable recording medium 23.

The antenna 24 receives a signal carrying a program broadcast from the broadcast station 1 (FIG. 1) for supply to the TV tuner 20 of the image processing board 19.

It should be noted that the CPU 11 through the image processing board 19, and the drive 22 are intercommunicated via the bus that is within the computer as the user terminal 2.

In the computer as the user terminal 2 having the above-described configuration, the CPU 11 executes a program installed in the computer, whereby various processes to be described later are performed.

Here, the program executed by the CPU 11 may be recorded beforehand on the HD 15 and the ROM 12 as the recording media built in the computer.

Alternatively, the program may otherwise be stored (recorded) temporarily or permanently on a removable recording medium 23. Such a removable recording medium 23 may be provided as package software.

It should be noted that the program may not only be installed in the computer from such a removable recording medium 23, but also be transferred from a download site to the computer wirelessly via an artificial satellite for digital satellite broadcasting or to the computer by wired communication via a network such as a LAN (Local Area Network) or the Internet, and that the computer may receive the program thus transferred at the communication I/F 18 for installation in the HD 15 built therein.

Here, in the present specification, the processing steps describing the program for causing the computer to perform various processes may not necessarily be processed time-sequentially in an order described as flowcharts to be described later, and thus include processes to be performed parallelly or individually (e.g., parallel processes and object-based processes).

Further, the program may be processed by a single CPU or processed discretely by a plurality of CPUs. Furthermore, the program may be transferred to a remote CPU for execution.

In an embodiment of FIG. 2, in the computer as the user terminal 2, the image processing board 19 built therein has the TV tuner 20, and therefore, the computer may receive a program broadcast from the broadcast station 1 by the TV tuner 20.

It should be noted that the computer as the user terminal 2 may receive a signal carrying a program received by an external TV tuner, which is not shown in the figure, via the communication I/F 18, without having the built in TV tuner 20.

Further, in the embodiment of FIG. 2, the encoder/decoder 21 is constituted by hardware. However, the encoder/decoder 21 may be realized by software as well.

Figure 3:
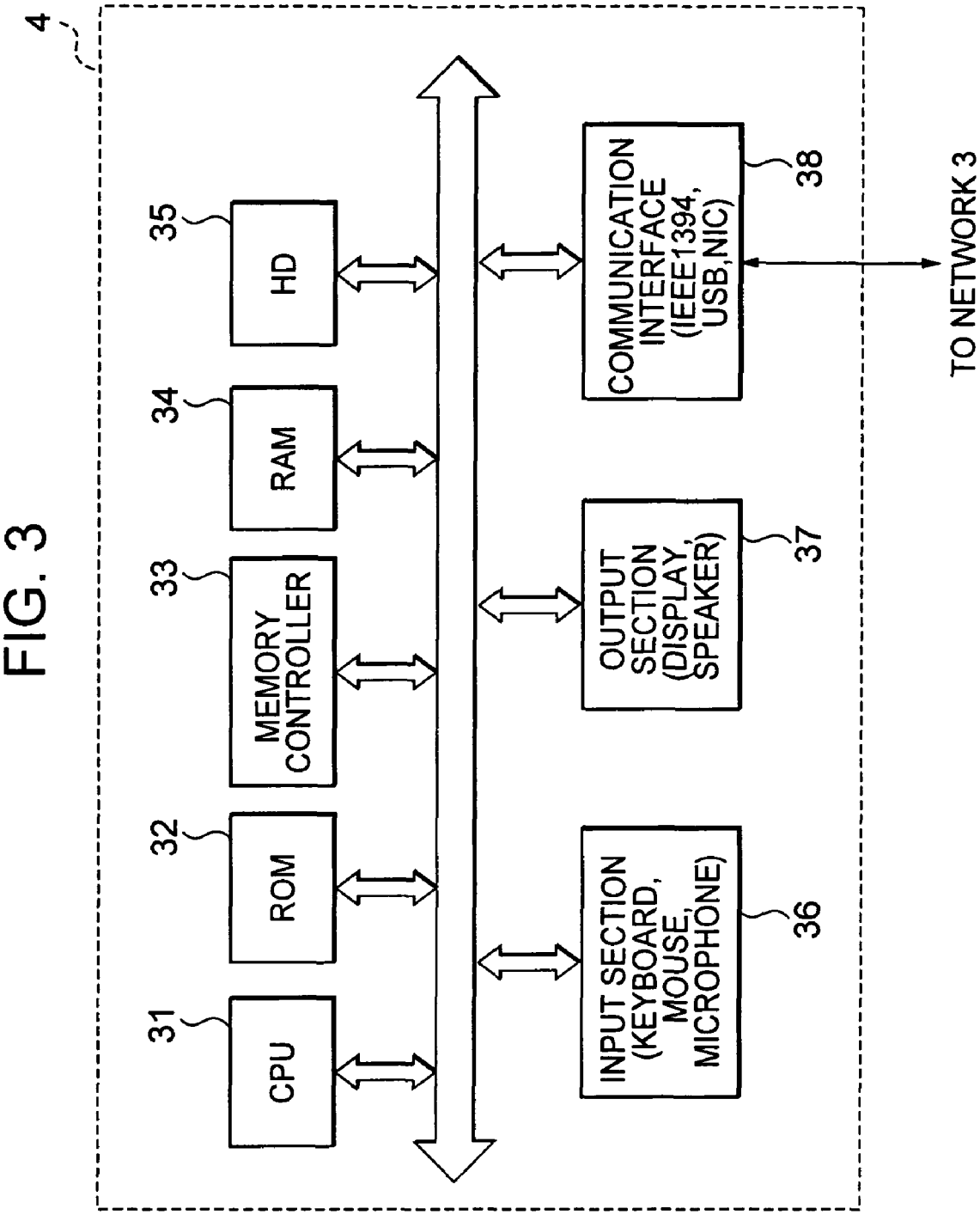
FIG. 3 is a block diagram showing an example hardware configuration of a server system 4.

Next, FIG. 3 shows an example hardware configuration of the server system 4 of FIG. 1.

The server system 4 includes a CPU 31 through a communication I/F 38, similarly to the CPU 11 through the communication I/F 18 of FIG. 2, respectively.

In a computer as the server system 4, the CPU 31 executes programs installed in the computer (e.g., HD 35 thereof), whereby various processes to be described later are performed.

It should be noted that the server system 4 is constituted by a single computer in an embodiment of FIG. 3. However, the server system 4 may be constituted by a plurality of computers to cause the plurality of computers to perform processes to be described later discretely.

Figure 4:
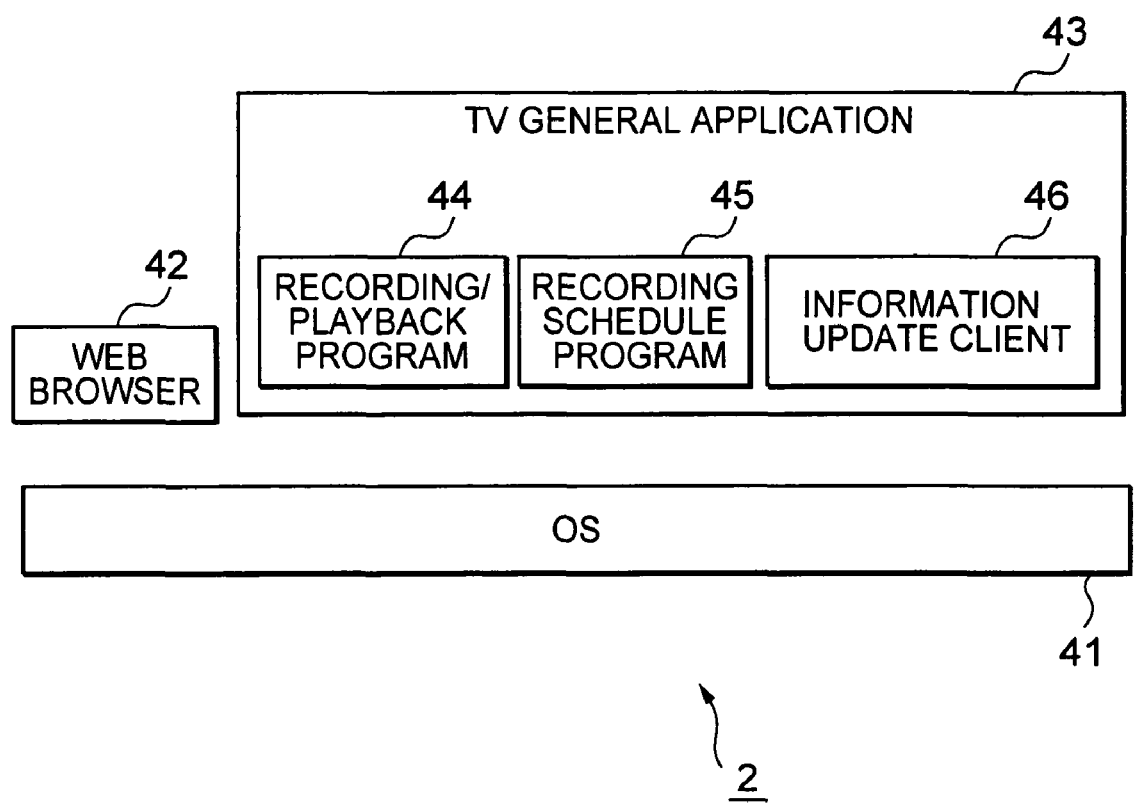
FIG. 4 is a diagram showing an example configuration of programs executed by the user terminal 2.

Next, FIG. 4 shows an example configuration of programs executed by the CPU 11 of the user terminal 2 of FIG. 2.

The CPU 11 executes an OS 41 (programs thereof) to execute a web browser 42 (programs thereof), a TV general application 43 (programs thereof), and the like under the control of the OS 41.

Here, the web browser 42 is to become a client (client of a web server) for receiving services provided by the WWW (World Wide Web) constructed on the Internet.

Further, the TV general application 43 is an application program for executing various processing related to program viewing, such as control of the TV tuner 20 (FIG. 2), and includes programs (modules) supervising various functions, such as a recording/playback program 44, a recording schedule program 45, an information update client 46.

The recording/playback program 44 performs processing such as selecting a channel to be received by the TV tuner 20, adjusting the volume, playing a program received by the TV tuner 20 or recorded on the HD 15. The recording schedule program 45 performs processing regarding scheduling a program for recording. The information update client 46 performs processing for uploading information such as actions taken by a user which are related to program viewing, to the server system 4.

It should be noted that although the TV general application 43 additionally includes, e.g., a program for editing programs recorded on the HD 15, its description is herein omitted.

Figure 5:
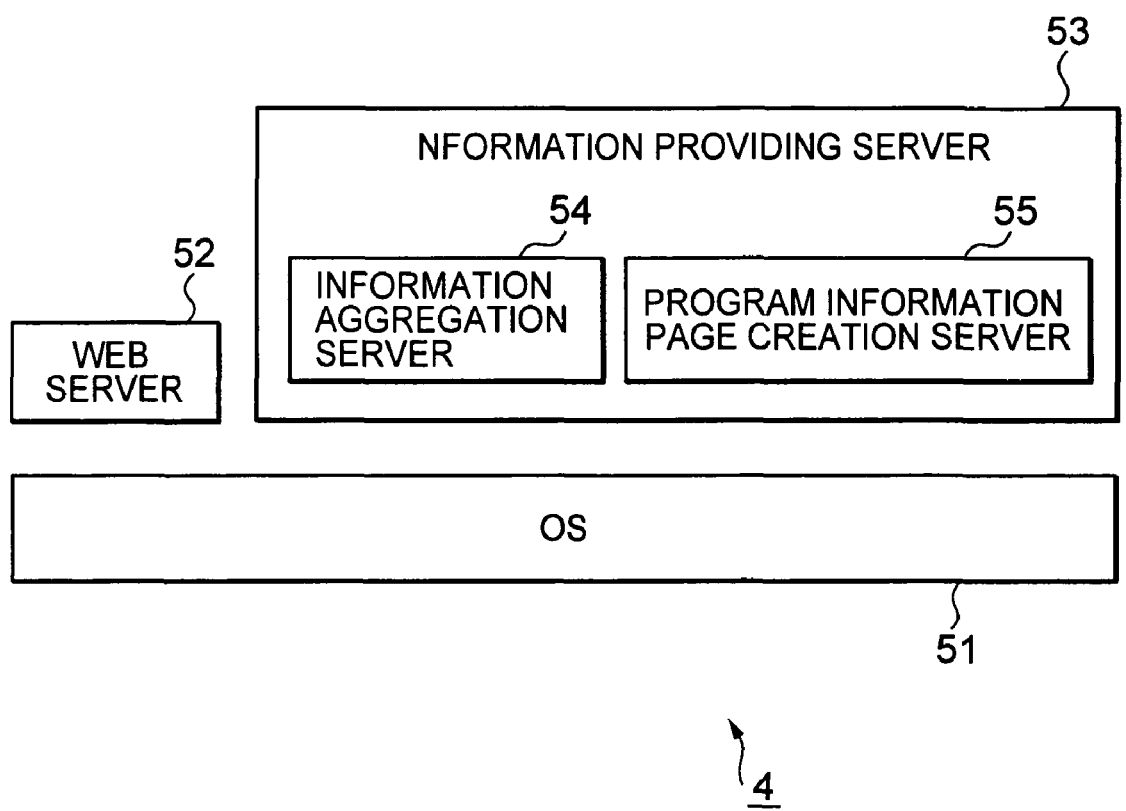
FIG. 5 is a diagram showing an example configuration of programs executed by the server system 4.

Next, FIG. 5 shows an example configuration of programs executed by the server system 4 of FIG. 3.

The CPU 31 executes an OS 51 (programs thereof) to execute a web server 52 (programs thereof), an information providing server 53 (programs thereof) under the control of the OS 51.

Here, the web server 52 forms a part of the WWW (World Wide Web) constructed on the Internet, and provides services to the web browser 42 (FIG. 4) that becomes one of its clients. It should be noted that the web server 52 may provide services to an arbitrary web browser 42 or provide services only to the web browser 42 of the user terminal 2 of a user who has made a user registration.

The information providing server 53 includes a program that executes processing for aggregating information transmitted from the user terminal 2, obtaining statistical data representing degree of user interest in programs to be broadcast by many broadcast stations including the broadcast station 1, and providing the statistical data together with program guide data and the like to the user terminal 2, and includes programs supervising various functions, such as an information aggregation server 54, and a program information page creation server 55.

The information aggregation server 54 performs processing such as aggregating information transmitted from the user terminal 2 and obtaining statistical data. The program information page creation server 55 acquires program guide data that gives guidance on programs, and also acquires statistical data obtained by the information aggregation server 54 to generate an EPG in which the program guide data, the statistical data, and the like are superimposed (reflected).

Figure 6:
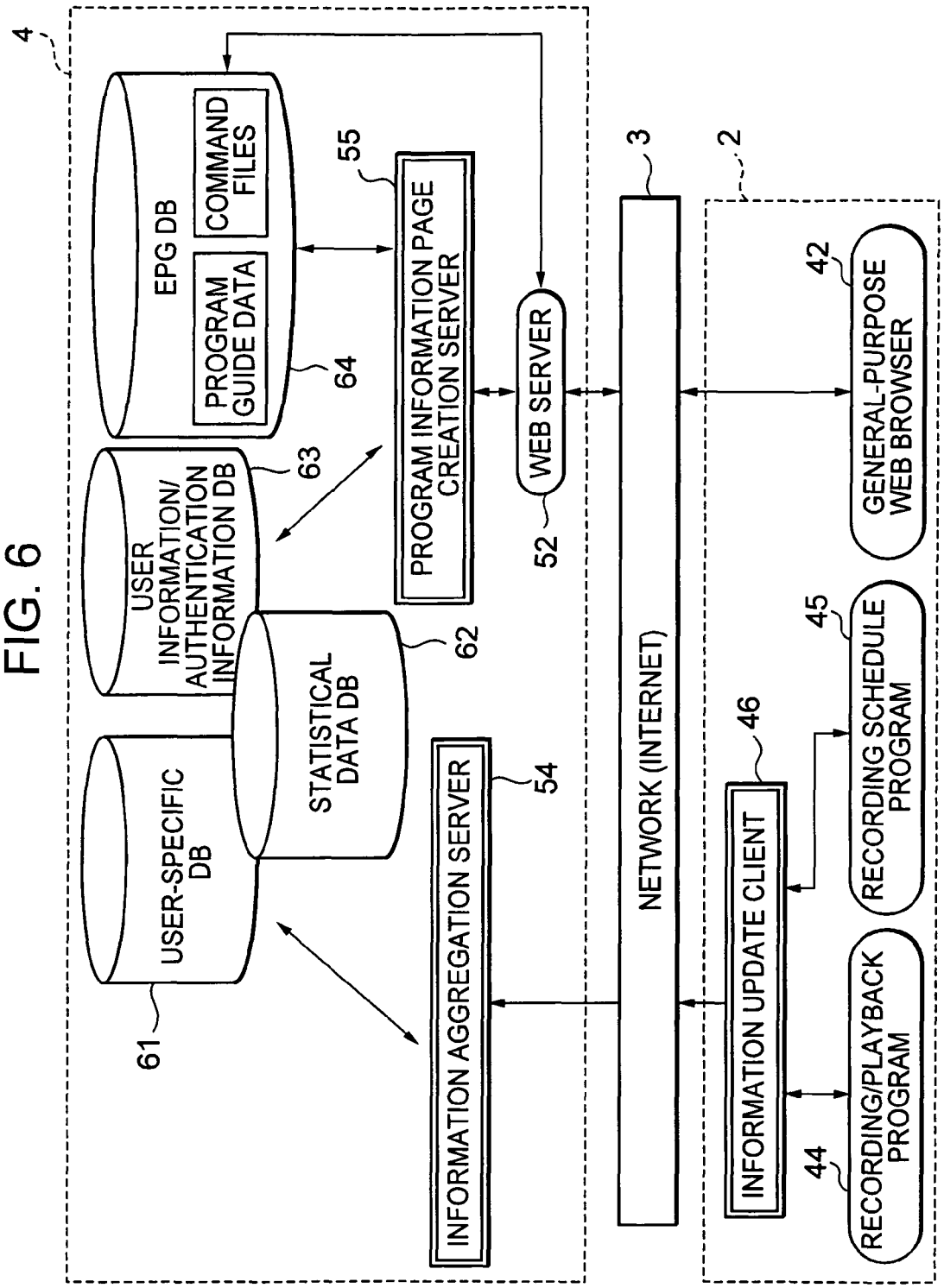
FIG. 6 is a diagram showing an example functional configuration of the user terminal 2 and the server system 4.

Next, FIG. 6 shows an example functional configuration of the user terminal 2 of FIG. 2 and the server system 4 of FIG. 3.

In the user terminal 2, the information update client 46 monitors the recording/playback program 44 and the recording schedule program 45 to acquire action information representing actions taken by the user which are related to program viewing. That is, the information update client 46 acquires, as action information, information representing that the user took an action to view a program during its broadcast time, information representing that the user took an action to view a program recorded during its broadcast time by playback, and information representing that the user took an action to schedule a program for recording or to cancel the recording schedule. Further, the information update client 46 uploads the acquired action information to the information aggregation server 54 via the network 3.

Furthermore, in the user terminal 2, the web browser 42 accesses the web server 52 of the server system 4 via the network 3 to receive a web page in which an EPG is displayed, for display.

On the other hand, in the server system 4, the information aggregation server 54 receives the action information transmitted from user terminals 2 (their information update clients 46), for registration (storage) in a user-specific DB (Data-Base) 61 for each of the users of the user terminals 2. As a result, the information aggregation server 54 builds up, on the user-specific DB 61 for each user, action history data, which is represented by the action information as a history of actions taken by the user which are related to program viewing. Further, the information aggregation server 54 aggregates the action information transmitted thereto from the user terminals 2 for registration in a statistical data DB 62.

A user information/authentication information DB 63 makes user information about a user of a user terminal 2, such as his or her name, age, gender, e-mail address, associating with user authentication information such as a user identification (ID) and a password for authenticating the user, for storage as user information/authentication information.

Here, e.g., when a user accesses a web page for user registration provided by the web server 52 through the web browser 42 of the user terminal 2 to input his or her user information, the server system 4 performs a user registration process to register user information/authentication information of the user in the user information/authentication information DB 63. That is, in the user registration process performed by the server system 4, user authentication information, which is a unique user ID and password, is issued to the user information inputted to the web page for user registration. The user information is made to correspond to the user authentication information, for registration in the user information/authentication information DB 63 as the user information/authentication information. Further, the user authentication information issued to the user information inputted to the web page for user registration is transmitted to, e.g., the web browser 42 of the user terminal 2 from the web server 52 via the network 3, or to an e-mail address of the user by e-mail.

Access to a web page for an EPG provided by the web server 52 or to the information aggregation server 52 may be made conditional on authentication using user authentication information. In this case, access to a web page for an EPG provided by the web server 52 or to the information aggregation server 54 is limited to those users who have made their user registration.

It should be noted that it may be configured such that authentication using user authentication information is not performed. In this case, access to a web page for an EPG provided by the web server 52 or to the information aggregation server 54 may be permitted regardless of whether a user registration has been made or not.

Further, in the case where authentication using user authentication information is performed, user authentication information issued to a user of a user terminal 2 must be transmitted from the user terminal 2 to the server system 4. It may be configured such that the transmission of the user authentication information is performed automatically when the user terminal 2 tries to access a web page for an EPG provided by the web server 52, or the information aggregation server 54.

An EPG DB 64 stores program guide data that gives guidance on programs to be broadcast by the broadcast station 1 (including other broadcast stations not shown in FIG. 1) and command files to be described later.

Here, the user-specific DB 61 through the EPG DB 64 are formed as files on the HD 35 of FIG. 3.

The program information page creation server 55 refers to the user-specific DB 61, the statistical data DB 62, the user information/authentication DB 63, the EPG DB 64 to generate (create) a web page for an EPG in which program guide data, operation data to be described later which is linked to a command file, statistical data, and action history data of the user of the user terminal 2 are superimposed (reflected), for supply to the web server 52.

The web server 52 causes the program information page creation server 55 to generate a web page for an EPG upon request from the web browser 42 of the user terminal 2, for transmission to the web browser 42 via the network 3. That is, the web server 52 requests the program information page creation server 55 to generate a web page upon request from the web browser 42 of the user terminal 2. The program information page creation server 55 generates a web page for the latest EPG in which program guide data, operation data, statistical data, and action history data of the user of the user terminal 2 are superimposed (reflected) upon request from the web server 52, for supply to the web page to the web server 52. The web server 52 transmits the web page for the latest EPG thus supplied from the program information page creation server 55 to the web browser 42 of the user terminal 2.

It should be noted that the web server 52 may transmit, to the web browser 42 of the user terminal 2, a web page for an EPG in which, e.g., only program guide data is reflected, similar to a conventional web page that may be generated from program guide data stored in the EPG DB 64, instead of a web page for an EPG generated by the program information page creation server 55.

Figure 7:
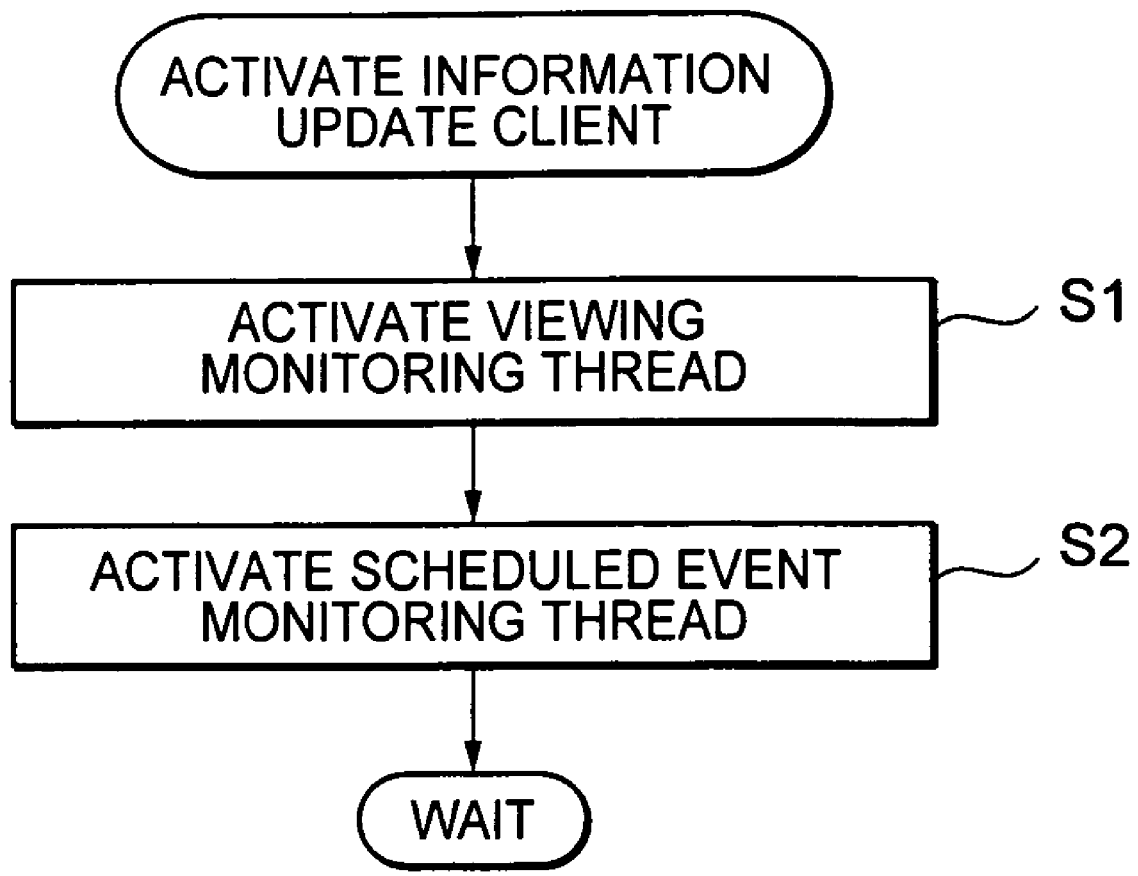
FIG. 7 is a flowchart explaining a process performed by an information update client 46.

Referring next to a flowchart of FIG. 7, a process performed by the information update client 46 in the user terminal 2 of FIG. 6 will be described.

The information update client 46 activates, e.g., when the user terminal 2, which is a computer, is activated (e.g., its power is turned on) and, first in step S1, activates a viewing monitoring thread explained with reference to FIG. 8 to be described later, and then proceeds to step S2. In step S2, the information update client 46 activates a scheduled event monitoring thread explained with reference to FIG. 14 to be described later, and then waits.

Referring next to a flowchart of FIG. 8, a process performed by the viewing monitoring thread activated in step S1 of FIG. 7 will be described.

When the viewing monitoring thread is activated, first in step S1-1, the information update client 46 monitors the recording/playback program 44 to determine whether or not a user is viewing a program.

It should be noted that although there are two types of programs as a program viewed by the user, which are a program currently broadcast (hereinafter referred to as "live program" whenever applicable) and a recorded program (hereinafter referred to as "recorded program" whenever applicable), the program for determination as to whether or not the user is viewing in step S1-1 includes both a live program and a recorded program.

Further, the information update client 46 determines whether or not the user is viewing a program on the basis of whether or not, e.g., the recording/playback program 44 is activated and the program is displayed (outputted) in step S1-1.

Figure 9:
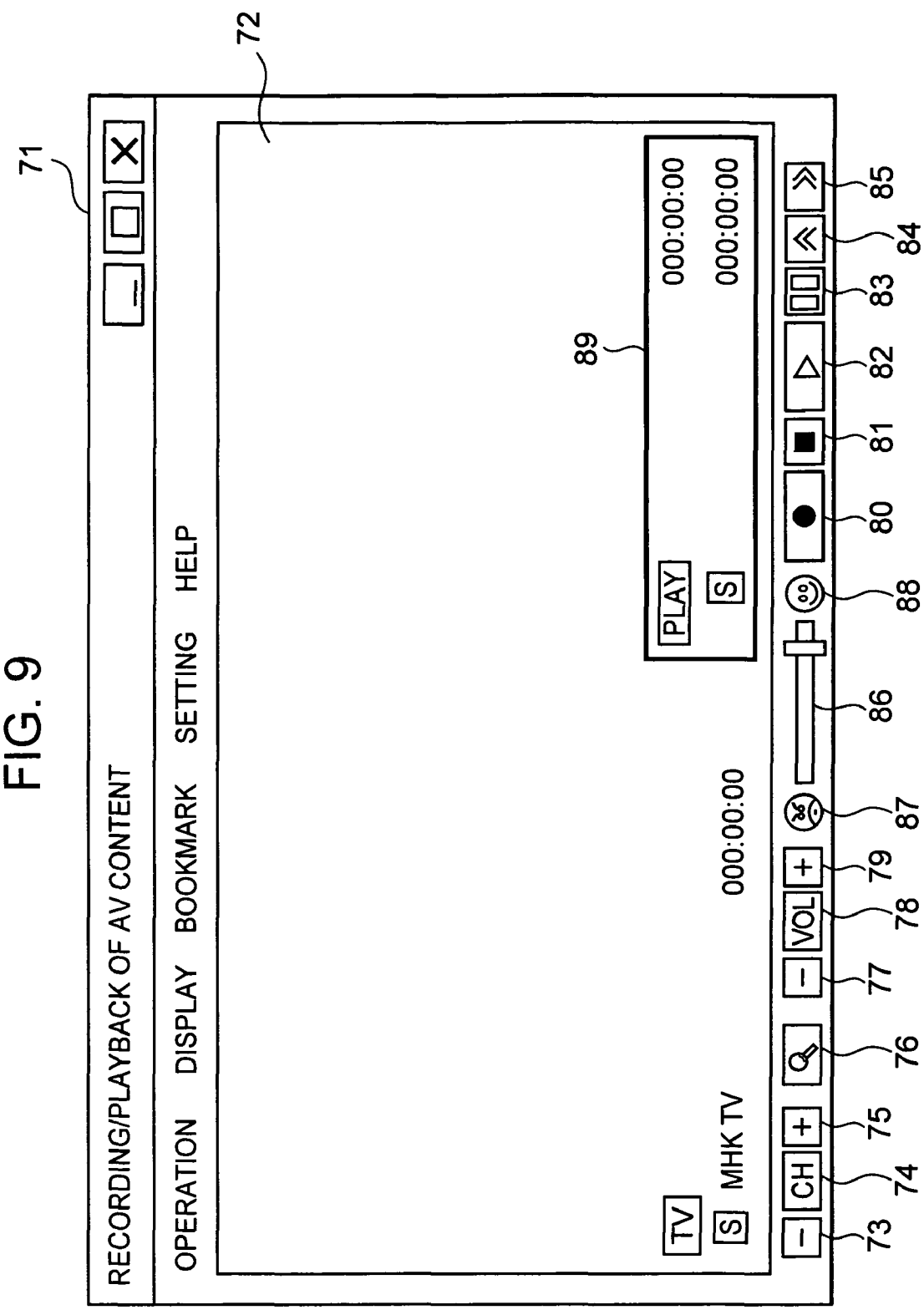
FIG. 9 is a plan view showing a display window 71 displayed by a recording/playback program 44.

Here, FIG. 9 shows a display window 71 displayed on the output section 17 (display thereof) by the recording/playback program 44 being activated.

The display window 71 is provided with a display area 72, and images (moving images) of a program are displayed in the display area 72.

It should be noted that as to a live program, image data and sound data of the program received, detected, demodulated by the TV tuner 20 (channel-selected program) are outputted onto the bus. The image data of the program is supplied to the RAM 14, placed in the display area 72 of the display window 71 which is stored beforehand in the RAM 14, and the display window 71 in which the image data is placed in the display area 72 is displayed on the output section 17 (display thereof). Further, the sound data of the program is supplied to the output section 17 (speaker thereof) for output.

On the other hand, as to a recorded program, the program recorded on the HD 15 is played for output from the output section 17. That is, recording of a program is performed such that image data and sound data of the program received by the TV tuner 20 are encoded by the encoder/decoder 21, and resulting encoded data is recorded on the HD 15. In a case where the user operates the input section 16 to instruct playback of the recorded program, the encoded data recorded on the HD 15 is read and then decoded by the encoder/decoder 21, whereby the image data and the sound data of the recorded program are played. Thereafter, the image data of the recorded program is displayed in the display area 72 of the display window 71, similarly to the case of a live program, and further, the sound data is also outputted from the output section 17 similarly to the case of a live program.

In the display window 71, at the bottom of the display area 72 are various operation buttons and the like, which may be operated by a cursor operable by the input section 16 (mouse thereof or the like).

A channel-down button 73 is operated to decrement the channel number selected by the TV tuner 20 from a current channel. When a channel button 74 is operated, a pull-down menu is displayed in which a list of channels selectable by the TV tuner 20 is displayed, and when a channel is selected from the pull-down menu, the channel is selected by the TV tuner 20. A channel-up button 75 is operated to increment the channel number selected by the TV tuner 20 from a current channel.

An explorer button 76 is operated to activate a video explorer, which is an application for managing, e.g., a list of recorded programs recorded on the HD 15.

A volume-down button 77 is operated to decrease the volume outputted from the output section 17 (speaker thereof) from a current volume. A volume button 78 is operated to display a volume slider that adjusts the volume to an arbitrary value. It should be noted that the volume may be adjusted to an arbitrary value by dragging the volume slider. A volume-up button 79 is operated to increase the volume from a current volume.

A record button 80 is operated in a case where a live program or the like is displayed in the display area 72, to record the live program. It should be noted that the display window 71 may display image data from an external source inputted to the communication I/F 18 (IEEE 1394 port, USB port thereof or the like), in addition to a live program and a recorded program, and the image data may also be recorded by operating the record button 80.

A stop button 81 is operated to stop recording of a live program or playback of a recorded program in the display window 71. A play button 82 is operated to start play back of a recorded program in the display window 71. A pause button 83 is operated to temporarily stop recording or playback as well as to clear the temporarily stopped state, in the display window 71.

A film roll button 84 is operated to display only a screen immediately after a scene change of, e.g., a recorded program or the like in a different window, which is not shown in the figure, as well as to clear (erase) the display of the different window. A play list button 85 is operated to display a play list representing a playback procedure generated by, e.g., editing a recorded program or the like in a different window, which is not shown in the figure, as well as to clear the display of the different window.

A good impression level slider 86, a "boring" button 87, and an "interesting" button 88 are operated to input a good impression level representing how a user feels about a program (images) displayed in the display area 72. That is, the good impression level slider 86 positions at the center by default, representing that the program is neither "interesting" nor "boring". The good impression level slider 86 moves back to the default position, e.g., in a case where playback of a recorded program is newly started and in a case where the channel-down button 73, the channel button 74, or the channel-down button 75 is operated to change channels selected by the TV tuner 20. Additionally, the good impression level slider 86 moves back to the default position, e.g., in a case where no operation is performed for a predetermined time period. The good impression level slider 86 may be moved by, e.g., dragging, and if finding a program displayed in the display area 72 "interesting", the user moves the good impression level slider 86 to the right in accordance with a degree to which it is interesting. Conversely, if finding a program displayed in the display area 72 "boring", the user moves the good impression level slider 86 to the left in accordance with a degree to which it is boring.

Here, the user may move the good impression level slider 86 not only by dragging the good impression level slider 86 itself, but also by, e.g., operating a remote controller (remote commander).

It should be noted that the farther left or right the good impression level slider 86 is positioned, the greater the level of "interestingness" or "boringness" is, respectively. Further, when the "boring" button 87 is operated, the good impression level slider 86 moves to the rightmost position representing that the level of "boringness" is maximum. When the "interesting" button 88 is operated, the good impression level slider 86 moves to the leftmost position representing that the level of "interestingness" is maximum.

An identification field 89 represents whether a program displayed in the display window 71 is a live program or a recorded program. That is, textual indications "TV" and "PLAY" are displayed at the bottom left and right of the display area 72, respectively. In a case where a program displayed in the display window 71 is a live program, the identification field 89 is displayed so as to surround the textual indication "TV". On the other hand, in a case where a program displayed in the display window 71 is a recorded program, the identification field 89 is displayed so as to surround the textual indication "PLAY". It should be noted that in FIG. 9, the identification field 89 is displayed so as to surround the textual indication "PLAY", and therefore that a recorded program is displayed in the display window 71.

Returning to FIG. 8, in step S1-1, the information update client 46 determines whether or not the user is viewing a program on the basis of whether or not the recording/playback program 44 is activated and a program is displayed in the display window 71 shown in FIG. 9.

In a case where it is determined in step S1-1 that the user is not viewing a program, i.e., for example, in a case where the recording/playback program 44 is not activated, or in a case where the recording/playback program 44 is activated but a program is not displayed in the display window 71, the information update client 46 skips steps S1-2 to S1-4 to proceed to step S1-5.

On the other hand, in a case where it is determined in step S1-1 that the user is viewing a program, the information update client 46 proceeds to step S1-2 to acquire various viewing information about program viewing by the user. It should be noted that details of the acquisition of viewing information will be described later.

After acquiring the various viewing information in step S1-2, the information update client 46 proceeds to step S1-3 to create a transmission code in which the viewing information is placed in a predetermined format, and then proceeds to step S1-4.

In step S1-4, the information update client 46 uploads the transmission code to the information gathering server 54 of the server system 4 in a manner to be described later, and proceeds to step S1-5.

In step S1-5, the information update client 46 provides a predetermined waiting time, such as one, two minutes, or five minutes, and returns to step S1-1 to repeat similar processing thereafter.

It should be noted that it is desirable that information update clients 46 of all user terminals 2 and the information gathering server 54 of the server system 4 be in synchronism with the waiting time provided in step S1-5 (they adopt the same waiting time). Methods of synchronizing the waiting times may include, e.g., setting a fixed, pre-set common waiting time to the information update clients 46 that are programs, or dynamically setting a waiting time to the information update clients 46 from the information gathering server 54. The setting of a waiting time to the information update clients 46 from the information gathering server 54 may be performed at an arbitrary timing, but may alternatively be performed at a time, e.g., the information update clients 46 perform updating to the information gathering server 54.

Referring next to a flowchart of FIG. 10, the process of acquiring viewing information performed in step S1-2 will be described.

First in step S11, the information update client 46 acquires a viewing area set value.

That is, e.g., channels for terrestrial television broadcasting programs vary from one region to another. Assuming now that a region in which television broadcasting of a certain program may be received on the same channel is termed a viewing area, a set value of a viewing area (viewing area set value) where the user terminal 2 is located is acquired in step S11.

Here, the recording/playback program 44 is configured to prompt the user to input a region (a name of municipalities, a region, or the like) where the user terminal 2 is located, whereby the user is requested to input a region where the user terminal 2 is located. The recording/playback program 44 thus recognizes a viewing area from a region where the user terminal 2 is located which is inputted at the time of initial value setting, to set a value representing the viewing area. When the viewing area is set, the recording/playback program 44 selects a channel conversion table shown in FIG. 37 to be described later which is specific to a region represented by the viewing area, to recognize channels (broadcast stations) receivable in the region. The recording/playback program 44 becomes ready to select a channel using a broadcast station name. That is, in a case where the viewing area is set to, e.g., the Kanto, channel 1 may be received by the TV tuner 20 using, e.g., a broadcast station name "NHK General Television". Further, channel 3 may be received by the TV tuner 20 using, e.g., a broadcast station name "NHK Education Television".

In step S11, the information update client 46 acquires the viewing area set value set at the time of initial setting from the recording/playback program 44, as mentioned above.

The information update client 46 proceeds to step S12 to acquire a station name of a broadcast station broadcasting a program being viewed by the user, from the recording/playback program 44. That is, in a case where the program being viewed by the user is a live program, the information update client 46 acquires, in step S12, a station name of a broadcast station broadcasting the live program, from the recording/playback program 44. Further, in a case where a program being viewed by the user is a recorded program, the information update client 46 acquires, in step S12, a station name of a broadcast station that broadcast the recorded program, from the recording/playback program 44.

Here, when recording a program, the recording/playback program 44 is configured to record also a channel on which the program is broadcast together with the program, on the HD 15. The recording/playback program 44 recognizes a station name of a broadcast station that broadcast the recorded program from a channel on which the recorded program was broadcast and a viewing area set value.

When the station name (broadcast station name) of the broadcast station broadcasting the program being viewed by the user is acquired in step S12, the information update client 46 proceeds to step S13 to acquire a good impression level on the program from the recording/playback program 44, and then proceeds to step S14. That is, the information update client 46 acquires a value corresponding to a position of the good impression level slider 86 in the display window 71 shown in FIG. 9 above as a good impression level, and then proceeds to step S14.

In step S14, the information update client 46 acquires a current date/time from, e.g., a RTC (Real Time Clock), which is not shown in the figure, and then proceeds to step S15.

Here, the current date/time acquired in step S14 is an actual viewing date/time at which the user is viewing the program (hereinafter referred to as "actual viewing date/time" whenever applicable).

It should be noted that it is desirable that the current date/time acquired in step S14 be correct since it is made to correspond to the program broadcast actually at the date/time by the information gathering server 54, as described later. For this reason, the TV general application 43 of the user terminal 2 has an automatic time setting function in which, e.g., an inquiry is made to a time server, which is not shown in the figure, connected to an atomic clock, or in which time setting is performed using television broadcasting of a time signal by the broadcast station 1, whereby the RTC may keep the correct time at all times.

In step S15, the information update client 46 determines whether or not the program being viewed by the user is a live program or a recorded program by making an inquiry to the recording/playback program 44.

In a case where it is determined in step S15 that the program being viewed by the user is a live program, i.e., in a case where the identification field 89 surrounds the textual indication "TV" in the display window 71 of FIG. 9, the information update client 46 proceeds to step S16 to set, e.g., "0" representing a live program to a flag Video Flag representing an attribute of the program being viewed by the user, and thereafter terminates the viewing information acquiring process.

On the other hand, in a case where it is determined in step S15 that the program being viewed by the user is a recorded program, i.e., in a case where the identification field 89 surrounds the textual indication "PLAY" in the display window 71 of FIG. 9, the information update client 46 proceeds to step S17 to acquire a viewing date/time of the recorded program (hereinafter referred to as "broadcast time-based viewing date/time" whenever applicable) which uses a broadcast date/time of the recorded program being viewed by the user as a reference. That is, in step S17, a viewing date/time at which the user would have viewed the recorded program during its actual broadcast time is acquired as the broadcast time-based viewing date/time. Therefore, in a case where the user recorded a program whose broadcast was started at 17:00 on a certain date, and views the recorded program by playing its image and sound corresponding to a position that is, e.g., ten minutes after the start of the recorded program, 17:10 on its broadcast date is acquired as the broadcast time-based viewing date/time.

Here, in order to obtain a broadcast time-based viewing date/time, a broadcast date/time of the recorded program on which it is based must be available. It is configured such that the broadcast date/time of a recorded program (e.g., a broadcast start date/time here) is recorded on the HD 15 together with the program when the recording/playback program 44 records the program.

After step S17, the information update client 46 proceeds to step S18 to set, e.g., "1" representing a recorded program to the flag Video Flag, and thereafter terminates the viewing information acquiring process.

Figure 8:
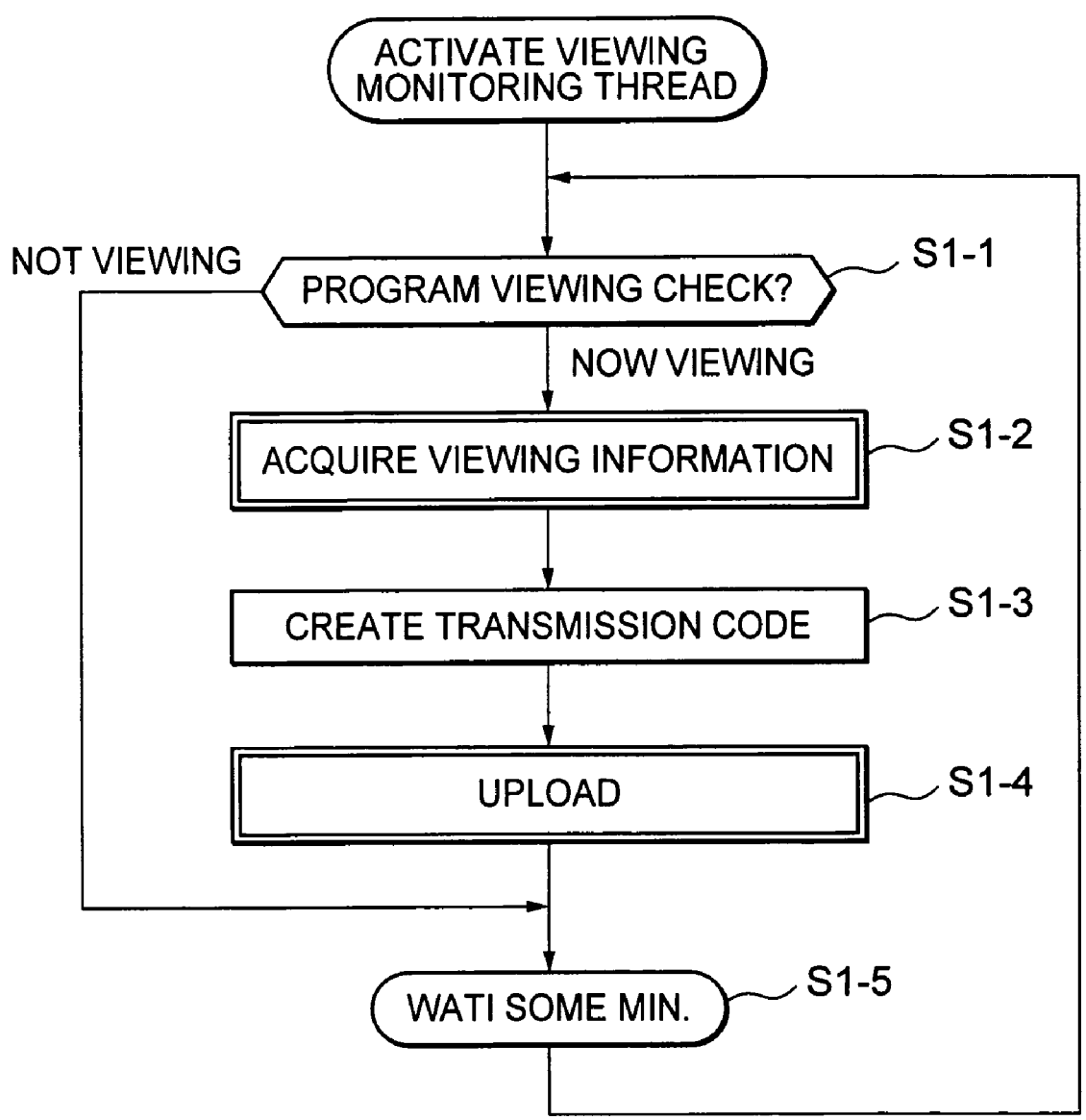
FIG. 8 is a flowchart explaining a process performed by a viewing monitoring thread.
Figure 11:
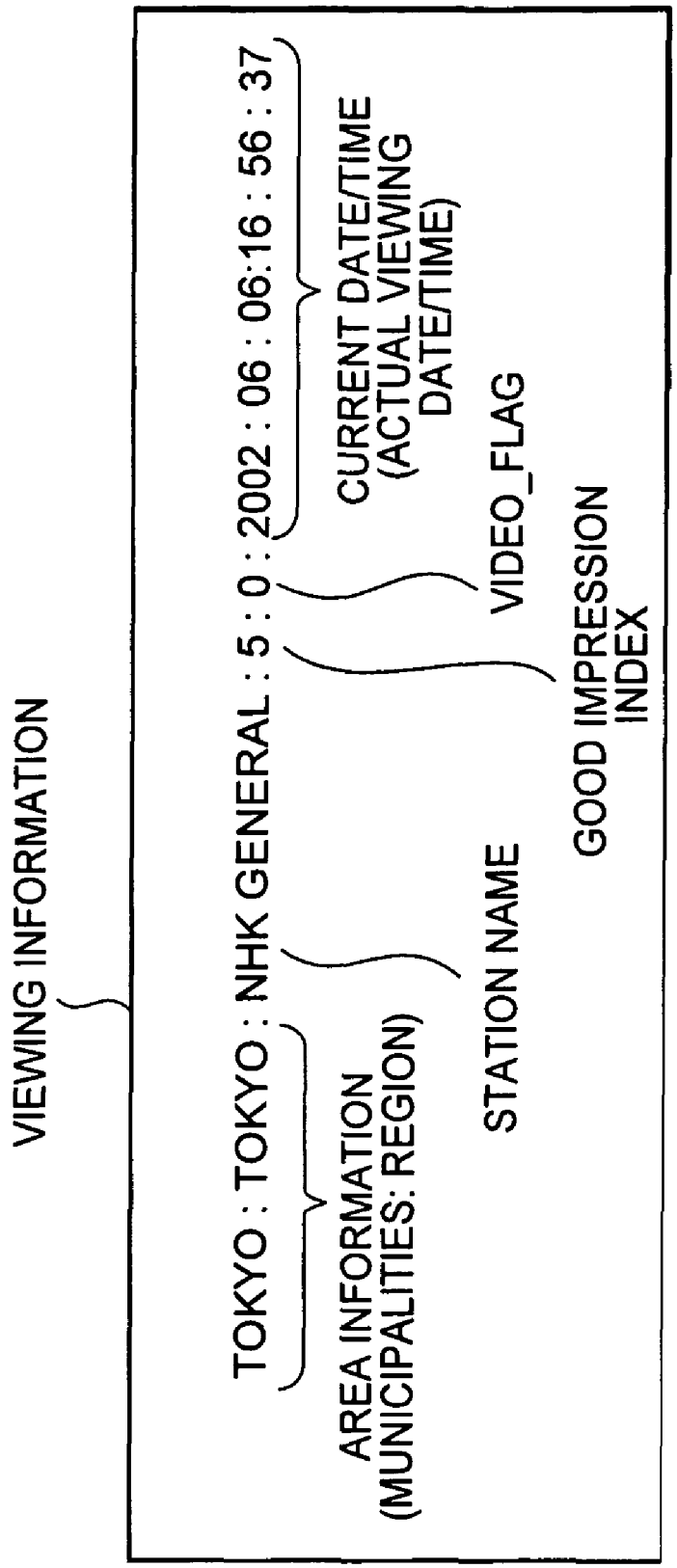
FIG. 11 is a diagram showing a format of a transmission code at the time the viewing information is transmitted.
Figure 12:
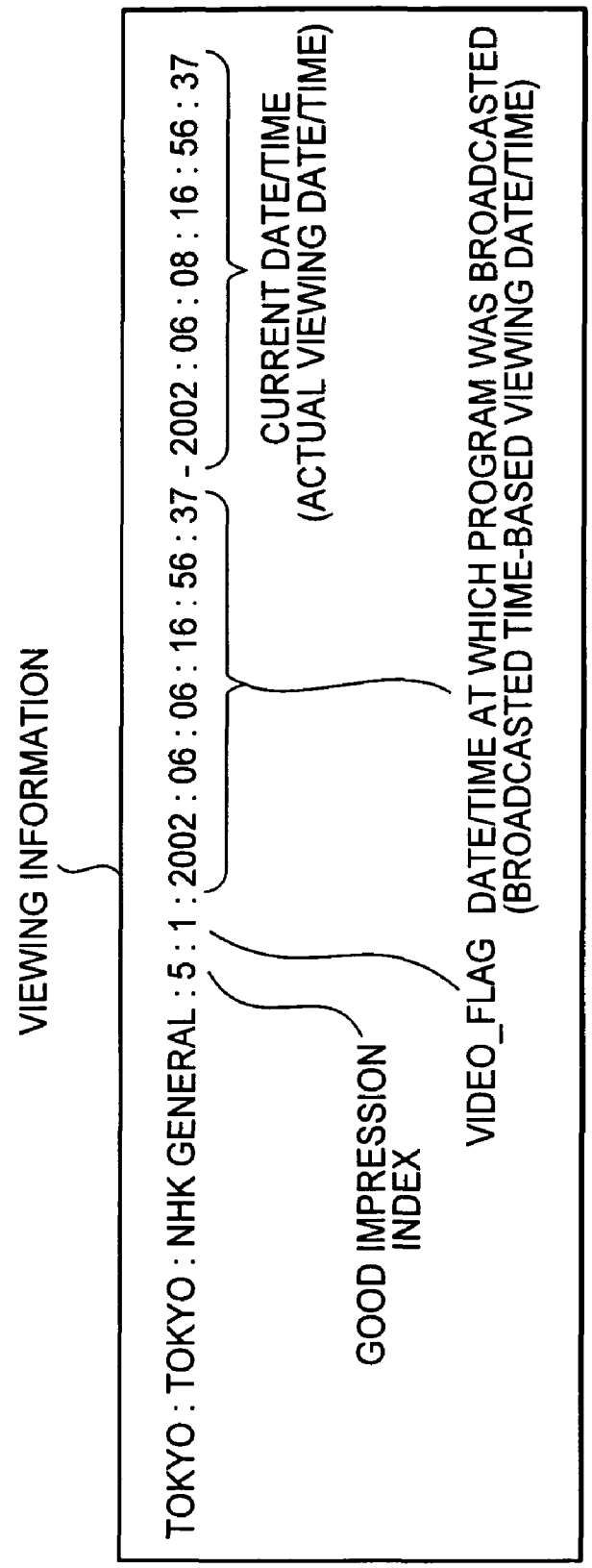
FIG. 12 is a diagram showing a format of a transmission code at the time the viewing information is transmitted.

After the viewing information is acquired in the above way, the information update client 46 creates, in step S1-3 of FIG. 8 mentioned above, transmission codes of formats, shown in, e.g., FIGS. 11 and 12, for transmitting the viewing information.

That is, FIG. 11 shows a transmission code created in the case where the user is viewing a live program.

Figure 10:
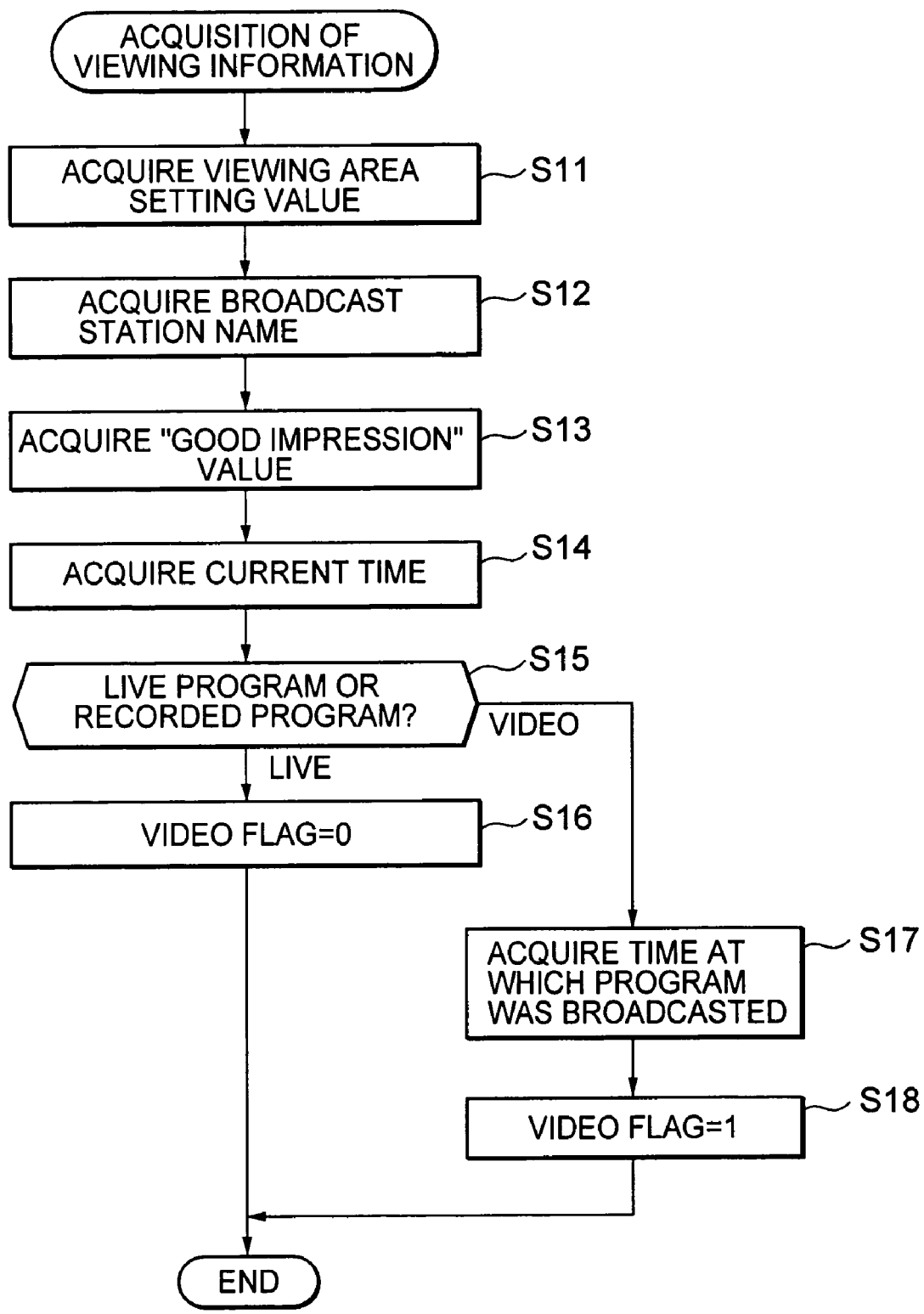
FIG. 10 is a flowchart explaining a process of acquiring viewing information.

At the top of the transmission code, area information is placed on the basis of the viewing area set value acquired in step S11 of FIG. 10. Here, in the present embodiment, the area information includes municipalities and a region in which the user terminal 2 is located.

Placed next to the area information is a station name (broadcast station name) of a broadcast station broadcasting a live program being viewed by the user. It should be noted that the TV general application 43 (FIG. 4) has a channel conversion file in which broadcast station names are made to correspond to channels (channel numbers) such as described later, and a broadcast station name placed in the transmission code is to conform to, e.g., naming regulations as to broadcast stations described in the channel conversion file.

Placed next to the broadcast station name is the good impression level acquired in step S13 of FIG. 10. Here, in the present embodiment, the good impression level is represented by an integral value corresponding to a position of the good impression level slider 86 (FIG. 9), and is set to 5 in FIG. 11. It should be noted that, e.g., the greater a value of the good impression level, the more interesting a program, and that the smaller the value, the less interesting the program.

Placed next to the good impression level is the flag Video Flag "0" representing a live program set in step S16 of FIG. 10. And placed next to the flag Video Flag is the current date/time acquired in step S14 of FIG. 10, i.e., the actual viewing date/time, which is an actual date/time at which the live program was viewed.

Here, while the transmission code of FIG. 11 (similarly to transmission codes of FIGS. 12 and 16 to be described later) adopts a broadcast station name as information for identifying a broadcast station that broadcasts (or is broadcasting) a program, this is so for the following reason. That is, as information for identifying a broadcast station broadcasting a program, e.g., a set of area information and a channel (channel number) of the broadcast station may be adopted. However, depending on an environment on the side of the user terminal 2, in-house broadcasting, BS (Broadcasting Satellite) broadcasting, CS (Communication Satellite) broadcasting, CATV broadcasting, and the like may, in some case, be assigned to a channel to which a certain broadcast station is to be originally assigned. In this case, the set of are a information and a channel number fails to specify the broadcast station broadcasting the program by the channel number. Thus, in the present embodiment, a broadcast station broadcasting a program on a certain channel is specified by its broadcast station name (channel name), not by its channel number, using a channel conversion file of the TV general application 43 (FIG. 4).

As a result, in a case where a channel on which programs are broadcast by the broadcast station 1 should originally be assigned to a channel number CH#i, the channel assignment is changed to assign a certain channel α of a certain "A" CATV broadcast station to the channel number CH#i. Even so, the channel conversion file is (automatically) rewritten (or an addition to the channel conversion file for the "A" CATV broadcast station is downloaded from the "A" CATV broadcast station) to make the channel α of the "A" CATV broadcast station to correspond to the channel number CH#i in the channel conversion file at the time of the assignment change, whereby the channel a of the "A" CATV broadcast station may be recognized as a broadcast station broadcasting programs on the channel number CH#i.

It should be noted that a channel conversion table, such as mentioned above, in which broadcast station names (channel names) are made to correspond to channel numbers, is used not only by user terminals 2 but by the server system 4 as well.

That is, in the terminal 2, the channel conversion table is used (referred to) not only when the above-mentioned transmission code is created, but also, e.g., when a broadcast station name described in a command file to be described later is converted to a channel number.

Further, in the server system 4, the channel conversion table is used, e.g., in order to define a cell for registering data in various tables to be described later which are managed by the server system 4, when matching is made between a broadcast station name for specifying the cell and a broadcast station name placed in a transmission code transmitted from the user terminal 2. Further, the channel conversion table is used, e.g., in order to generate an EPG page to be described later, when matching is made between a broadcast station name of a broadcast station broadcasting programs on the EPG page and a broadcast station name for specifying cells in various tables managed by the server system 4, and when a broadcast station name is described in a command file.

Next, FIG. 12 shows a transmission code created in the case where the user is viewing a recorded program.

A transmission code for a recorded program also includes area information, a broadcast station name, a good impression level, a flag Vide Flag placed in order from the top therein, similarly to the transmission code for a live program shown in FIG. 11. However, as the flag Video Flag of the transmission code for a recorded program, "1" representing a recorded program is placed.

Further, placed next to the flag Video Flag in the transmission code for a recorded program is the broadcast time-based viewing date/time acquired in step S17 of FIG. 10. And placed next to the broadcast time-based date/time is the current time acquired in step S14 of FIG. 10, i.e., an actual viewing date/time, which is an actual date/time at which the recorded program was viewed.

As is apparent from FIGS. 11 and 12, the transmission code formats for a live program and a recorded program are different in that a broadcast time-based viewing date/time is included in the transmission code for a recorded program, whereas a broadcast time-based viewing date/time is not included in the transmission code for a live program.

Further, as to a live program, the actual viewing date/time represents the broadcast date/time at which the live program was broadcast, and thus a live program being viewed by the user may be specified from a broadcast station name and an actual viewing date/time in the transmission code of FIG. 11.

On the other hand, as to a recorded program, the broadcast time-based viewing date/time represents the broadcast date/time at which the recorded program was broadcast, and thus a recorded program being viewed by the user may be specified from a broadcast station name and a broadcast time-based viewing date/time in the transmission code of FIG. 12.

It should be noted that the transmission code formats are not limited to those shown in FIGS. 11 and 12 above. That is, e.g., the order in which area information, a broadcast station name, and the like included in a transmission code is not limited to the orders shown in FIGS. 11 and 12 above.

Further, since viewing information that is the transmission code shown in FIG. 11 above is generated in a case where the user viewed a live program, it may be said that the viewing information is action information representing that the user took an action to view the program during its broadcast time. Furthermore, since the viewing information that is the transmission code shown in FIG. 12 above is generated in a case where the user viewed a recorded program, it may likewise be said that the viewing information is action information representing that the user took an action to view the program recorded during its broadcast time by playback.

Referring next to a flowchart of FIG. 13, an uploading process performed in step S1-4 of FIG. 8 will be described, in which a transmission code as action information is uploaded to the information gathering server 54.

First, the information update client 46 determines whether or not the user terminal 2 is connected to the network 3 that is the Internet (online). In a case where it is determined that the user terminal 2 is not online, the information update client 46 proceeds to step S22 to save the transmission code created in step S1-3 of FIG. 8 in, e.g., a waiting list, which is a predetermined file on the HD 15, and thereafter terminates the uploading process.

On the other hand, in a case where it is determined in step S21 that the user terminal 2 is online, the information update client 46 proceeds to step S23 to try to connect to the information aggregation server 54, and then proceeds to step S24.

In step S24, the information update client 46 determines whether or not the connection to the information aggregation server 54 is successful. In a case where it is determined in step S24 that the connection to the information aggregation server 54 is not successful, i.e., in a case where a communication link cannot be established between the information update client 46 and the information aggregation server 54, the information update client 46 proceeds to step S22 to save the transmission code created in step S1-3 of FIG. 8 in the waiting list as mentioned above, and thereafter terminates the uploading process.

On the other hand, in a case where it is determined in step S24 that the connection from the information update client 46 to the information aggregation server 54 is successful, i.e., in a case where a communication link has been established between the information update client 46 and the information aggregation server 54, the information update client 46 proceeds to step S25, where user authentication is performed.

It should be noted that it is assumed here that the user of the user terminal 2 has already made a user registration and that user authentication information including a user ID and a password issued from the server system 4 has already been stored in the HD 15 of the user terminal 2 by the user registration. In step S25, the information update client 46 transmits the user authentication information stored in the HD 15 to the information aggregation server 54.

After step S25, the information update client 46 proceeds to step S26 to check if any transmission code not transmitted yet to the information aggregation server 54 is stored in the waiting list. In a case where any transmission code not transmitted yet to the information aggregation server 54 is stored in the waiting list, the information update client 46 reads the transmission code, and then proceeds to step S27.

In step S27, the information update client 46 transmits, to the information aggregation server 54, the transmission code created in step S1-3 of FIG. 8, and further, any transmission code not transmitted yet to the information aggregation server 54 if such a transmission code is stored in the waiting list, and thereafter terminates the uploading process.

In the case where the user viewed a program as described above, a transmission code as action information representing that the user viewed the program during its broadcast time or a transmission code as action information representing that the user viewed a program recorded during its broadcast time by playback is transmitted not by involving user operation, but automatically, so to speak, to the server system 4 from the user terminal 2.

Referring next to a flowchart of FIG. 14, a process performed by the scheduled event monitoring thread activated in step S2 of FIG. 7 will be described.

When the viewing monitoring thread is activated, first in step S2-1, the information update client 46 waits for a scheduled event. That is, the recording schedule program 45 (FIG. 6) is activated, e.g., when a user operates the input section 16 with a predetermined operation or when a command file to be described later is downloaded from the server system 4, to perform a process regarding scheduling of a program for recording. When a process of making or canceling a recording schedule is performed, the recording schedule program 45 issues a scheduled event representing that a recording schedule is made or cancelled, for supply to the information update client 46.

In step S2-1, a waiting time is provided until the recording schedule program 45 issues a scheduled event as mentioned above.

It should be noted that in a case where the user scheduled a program for recording in the user terminal 2, the recording schedule may be changed. In a case where the user changes recording schedules from a recording schedule for a certain program to a recording schedule for another program, for example, a scheduled event for canceling the recording schedule for a certain program and a scheduled event for making the recording schedule for another program are issued successively.

And when the recording schedule program 45 issues the scheduled events, the information update client 46 proceeds from step S2-1 to step S2-2 to acquire various schedule information about recording schedules made or cancelled by the user. It should be noted that details of the acquisition of schedule information will be described later.

After acquiring the various schedule information in step S2-2, the information update client 46 proceeds to step S203 to create a transmission code in which the schedule information is placed in a predetermined format, and then proceeds to step S2-4.

In step S2-4, the information update client 46 uploads the transmission code to the information gathering server 54 of the server system 4 similarly to the case described with reference to FIG. 13 above, and then returns to step S2-1 to repeat similar processing thereafter.

Referring next to a flowchart of FIG. 15, details of the process of acquiring schedule information performed in step S2-2 of FIG. 14 will be described.

First in step S41, the information update client 46 determines whether a scheduled event represents that a recording schedule has been made or cancelled.

In a case where it is determined in step S41 that the scheduled event represents that a recording schedule has been made, the information update client 46 proceeds to step S42 to set, e.g., "0" representing that a recording schedule has been made, to a flag Command representing that a recording schedule has been made or cancelled, and then proceeds to step S43.

In step S43, the information update client 46 acquires a viewing area set value similarly to the case of step S11 of FIG. 10, and then proceeds to step S44. In step S44, the information update client 46 acquires a broadcast station name of a broadcast station broadcasting a program which the user scheduled for recording, from the recording schedule program 45. That is, in a case where the recording schedule program 45 schedules a program for recording, at least a broadcast station name, a recording start date/time, and a recording end date/time as to the program scheduled for recording are registered in a recording schedule management file, which is a predetermined file on the HD 15. In step S44, the information update client 46 acquires a broadcast station name of a broadcast station registered in the recording schedule management file as to the program which the user scheduled for recording.

When the station name (broadcast station name) of the broadcast station for the program scheduled for recording is acquired in step S44, the information update client 46 proceeds to step S45 to acquire a recording start date/time and a recording end date/time of the program from the recording schedule program 45. That is, in step S45, the information update client 46 acquires the recording start date/time and the recording end date/time registered in the recording schedule management file as to the program which the user scheduled for recording, from the recording schedule program 45, and thereafter terminates the schedule information acquiring process.

On the other hand, in a case where it is determined in step S41 that the scheduled event represents that a recording schedule has been cancelled, the information update client 46 proceeds to step S46 to set, e.g., "1" representing that a recording schedule has been cancelled, to the flag Command.

The information update client 46 thereafter proceeds to steps S43 to S45 in sequence to perform processing similar to the case mentioned above. However, in steps S44 and S45, the above-mentioned processing is performed as to the program whose recording schedule has been cancelled, and the schedule information acquiring process is thereafter terminated.

Therefore, in this case, in step S44, the information update client 46 acquires a broadcast station name of a broadcast station registered in the recording schedule management file as to the program whose recording schedule is cancelled by the user.

Further, in step S44, the information update client 46 acquires a recording start date/time and a recording end date/time registered in the recording schedule management file as to the program whose recording scheduled is cancelled by the user, from the recording schedule program.

Figure 14:
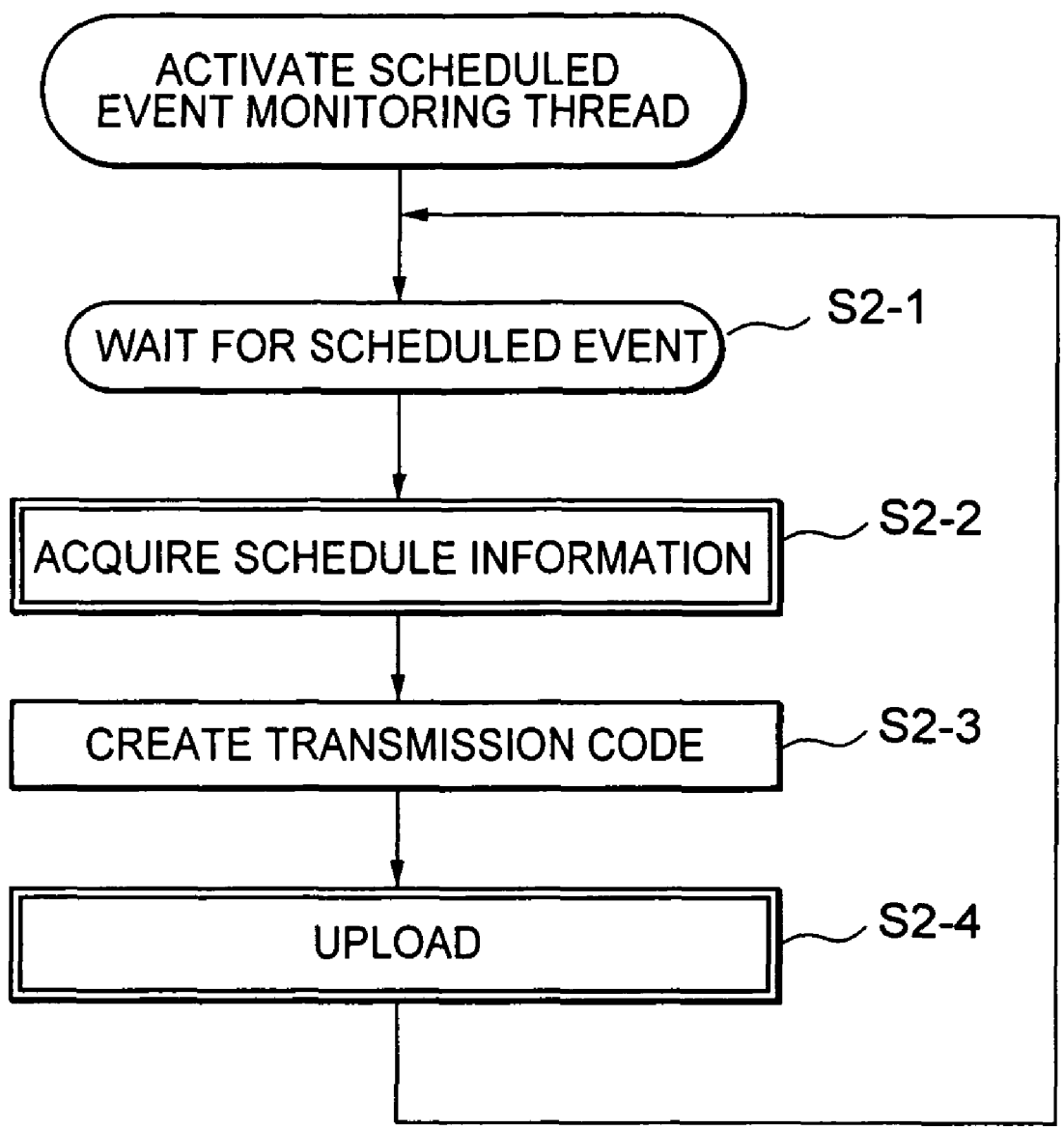
FIG. 14 is a flowchart explaining a process performed by a scheduled event monitoring thread.
Figure 16:
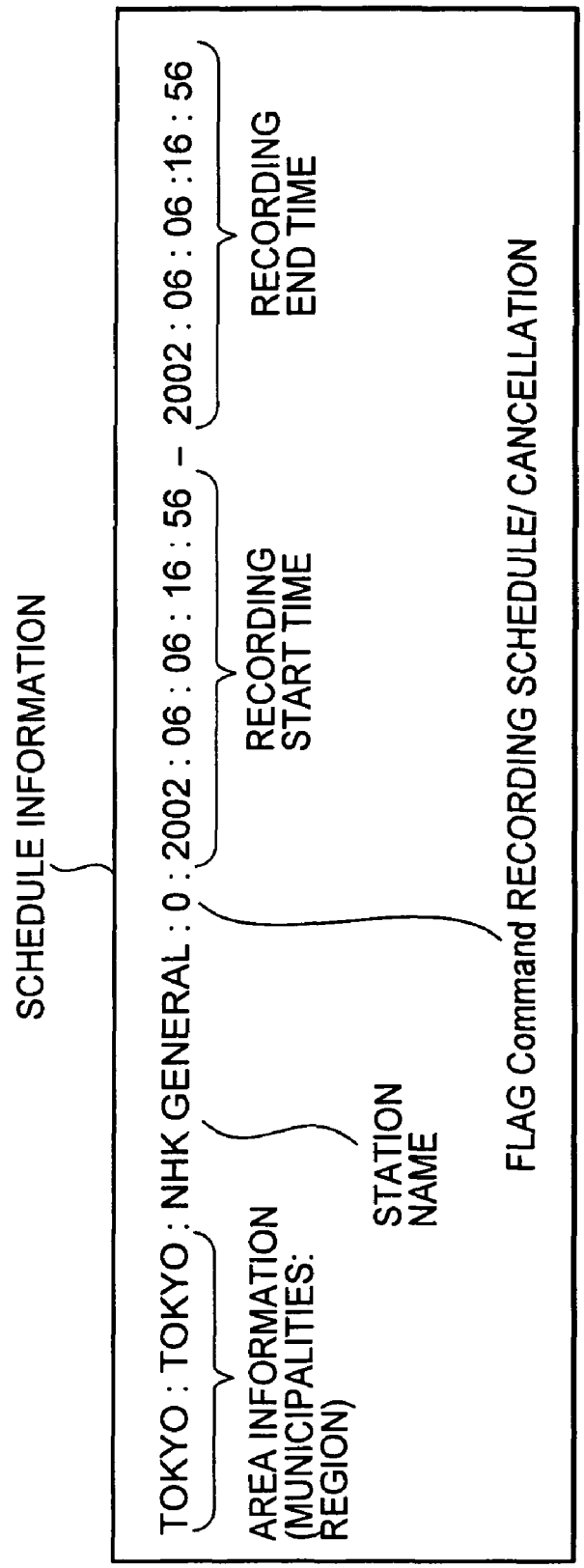
FIG. 16 is a diagram showing a format of a transmission code at the time the schedule information is transmitted.

After the schedule information is acquired in the above way, the information update client 46 creates a transmission code of a format shown in, e.g., FIG. 16 in step S2-3 of FIG. 14 mentioned above.

Figure 15:
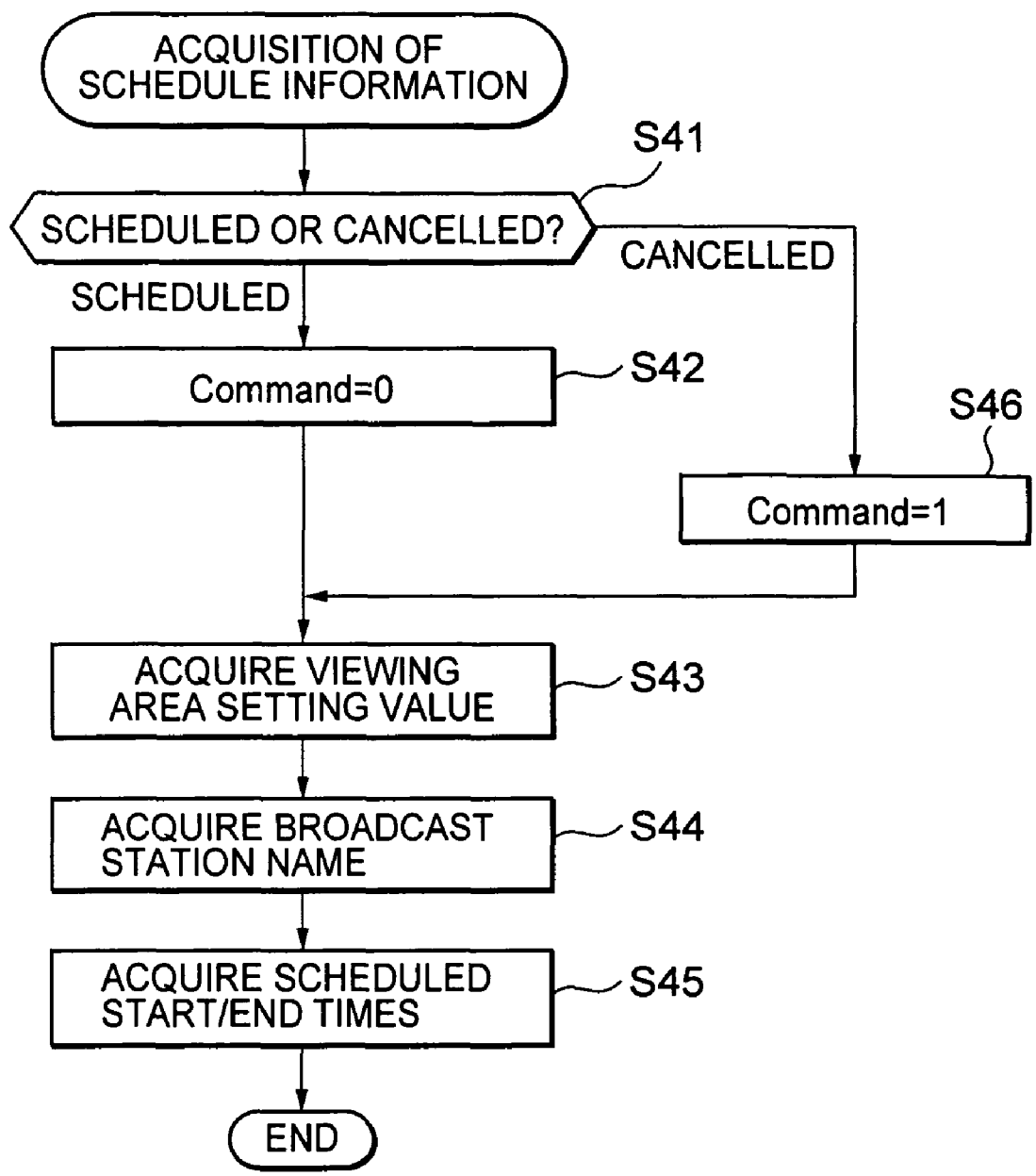
FIG. 15 is a flowchart explaining a process of acquiring schedule information.

That is, area information is placed at the top of the transmission code on the basis of the viewing area set value acquired in step S43 of FIG. 15, similarly to the cases of the transmission codes of FIGS. 11 and 12.

Placed next to the area information is the station name (broadcast station name) of the broadcast station for the program whose recording schedule has been made or cancelled, which is acquired in step S44 of FIG. 15, similarly to the cases of the transmission codes of FIGS. 11 and 12.

Placed next to the broadcast station name is the flag Command to which a value is set in step S42 of FIG. 15 or S26. Here, in an embodiment of FIG. 16, "0" representing that a recording schedule has been made is set as the flag Command. It should be noted that in a case where a recording schedule has been cancelled, "1" is set as the flag Command in the transmission code. Placed next to the flag Command are the recording start date/time and the recording end date/time acquired in step S45 of FIG. 15.

It should be noted that the recording start date/time and the recording end date/time represent a broadcasting duration of a program for which a recording schedule has been made or cancelled, and thus that according to a transmission code of FIG. 16 created in a case where a recording schedule has been made or cancelled, a program for which a recording schedule has been made or cancelled can be specified from the broadcast station name and the recording start date/time or the recording end date/time, similarly to the cases of the transmission codes of FIGS. 11 and 12.

It should be noted that the format of the transmission code is not limited to that shown in FIG. 16. That is, e.g., the order in which area information, a broadcast station name, and the like included in the transmission code are placed is not limited to the order shown in FIG. 16.

Further, since the transmission code shown in FIG. 16 above is created when a recording schedule has been made or cancelled, it may be said that the transmission code is action information representing that the user took an action to make or cancel a recording schedule for a program.

As described above, when the user has made or cancelled a recording schedule for a program, a transmission code as action information representing that the user has made or cancelled a recording schedule for a program is transmitted not by user operation, but automatically, so to speak, to the server system 4 from the user terminal 2.

Referring next to a flowchart of FIG. 17, a process performed by the information aggregation server 54 (FIG. 6) of the server system 4 will be described.

When accessed by the information update client 46 by the information update client 46 of the user terminal 2 performing the uploading process described with reference to FIG. 13 above, the information aggregation server 54 starts the process and, first in step S51, performs user authentication.

That is, assuming that the user of the user terminal 2 has already made a user registration with the server system 4, user authentication information issued to the user is recorded on the HD 15 in the user terminal 2. In the server system 4, the user authentication information is stored in the user information/authentication information DB 63 in a manner corresponding to user information as user information/authentication information. And after establishing a communication link with the information aggregation server 54, the information update client 46 transmits the user authentication information issued from the server system 4 as mentioned above. Thus, in step S51, the information aggregation server 54 performs user authentication by checking coincidence between the user information transmitted from the information update client 46 and the user authentication information stored in the user information/authentication information DB 63.

It should be noted that in a case where user authentication is not successful in step S51, i.e., in a case where user authentication information is not transmitted from the information update client 46 or in a case where the user authentication information is transmitted but user authentication information coinciding with the user authentication information is not stored in the user information/authentication information DB 63, the information aggregation server 54, e.g., terminates the process, and rejects access from the user terminal 2 thereafter. However, in a case where user authentication is not successful, the information aggregation server 54 may resume the process after it transmits a message prompting the user terminal 2 for a user registration and the user of the user terminal 2 has made a user registration in response to the message, for example.

Further, the user terminal 2 may transmit user authentication information not singly but as part of a transmission code after the information is placed in a transmission code. In this case, user authentication in step S51 is performed after the information aggregation server 54 receives the transmission code in step S52 to be described later.

After user authentication is performed in step S51, the information aggregation server 54 proceeds to step S52 to receive viewing information or schedule information (hereinafter referred to also as "viewing/schedule information" whenever applicable), which is action information thereafter transmitted from the information update client 46 as a transmission code, and then proceeds to step S53.

In step S53, the information aggregation server 54 registers, by addition, the viewing/schedule information transmitted from the information update client 46 in one of tables prepared for each user ID in the user-specific DB 61, i.e., for example, in a table to which a user ID issued to a user of a user terminal 2 that transmitted the viewing/schedule information is added.

Here, it may be said that the viewing/schedule information transmitted from the information update client 46 as a transmission code is action information representing an action taken by the user as mentioned above. The viewing/schedule information as action information is registered by addition in a table to which a user ID issued to a user of a user terminal 2 that transmitted the action information is added. Therefore, it may be said that a list of viewing/schedule information registered in the table is action history data, which is a history of actions taken by the user which are related to program viewing.

It should be noted that when viewing/schedule information is registered in each table of the user-specific DB 61 by addition as mentioned above, the amount of data in the table becomes huge. Thus, viewing/schedule information registered in a table for each user in the user-specific DB 61 may be deleted (erased) upon passage of a predetermined time from the registration.

After the recording/schedule information is registered in the user-specific DB 61 in step S53, the information aggregation server 54 proceeds to step S54 to determine whether or not the viewing/schedule information is necessary and valid for inclusion in statistical data of the statistical data DB 62.

Here, the viewing/schedule information transmitted from the information update client 46 as a transmission code is aggregated as described later, for use in obtaining statistical data such as audience ratings.

By the way, in a case where users activate the TV general applications 43 in a plurality of user terminals, respectively, and the same user authentication information is registered in the plurality of user terminals, there may be a case where a plurality of viewing/schedule information items in which only their actual viewing dates/times shown in FIG. 11 above are the same or in which their actual viewing "times" are slightly different (a plurality of viewing/schedule information items in which their actual viewing dates/times correspond to, e.g., the same time zone(s) to be described later) are transmitted to the information gathering server 54 from the information update clients 46 of the plurality of user terminals. In this case, it is not preferable to use all the plurality of viewing/schedule information items for calculating audience ratings and the like because the number of users viewing a program and the like are counted doubly.

Thus, viewing information items and the like, which are transmitted from the user terminals 2 having the same user ID as that of viewing/schedule information already included in statistical data of the statistical data DB 62 (hereinafter referred to as "used viewing/schedule information" whenever applicable), and in which only their actual viewing dates/times are the same or their actual viewing "times" are slightly different, are determined invalid in step S54 to be excluded from the statistical data of the statistical data DB 62.

It should be noted that it may be configured such that not only a plurality of viewing/schedule information items transmitted from the information update clients 46 in a case where the users are viewing, e.g., a live program, but also a plurality of viewing/schedule information items transmitted from the information update clients 46 in a case where, e.g., the users view a recorded program by repeated playback are determined invalid in step S54 to be excluded from the statistical data of the statistical data DB 62, unless such a plurality of viewing/schedule information items are viewing/schedule information first included in the statistical data of the statistical data DB 62.

In a case where it is determined in step S54 that viewing/schedule information is valid, the information aggregation server 54 proceeds to step S55 to include the viewing/schedule information in the statistical data already registered in the statistical data DB 62 for aggregation, registers the resulting new statistical data in the statistical data DB 62, and thereafter terminates the process.

On the other hand, in a case where it is determined in step S54 that viewing/schedule information is not valid, the information aggregation server 54 skips step S55 to terminate the process. Therefore, in this case, the viewing/schedule information transmitted to the information gathering server 54 from the information update client 46 is not used for aggregating the statistical data registered in the statistical data DB 62.

As described above, upon reception of viewing/schedule information from the users, the information aggregation server 54 updates the user-specific DB 61 and the statistical data DB 62 on the basis of the viewing/schedule information. Therefore, the contents of the user-specific DB 61 and the statistical data DB 62 basically have the latest viewing/schedule information reflected at all times.

Figure 17:
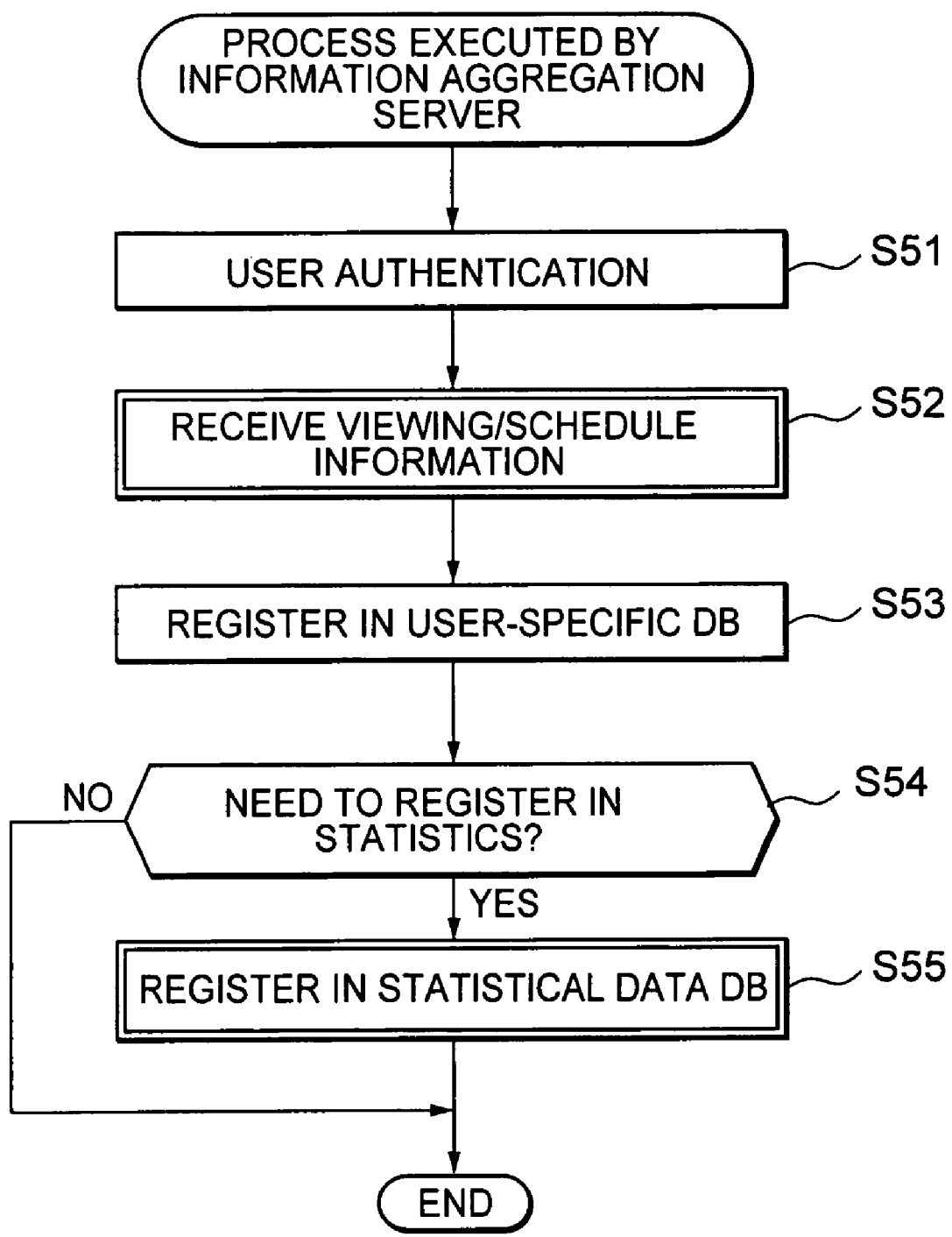
FIG. 17 is a flowchart explaining a process performed by an information aggregation server 54.
Figure 18:
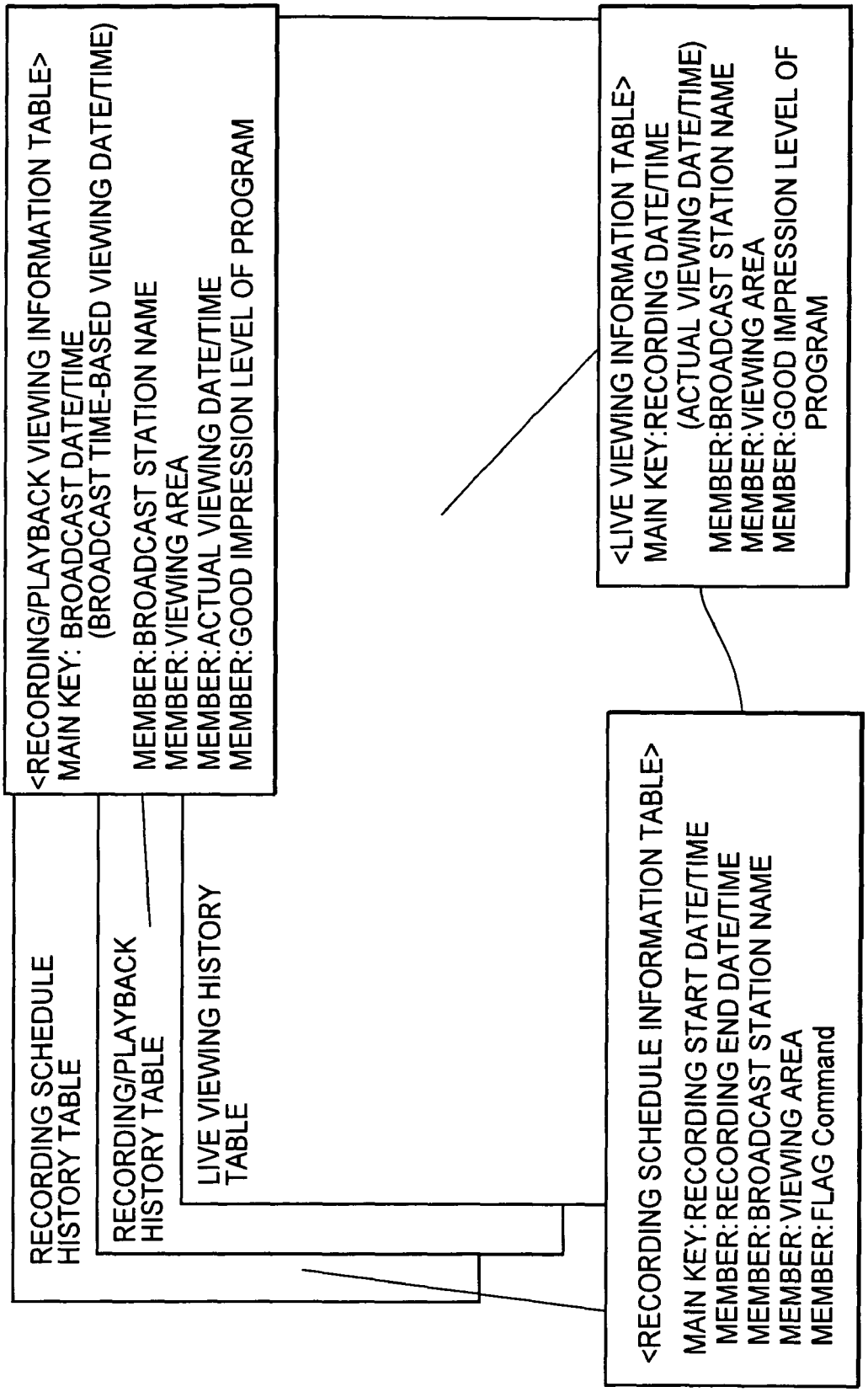
FIG. 18 is a diagram showing a live viewing history table, a recording/playback history table, and a recording schedule history table.

Next, FIG. 18 shows tables stored in the user-specific DB 61 in which viewing/schedule information is registered in step S53 of FIG. 17.

The user-specific DB 61 provides tables for each user, to which a user ID of the user is added. There are three tables prepared for each user: a live viewing history table; a recording/playback history table; and a recording schedule history table.

Registered in the live viewing history table is viewing information transmitted as one of transmission codes, in which the flag Video Flag is set to "0" representing a live program (hereinafter referred to as "live program viewing information" whenever applicable). That is, registered are an actual viewing date/time, a broadcast station name, a viewing area, a good impression level in the viewing information as the transmission code shown in FIG. 11 above.

It should be noted that the live viewing history table has, e.g., an actual viewing date/time, a broadcast station name, a viewing area, a good impression level in viewing information registered in a row (or a column) as a record. Further, in the live viewing history table, an actual viewing date/time, which is one of members (items) of the viewing information, is registered as a main key for specifying the viewing information, and the rest of a broadcast station name, a viewing area, a good impression level are registered as mere members of the viewing information.

Registered in the recording/playback history table is viewing information transmitted as one of transmission codes, in which the flag Video Flag is set to "1" representing a recorded program (hereinafter referred to as "recorded program viewing information" whenever applicable). That is, registered are a broadcast time-based viewing date/time, a broadcast station name, a viewing area, an actual viewing date/time, a good impression level in the viewing information as the transmission code shown in FIG. 12 above.

It should be noted that the recording/playback history table has, e.g., a broadcast time-based viewing date/time, a broadcast station name, a viewing area, an actual viewing date/time, a good impression level in viewing information registered in a row (or a column) as a record. Further, in the recording/playback history table, a broadcast time-based viewing date/time, which is one of members of the viewing information, is registered as a main key for specifying the viewing information, and the rest of a broadcast station name, a viewing area, an actual viewing date/time, a good impression level are registered as mere members of the viewing information.

Registered in the recording schedule history table are a recording start date/time, a recording end date/time, a broadcast station name, a viewing area, a flag Command in schedule information transmitted as a transmission code shown in FIG. 16 above.

It should be noted that the recording schedule history table has, e.g., a recording start date/time, a recording end date/time, a broadcast station name, a viewing area, a flag Command in schedule information registered in a row (or a column) as a record. Further, in the recording schedule history table, a recording start date/time, which is one of members of the schedule information, is registered as a main key for specifying the schedule information, and the rest of a recording end date/time, a broadcast station name, a flag Command are registered as mere members of the schedule information.

In step S53 of FIG. 17, the information aggregation server 54 registers, by addition, the viewing/schedule information transmitted from the information update client 46 in one of the tables prepared for each user ID in the user-specific DB 61, i.e., for example, a table to which a user ID issued to a user of a user terminal 2 that transmitted the viewing/schedule information is added.

Therefore, viewing/schedule information represents a user action, such as a user having viewed a live program or a recorded program, or a user having made a recording schedule. Further, in the live viewing history table, the recording/ playback history table, and the recording schedule history table for each user in the user-specific DB 61, viewing/schedule information representing actions taken by the user is registered time-sequentially, so to speak, and thus it may be said that action history data representing a history of actions taken by the user is registered for each user in the user-specific DB 61.

Figure 19:
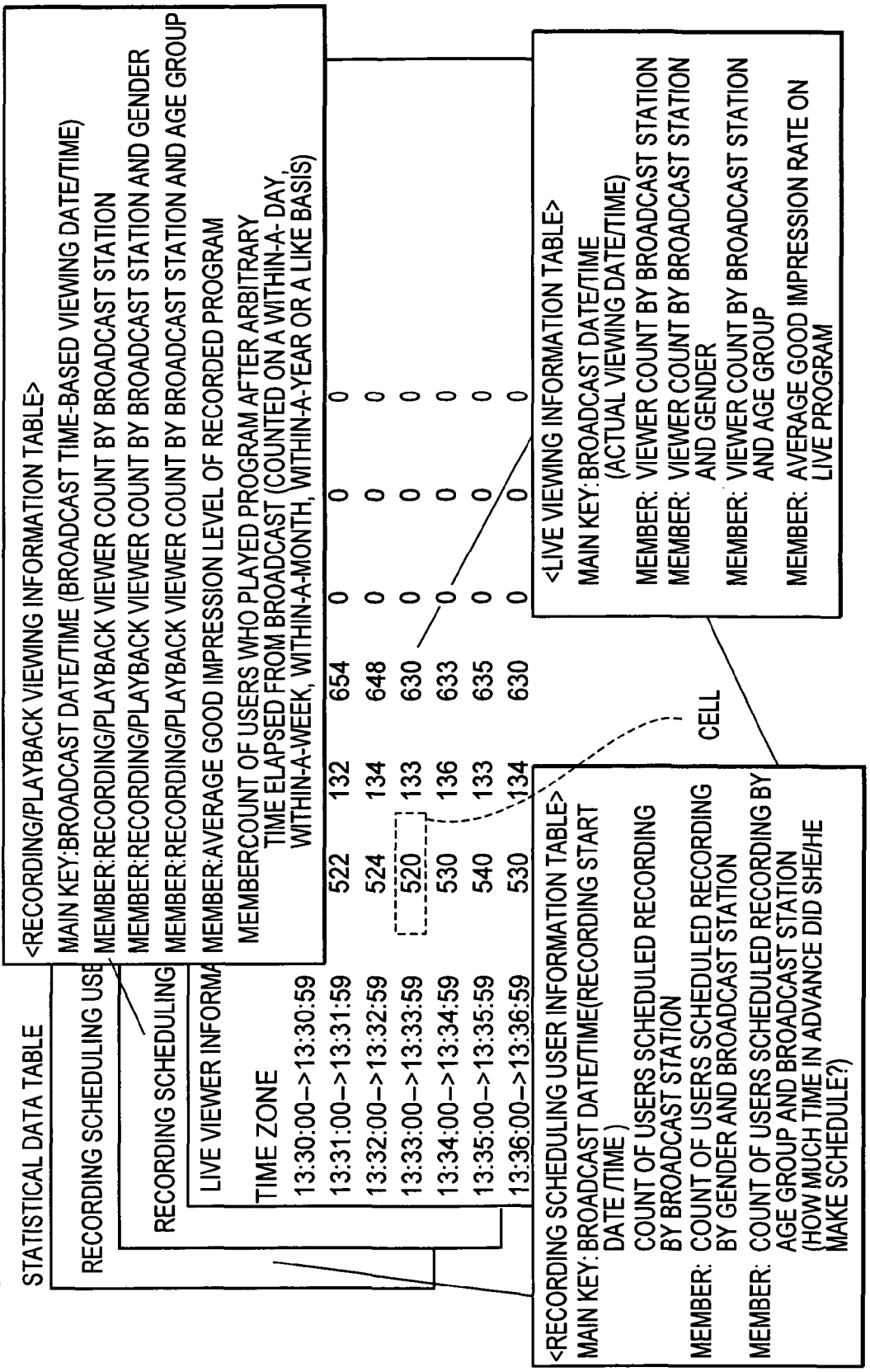
FIG. 19 is a diagram showing a live viewer information table, a recording/playback viewer information table, and a recording scheduling user information table.

Next, FIG. 19 shows an example configuration of the statistical data DB 62 for registering statistical data.

The statistical data DB 62 includes three tables: a live viewer information table; a recording/playback viewer information table; a recording scheduling user information table.

Here, the three tables, which are the live viewer information table, the recording/playback viewer information table, the recording scheduling user table, included in the statistical data DB 62 will hereinafter be referred to as "statistical data tables" whenever applicable.

Each of the statistical data tables has a table form in which, e.g., it is divided into times corresponding to predetermined time intervals called "time zones" in its vertical direction and into broadcast stations (their broadcast station names) in its horizontal direction. Therefore, each of boxes in the statistical data table is specified by one of rows corresponding to time zones into which the table is divided and one of columns corresponding to broadcast stations into which the table is divided.

Here, each box in each of the statistical data tables will hereinafter be referred to as "cell" when ever applicable.

It should be noted that in an embodiment of FIG. 19, a time zone equals one minute, but the time interval for defining a time zone is not limited to one minute. Alternatively, the time interval for defining a time zone is, e.g., synchronized with the waiting time provided in step S1-5 of FIG. 8.

As to cells in the live viewer information table of the statistical data tables, various aggregations are performed using live viewing information, and statistical data as the aggregation results are registered therein.

That is, the information aggregation server 54 designates a cell, as a spotlight cell, which is specified, on the basis of an actual viewing date/time and a broadcast station name in live viewing information, by a row corresponding to a time zone including the actual viewing date/time and by a column corresponding to a broadcast station represented by the broadcast station name in the live viewer information table, and obtains statistical data to be registered in the spotlight cell for registration in the spotlight cell.

Here, each of the cells of the live viewer information table has a plurality of members representing, for individual user attributes, the numbers of users who viewed a program broadcast by a broadcast station specified by the cell during a time zone specified by the cell. That is, the cell of the live viewer information table has, as members, the number of all the users (viewer count), the number of male users and the number of female users (viewer counts by gender), the number of users by age group who viewed the program broadcast by a broadcast station specified by the cell during a time zone specified by the cell (viewer counts by age group). Further, a cell of the live viewer information table also has, as a member, an average of good impression levels (an average of good impression levels on a live program) in live viewing information transmitted from users who viewed the program broadcast by a broadcast station specified by the cell during a time zone specified by the cell.

The information aggregation server 54 updates values of members of a spotlight cell on the basis of live viewing information. That is, as to a member "viewer count" of a spotlight cell, the information aggregation server 54 increments a value of the member "viewer count" by 1, and registers the value as a new value of the member "viewer count".

Here, it may be said that the value of the member "viewer count" of the spotlight cell updated in the above way is an aggregation result regarding the number of users who viewed a program broadcast by the broadcast station specified by the spotlight cell during the time zone specified by the spotlight cell.

The values of the members other than the member "viewer count" of the spotlight cell are also updated similarly.

It should be noted that in order to aggregate, e.g., members "viewer counts by gender" and "viewer counts by age group" of a spotlight cell, user attributes such as the gender and age of users of user terminals 2 that transmitted live viewing information must be available. The information aggregation server 54 recognizes these user attributes from user information registered in the user information/authentication information DB 63 at the time of their user registration.

As to cells in the recording/playback viewer information table of the statistical data tables, various aggregations are performed using recording viewing information, and statistical data as the aggregation results are registered therein.

That is, the information aggregation server 54 designates a cell, as a spotlight cell, which is specified, on the basis of a broadcast time-based viewing date/time and a broadcast station name in recording viewing information, by a row corresponding to a time zone including the broadcast time-based viewing date/time and by a column corresponding to a broadcast station represented by the broadcast station name in the recording/playback viewer information table, and obtains statistical data to be registered in the spotlight cell for registration in the spotlight cell.

Here, each of the cells of the recording/playback viewer information table has a plurality of members representing, for individual user attributes, the numbers of users who recorded a program broadcast by a broadcast station specified by the cell during a time zone specified by the cell and who later viewed the recorded program by playback. That is, the cell of the recording/playback viewer information table has, as members, the number of all the users (recording/playback viewer count), the number of male users and the number of female users (recording/playback viewer counts by gender), the numbers of users by age group who viewed the recorded program by playback (recording/playback viewer counts by age group), similarly to a cell of the live viewer information table. Further, a cell of the recording/playback viewer information table also has, as a member, an average of good impression levels (an average of good impression levels on a recorded program) in recording viewing information transmitted from users, similarly to a cell of the live viewer information table.

The information aggregation server 54 also updates values of members of a spotlight cell on the basis of recording viewing information, as to the recording/playback viewer information table, similarly to the case of the live viewer information table.

Here, a cell of the recording/playback viewer information table further has, as a member, the numbers of users which are obtained by classifying the users who recorded a program broadcast by a broadcast station specified by the cell during a time zone specified by the cell and who later viewed the recorded program by playback, according to time periods from its recording to playback.

It should be noted that in order to obtain the numbers of users which are obtained by classifying the users who recorded a program and later viewed the recorded program by playback, according to time periods from the recording of the program to its playback, a timing at which the program was recorded and a timing at which the playback was performed must be available. The information aggregation server 54 recognizes the timing at which the program was recorded from the broadcast time-based viewing date/time in the recording viewing information and the timing at which the playback was performed from the actual viewing date/time in the recording viewing information.

Further, as the time periods from recording of a program to its playback may be, e.g., within a day, within a week, within a month, within a year, or the like.

As to cells in the recording scheduling user information table of the statistical data tables, various aggregations are performed using schedule information, and statistical data as the aggregation results are registered therein.

That is, the information aggregation server 54 designates a cell, as a spotlight cell, which is specified, on the basis of a recording start date/time and a recording end date/time, and a broadcast station name in schedule information, by a row corresponding to a time zone included in a period from the recording start date/time to the recording end date/time, and by a column corresponding to a broadcast station represented by the broadcast station name in the recording scheduling user information table, and obtains statistical data to be registered in the spotlight cell for registration in the spotlight cell. Therefore, in a case where a time zone has an interval equal to, e.g., one minute and a recording start date/time and a recording end date/time in schedule information are, e.g., 13:00 (thirteen hundred hours) and 13:59, cells extending over 60 rows corresponding to time zones included in a period from 13:00 to 13:59 are designated as spotlight cells, in which statistical data are registered.

Here, each of the cells of the recording scheduling user information table has a plurality of members representing, for individual user attributes, the numbers of users who scheduled for recording a program broadcast by a broadcast station specified by the cell during a time zone specified by the cell. That is, the cell of the recording scheduling user information table also has, as members, the number of all the users (count of users scheduled recording), the number of male users and the number of female users (counts of users scheduled recording by gender), the numbers of users by age group who scheduled for recording a program broadcast by a broadcast station specified by the cell during a time zone specified by the cell (counts of users scheduled recording by age group), similarly to a cell of the live viewer information table.

The information aggregation server 54 also updates values of members of a spotlight cell on the basis of schedule information, as to the recording scheduling user information table, similarly to the case of the live viewer information table.

That is, as to the recording scheduling user information table, taking the "count of users scheduled recording" as an example, in a case where the flag Command in schedule information is set to "1" representing a recording schedule, a value of the "count of users scheduled recording" is incremented by 1, similarly to the case of the "viewer count" in the live viewer information table mentioned above. Therefore, in a case where, e.g., a time zone has an interval equal to one minute and a recording start date/time and a recording end date/time in schedule information are 13:00 and 13:59 as mentioned above, cells extending over 60 rows corresponding to time zones included in a period from 13:00 to 13:59 are designated as spotlight cells, and values of the "count of users scheduled recordings" of the respective 60 spotlight cells are incremented by 1. Here, it may be considered that the updating of the "count of users scheduled recording" values such as mentioned above would be tantamount to counting the number of viewers who will view the program specified by the schedule information in the future.

As to the recording scheduling user information table, taking the "count of users scheduled recording" as an example, in a case where the flag Command in schedule information is set to "1" representing a recording schedule, a value of the "count of users scheduled recording" is incremented by 1, similarly to the case of the "viewer count" in the live viewer information table mentioned above, but in a case where the flag Command is set to "0" representing cancellation of a recording schedule, a value of the "count of users scheduled recording" is decremented by 1.

Here, the cell of the recording scheduling user information table further may include, as a member, the numbers of users which are obtained by classifying the users who scheduled for recording a program broadcast by a broadcast station specified by the cell during a time zone specified by the cell, according to time periods from the scheduling to the broadcast of the program.

It should be noted that in order to obtain the numbers of users which are obtained by classifying the users who scheduled a program for recording, according to time periods from the scheduling of the program to its broadcast, a date/time at which the program was scheduled for recording and a broadcast time of the program must be available. The broadcast time of the program can be recognized from a recording start date/time (or a recording end date/time) in schedule information, but the date/time at which the program was scheduled for recording itself must be transmitted to the server system 4 from the user terminal 2, e.g., as included in the schedule information. However, as the date/time at which the program was scheduled for recording itself, e.g., a date/time at which the information aggregation server 54 received the schedule information may be adopted. In this case, it is not necessary to include the date/time at which the program was scheduled for recording itself in the schedule information.

According to the numbers of users which are obtained by classifying the users who scheduled for recording a program, according to time periods from the scheduling of the program to its broadcast, the information aggregation server 54 can recognize how many users scheduled the program for recording how much time in advance.

Here, since the "viewer count" registered in the live viewer information table equals the number of users who viewed the program during its broadcast time, it may be said that the "viewer count" is statistical data representing a degree of user interest in the program.

Further, the "recording/playback viewer count" registered in the recording/playback viewer information table equals the number of users who recorded a program and further viewed the recorded program by playback, and thus also the number of users who wish to view the program even by taking the trouble of recording the program. Therefore, it may likewise be said that the "recording/playback viewer count" is also statistical data representing a degree of user interest in the program.

Furthermore, the "count of users scheduled recording" registered in the recording scheduling user information table equals the number of users who scheduled a program for recording, and thus also the number of users who recorded the program and might view the program later. Therefore, it may likewise be said that the "count of users scheduled recording" is also statistical data representing a degree of user interest in the program.

It should be noted that each of the live viewing history table, the recording/playback history table, and the recording schedule history table for each user in the user-specific DB 61 of FIG. 18 may also adopt a format in which, e.g., it is divided into time zones in a vertical direction and also into broadcast stations in a horizontal direction, similarly to the statistical data tables in the statistical data DB 62 shown in FIG. 19. In this case, the information aggregation server 54 may designate, as a spotlight cell, a cell specified by a row corresponding to a time zone including an actual viewing date/time, a row corresponding to a time zone including a broadcast time-based viewing date/time, or a row corresponding to a time zone included in a period from a recording start date/time to a recording end date/time, in viewing/schedule information transmitted from the user terminal 2, and by a column corresponding to a broadcast station represented by a broadcast station name in the viewing/schedule information, and may register other members (e.g., a good impression level, a viewing area, a recording end date/time) in the viewing/schedule information, in the spotlight cell.

Referring next to a flowchart of FIG. 20, a process performed by the program information page creation server 55 (FIG. 6) of the server system 4 will be described.

In the server system 4, when having received a request for a web page (hereinafter referred to as "EPG page" whenever applicable) in which an EPG is displayed from the web browser 42 of the user terminal 2 via the network 3 that is the Internet, the web server 52 requests the program information page creation server 55 to generate (create) an EPG page.

When having received a request for generating an EPG page from the web server 52, the program information page creation server 55 starts the process.

That is, in step S61, the program information page creation server 55 performs user authentication (personal authentication).

Here, user authentication in step S61 is performed similarly to the case in, e.g., step S51 of FIG. 17. That is, assuming that the user of the user terminal 2 has already made a user registration with the server system 4, user authentication information issued to the user is recorded on the HD 15 in the user terminal 2. In the server system 4, user authentication information is stored in the user information/authentication information DB 63 in a manner corresponding to user information as user information/authentication information. The web browser 42 transmits the user authentication information issued from the server system 4 as mentioned above, when making a request to the web server 52 for an EPG page.

In step S51, the information aggregation server 54 performs user authentication by checking coincidence between the user information transmitted from the information update client 46 and the user authentication information stored in the user information/authentication information DB 63.

It should be noted that in a case where user authentication is not successful in the user authentication of step S61, i.e., in a case where the user authentication information is not transmitted from the web browser 42 or in a case where the user authentication information is transmitted but user authentication information coinciding with the user authentication information is not stored in the user information/authentication information DB 63, the program information page creation server 55, e.g., terminates the process, and rejects access from the web browser 42 thereafter.

However, in the case where user authentication is not successful, the program information page creation server 55 may resume the process after it transmits a message prompting a user registration to the user terminal 2 and the user of the user terminal 2 has made a user registration in response to the message, for example.

Further, in the case where user authentication is not successful, the program information page creation server 55 may create a conventionally provided EPG page in which, e.g., an EPG including only program guide data and the like are displayed, for transmission to the web browser 42 via the web server 52. In this case, an EPG page provided to a user having made a user registration is different from an EPG page provided to a user not having made a user registration. Therefore, services provided may be differentiated by whether a user registration is made or not.

Here, the program information page creation server 55 may provide an EPG page created in step S63 to be described later to all users irrespective of whether or not they have made their user registration.

After the user authentication is performed in step S61, the program information page creation server 55 proceeds to step S62 to set a broadcasting period.

That is, the web browser 42 transmits a broadcasting period (hereinafter referred to as "requested broadcasting period" whenever applicable) of a program for which program guide data is desired, e.g., when making a request to the web server 52 for an EPG page. The program information page creation server 55 thus sets programs to be broadcast during the desired broadcasting period thus transmitted from the web browser 42, as an object for generating an EPG.

It should be noted that the web browser 42 is not necessarily required to transmit a desired broadcasting period. In a case where a desired broadcasting period is not transmitted from the web browser 42, the program information page creation server 55 designates, in step S62, a current date (today) as a desired broadcasting period, and sets programs to be broadcast during the desired broadcasting period as an object for generating an EPG.

After step S62, the program information page creation server 55 proceeds to step S63 to generate an EPG for the programs to be broadcast during the desired broadcasting period, and to further generate an EPG page in which the EPG is placed. In describing the EPG page, HTML (Hyper Text Markup Language) is used, which is generally adopted in the WWW constructed on the Internet.

After having generated the EPG page in step S63, the program information page creation server 55 proceeds to step S64 to transmit the EPG page to the web browser 42 via the web server 52 and the network 3, and thereafter terminates the process.

In the web browser 42, the EPG page transmitted from the server system 4 in the above way is received for display.

Referring next to a flowchart of FIG. 21, a process of generating the EPG page performed in step S63 of FIG. 20 will be described.

First in step S71, the program information page creation server 55 recognizes the programs to be broadcast during the desired broadcasting period and acquires program guide data on the programs by reading from the EPG DB 64.

The program information page creation server 55 proceeds to step S72 to generate a screen of an EPG layer to be described later using the program guide data acquired in step S71, and then proceeds to step S73. In step S73, the program information page creation server 55 generates a screen of a program progress layer to be described later, and then proceeds to step S74. In step S74, the program information page creation server 55 generates a screen of a statistical data layer to be described later using statistical data registered in the statistical data DB 62, i.e., statistical data registered in the live viewer information table, the recording/playback viewer information table, and the recording scheduling user information table shown in FIG. 19 above, and then proceeds to step S75. In step S75, the program information page creation server 55 generates a screen of a user-specific history data layer to be described later for each user, using action history data for each user registered in the user-specific DB 61, i.e., data registered in the live viewing history table, the recording/playback history table, and the recording schedule history table for each user shown in FIG. 18 above (action history data), and then proceeds to step S76. In step S76, the program information page creation server 55 generates a screen of a controller layer to be described later for each user, using operation data linked to command files registered in the EPG DB 64, and then proceeds to step S77.

In step S77, the program information page creation server 55 superimposes the screens of the EPG layer, program progress layer, statistical data layer, user-specific history data layer, controller layer to generate an EPG page, and thereafter terminate the EPG page generating process.

It should be noted that the screens of EPG layer, program progress layer, statistical data layer, user-specific history data layer, controller layer are superimposed after they are generated in the above-mentioned case. Alternatively, each of the screens of EPG layer, program progress layer, statistical data layer, user-specific history data layer, controller layer may be superimposed one after another upon generation.

Further, of the screens of the EPG layer, program progress layer, statistical data layer, user-specific history data layer, controller layer, the screens of the EPG layer, program progress layer, statistical data layer may be shared among individual users. Therefore, the screens of the EPG layer, program progress layer, statistical data layer may not necessarily be generated every time the user accesses the program information page creation server 55. That is, in a case where the screens of the EPG layer, program progress layer, statistical data layer have already been generated and cached by access in the past from a different user (or the same user), the program information page creation server 55 may generate an EPG page using the cached screens of the EPG layer, program progress layer, statistical data layer.

Here, the EPG layer screen (further the program guide data acquired in step S71 and used for its generation) may be cached for, e.g., one day. That is, the server system 4 may cache an EPG layer screen generated for a first user who accessed the server system 4 that day, to thereafter use the cached EPG layer screen for the whole day. Further, the program progress layer and statistical data layer screens may be cached for, e.g., a period equal to the time interval set as a time zone in the statistical data table of FIG. 19 mentioned above. Statistical data in the statistical data table would not have to be newly calculated for the time interval set as a time zone.

Figure 21:
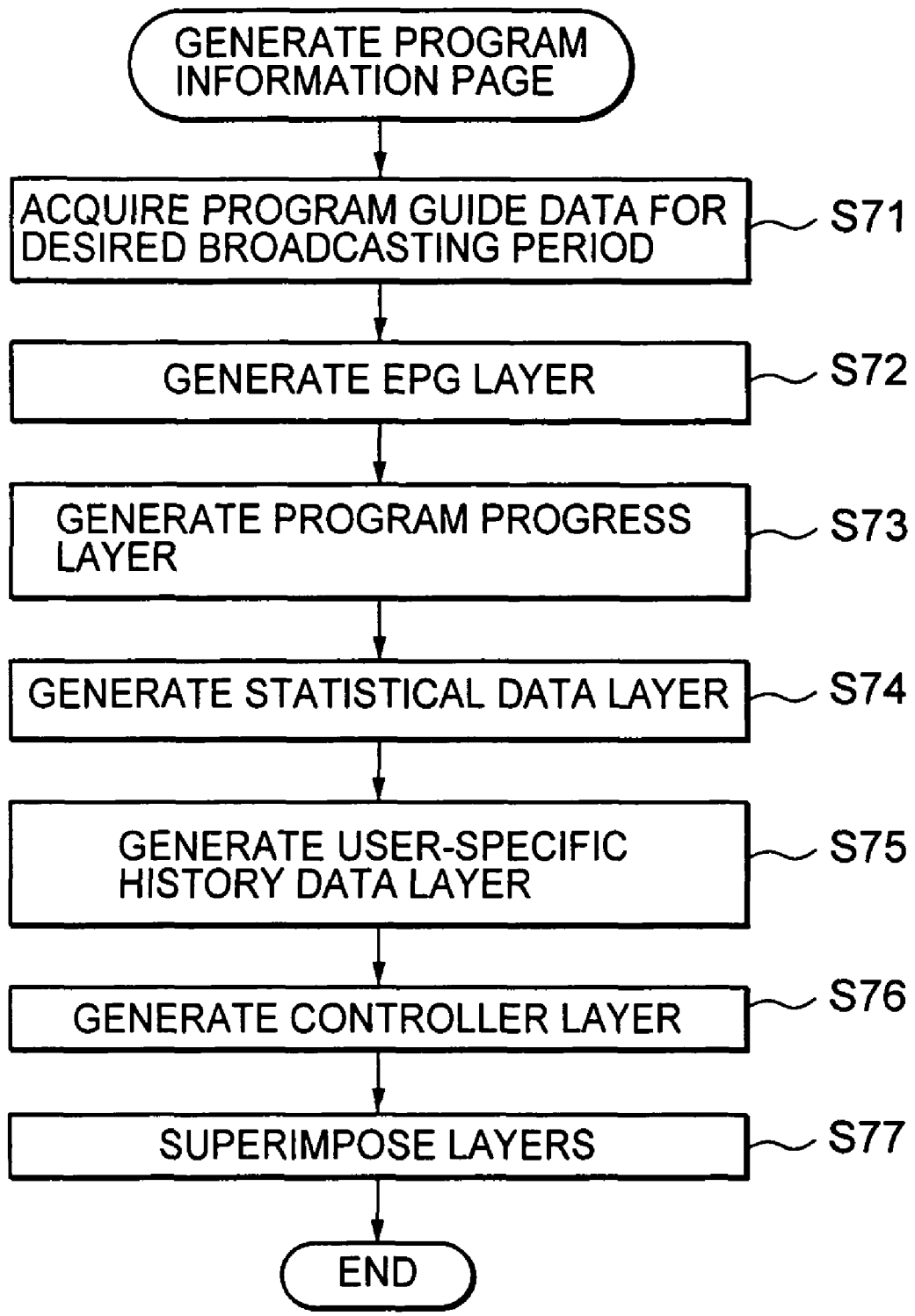
FIG. 21 is a flowchart explaining a process of generating a program information page.
Figure 22:
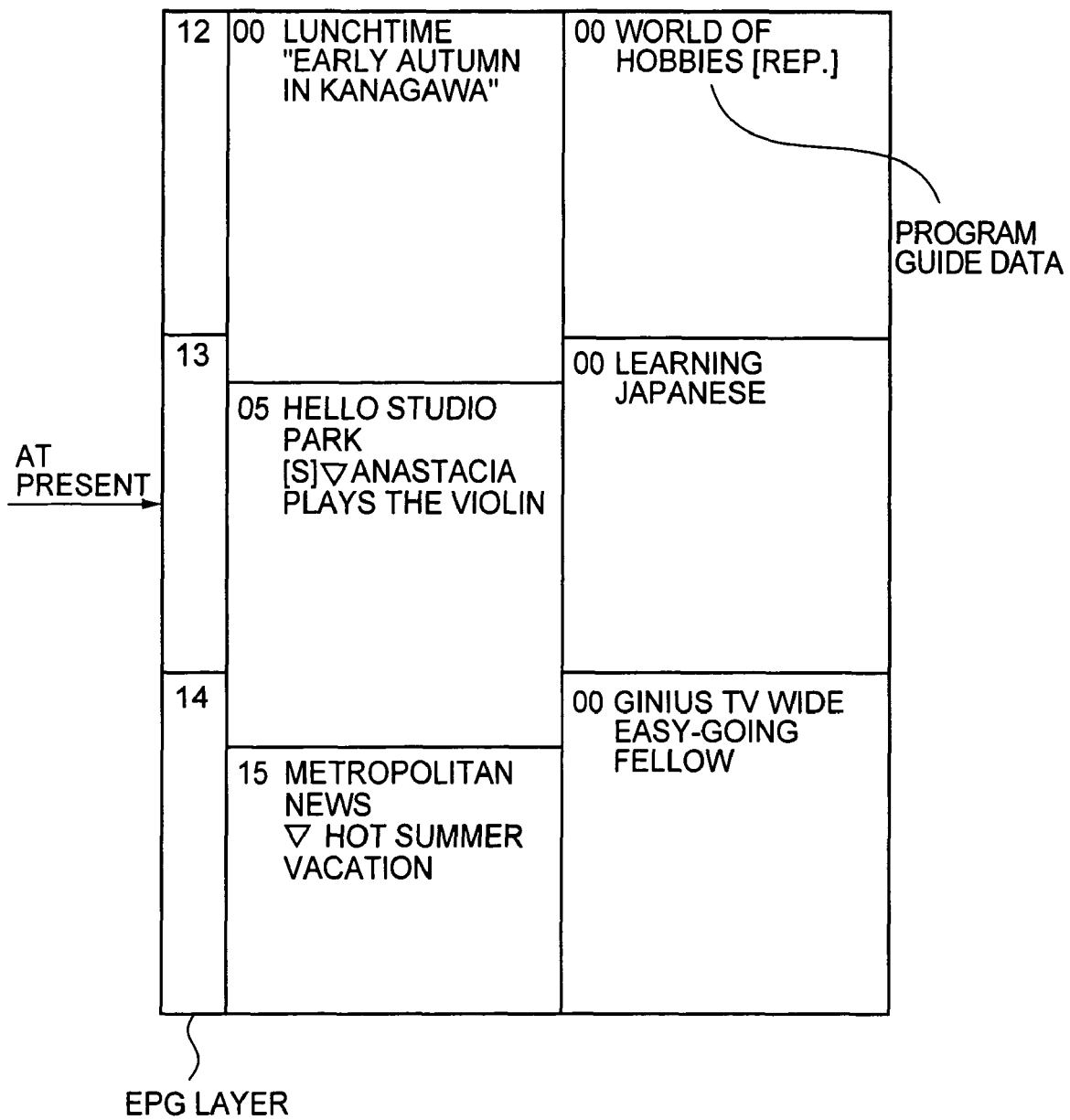
FIG. 22 is a diagram showing a screen of an EPG layer.

Next, FIG. 22 schematically shows a screen of the EPG layer generated in step S72 of FIG. 21.

The EPG layer screen is generated by indicating times in a vertical direction and broadcast stations in a horizontal direction, and placing, in a box of a program specified by a time and a broadcast station at and by which the program is broadcast, program guide data on the program.

Figure 23:
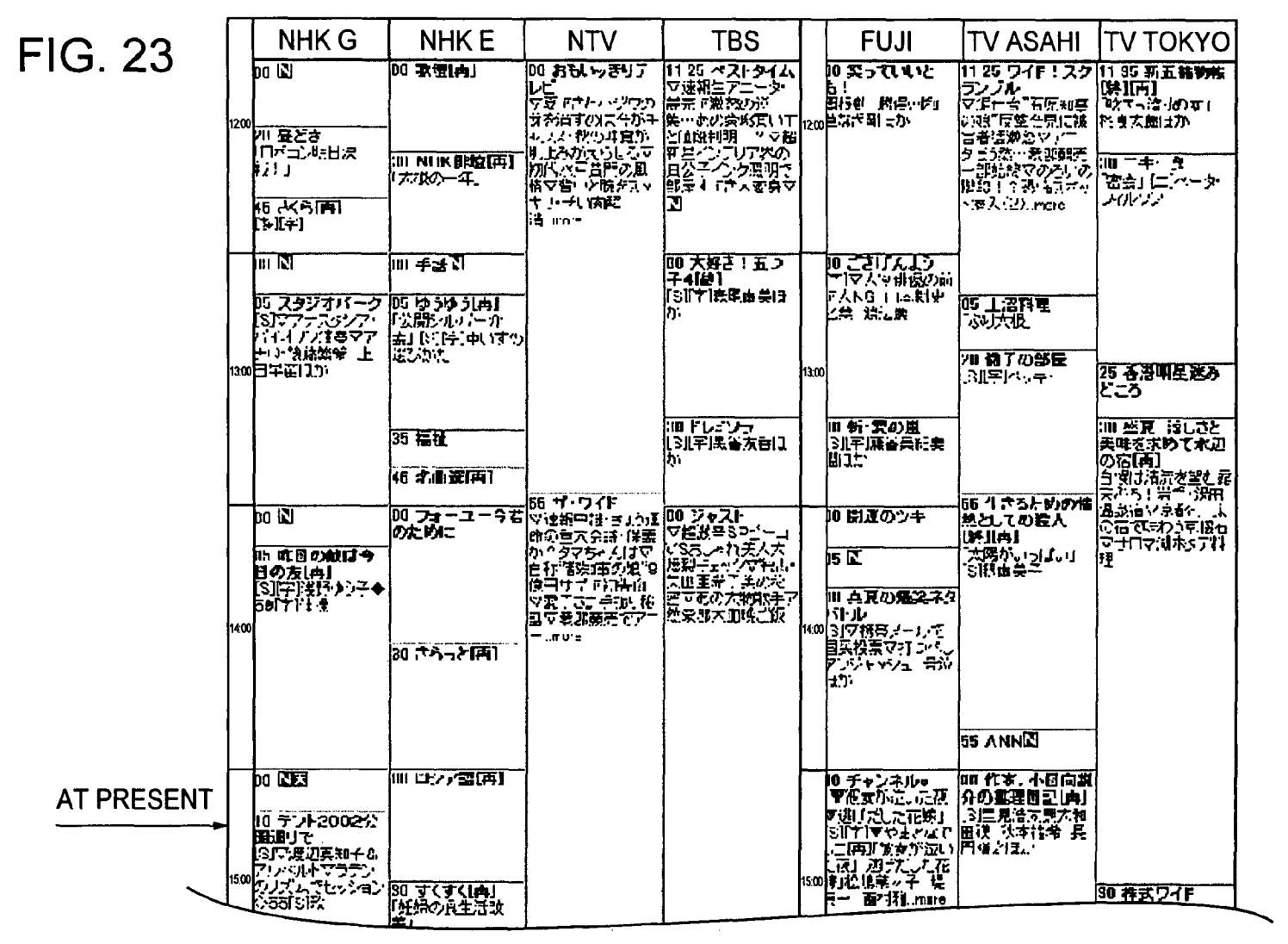

Here, an actual image of the EPG layer screen is shown in FIG. 23.

Figure 24:
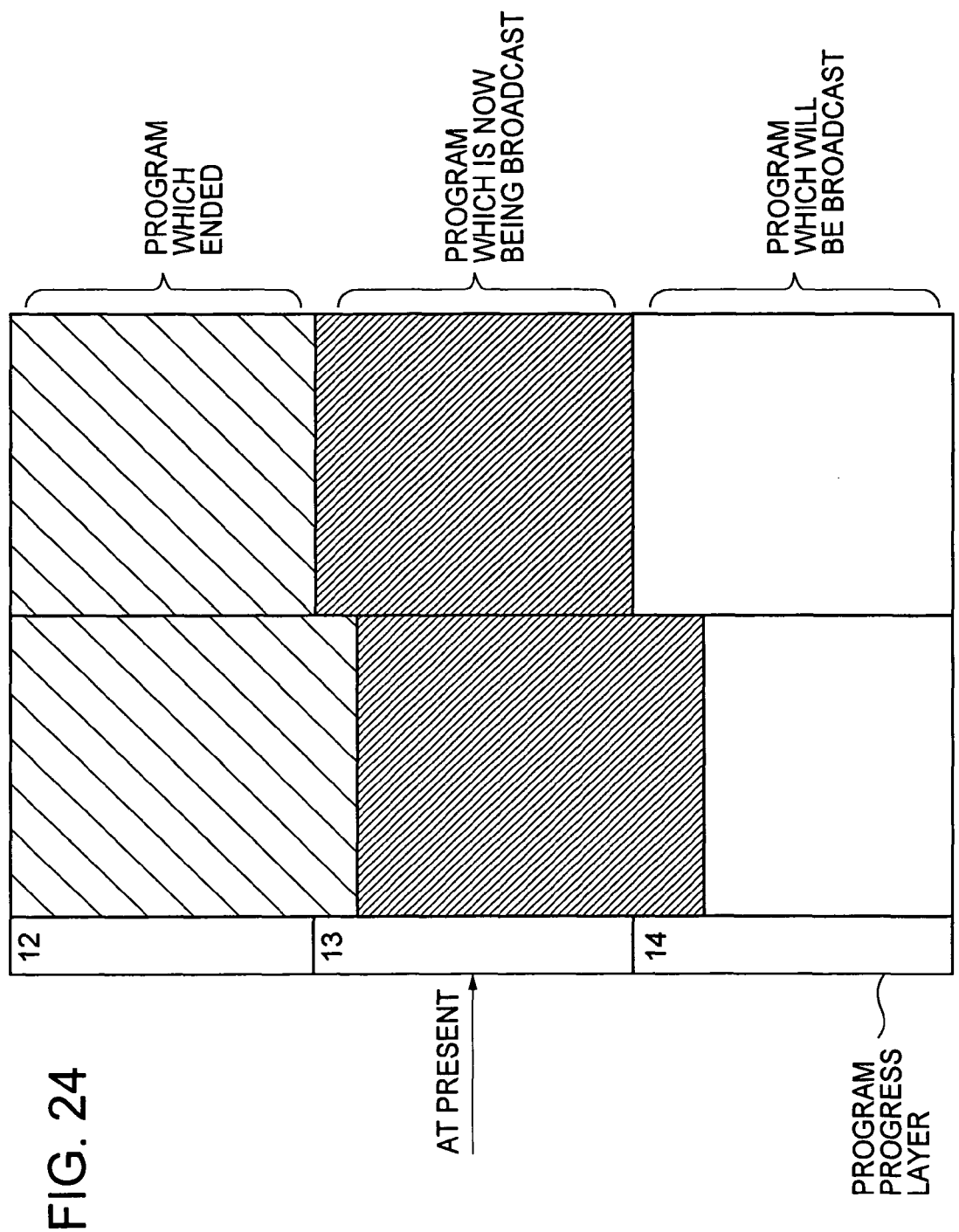
FIG. 24 is a diagram showing a screen of a program progress layer.

Next, FIG. 24 schematically shows a screen of the program progress layer generated in step S73 of FIG. 21.

The program progress layer screen adopts the same layout as the EPG layer screen, in which, e.g., times are indicated in a vertical direction and broadcast stations are indicated in a horizontal direction, and is generated such that a box of a program specified by a time and a broadcast station at and by which the program is broadcast is displayed in different manners according to progress statuses (broadcasting statuses) of the programs.

That is, in an embodiment of FIG. 24, boxes of programs are formed so as to have different display modes for individual programs: a program which ended; a program which is now being broadcast; a program which is not broadcast yet.

In FIG. 24, boxes of programs which ended are thinly shaded, assuming that a current time is around 13:30. Further, in FIG. 24, boxes of programs which are now being broadcast are thickly shaded, and boxes of programs which are not broadcast yet are displayed without shading.

Figure 25:
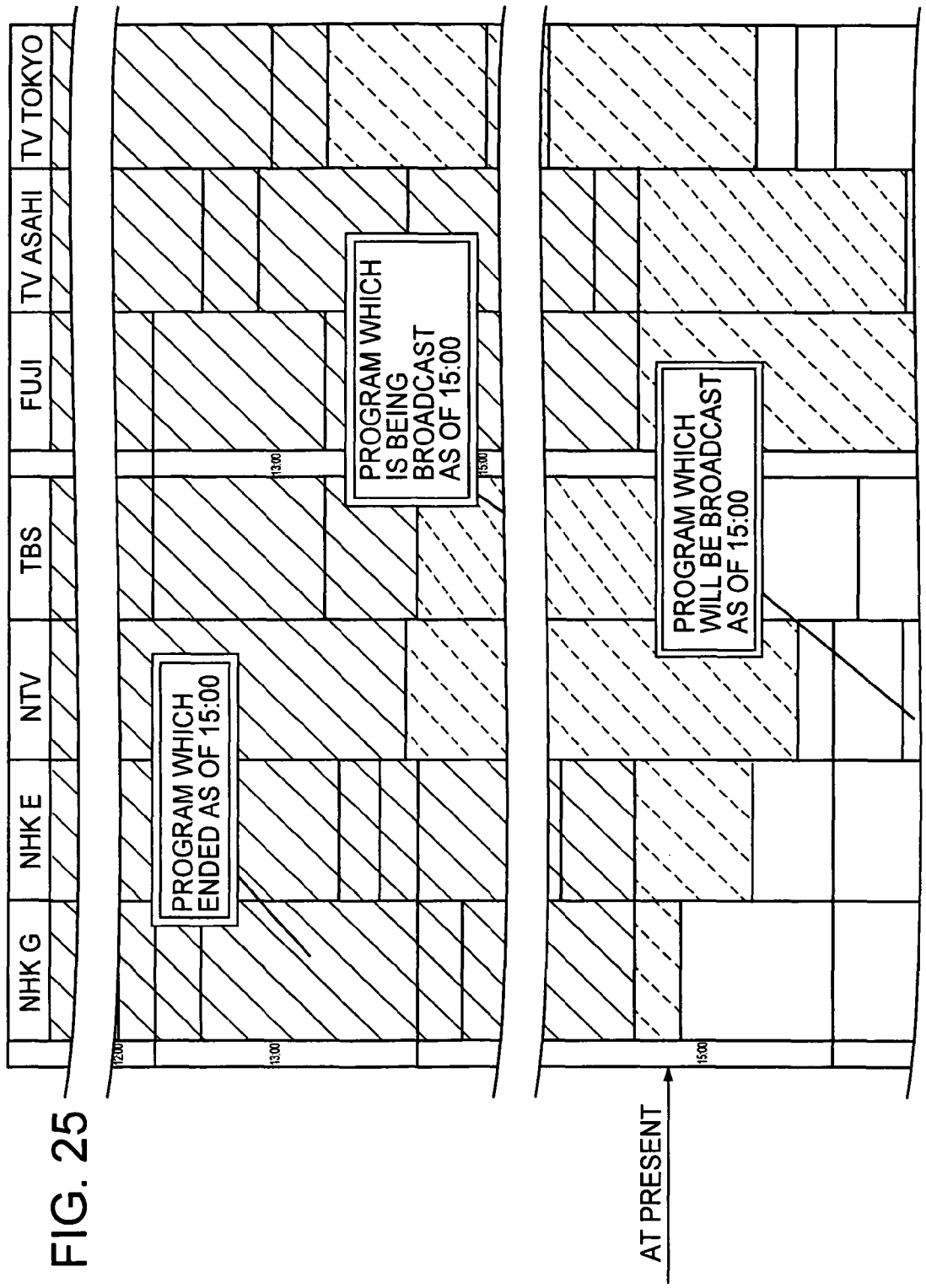
FIG. 25 is a diagram showing a screen of the program proceeding layer.

Here, an actual image of the program progress layer screen is shown in FIG. 25. In FIG. 25, assuming that a current time is 15:00, boxes of programs are marked with patterns corresponding to their broadcasting statuses.

It should be noted that boxes of programs which ended, programs which are now being broadcast, programs which will be broadcast may not only be shaded or patterned differently, but also be, e.g., colored differently.

Figure 26:
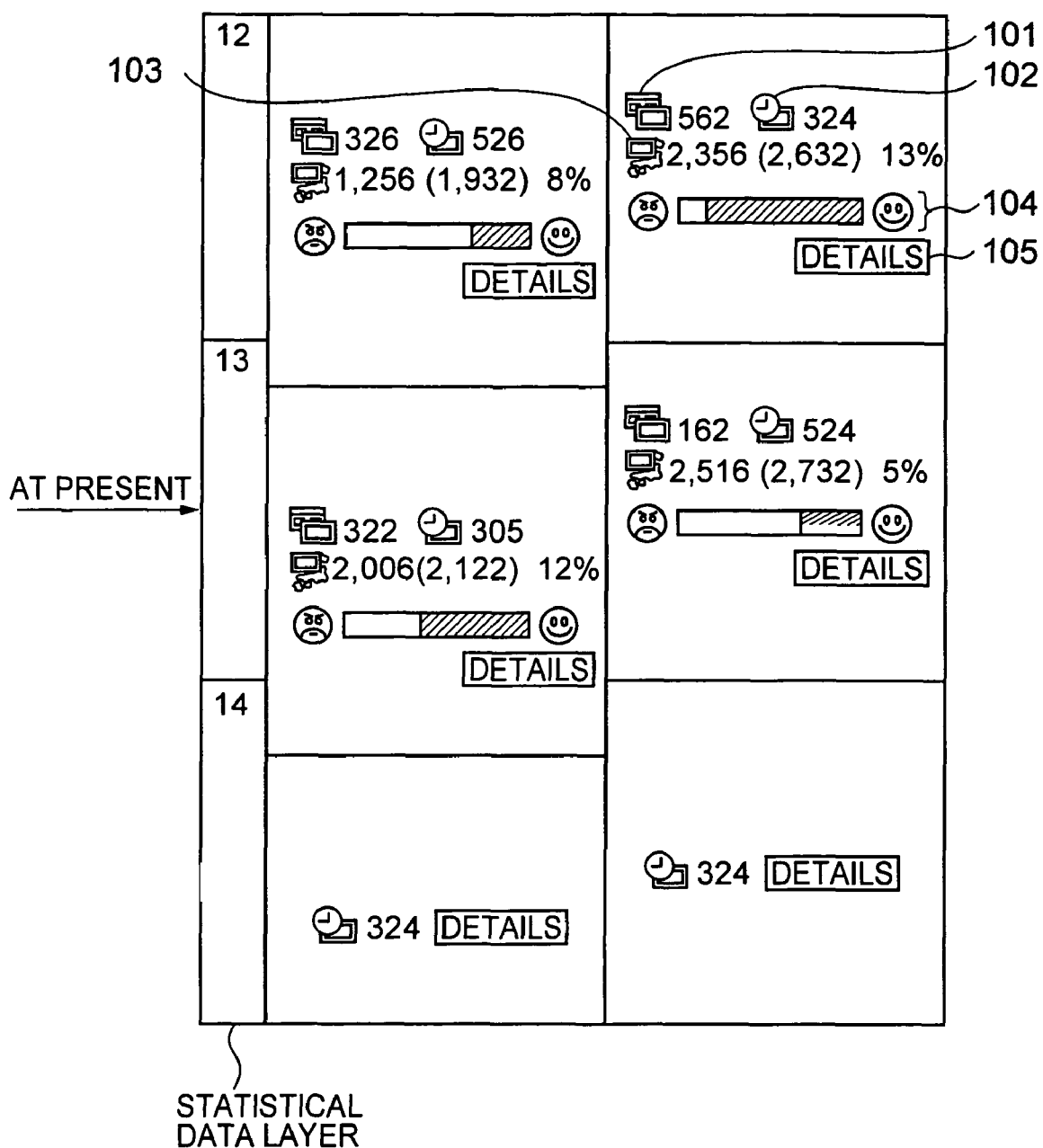
FIG. 26 is a diagram showing a screen of a statistical data layer.

Next, FIG. 26 schematically shows a screen of the statistical data layer generated in step S74 of FIG. 21.

The statistical data layer screen adopts the same layout as the EPG layer screen, in which, e.g., times are indicated in a vertical direction and broadcast stations are indicated in a horizontal direction, and is generated by placing statistical data and the like aggregated for a program in a box of the program specified by a time and a broadcast station at and by which the program is broadcast.

That is, placed in a box of a program on the statistical data layer screen is necessary one(s) of, e.g., a recording/playback viewer count icon 101, an icon 102 for count of users scheduled recording, a live viewer icon 103, a good impression index icon 104, and a link display "Details" 105 which is a textual indication "Details" linked to a web page having more detailed statistical data.

The recording/playback viewer count icon 101 is placed together with an average of the numbers of users (recording/playback viewer counts) who recorded a program corresponding to a box in which the recording/playback viewer count icon 101 is placed and who viewed the recorded program by playback. Here, in order to record a program, at least broadcast of the program must be started. Therefore, the recording/playback viewer count icon 101 may be placed in a box of a program whose broadcast is started, but cannot be placed in a box of a program whose broadcast is not started.

The icon 102 for count of users scheduled recording is placed together with the numbers of users (counts of users scheduled recording) who scheduled for recording a program corresponding to a box in which the icon 102 for count of users scheduled recording is placed. Therefore, the icon 102 for count of users scheduled recording may be placed in boxes of any programs.

The live viewer icon 103 is placed together with statistical data (live viewer data) on users who viewed a program corresponding to a box in which the live viewer icon 103 is placed, during its broadcast. Therefore, the live viewer icon 103 may be placed in a box of a program whose broadcast is started, but cannot be placed in a box of a program whose broadcast is not started.

Here, in an embodiment of FIG. 26, a live viewer icon 103 is configured to be placed together with three kinds of statistical data on users who viewed a program during its broadcast. Placed to the right of the live viewer icon 103 is an average of the numbers of users (average viewer count) who viewed (are viewing) the program. Placed to the right of the average is a maximum of the numbers of users (maximum viewer count) who viewed (are viewing) the program in parentheses. And, placed to the right of the maximum is an audience rating in percentage.

A good impression index icon 104 represents a degree of the interestingness or boringness as to a program (hereinafter referred to as "good impression index" whenever applicable) corresponding to a box in which the good impression index icon 104 is placed, which is indicated in terms of a good impression level on the program. That is, placed to the left of the good impression index icon 104 is a character representing that the program is boring, and placed to the right is a character representing that the program is interesting, with a bar representing a degree of how the program is interesting or boring (good impression index) placed between both characters. The bar is divided into two parts at a predetermined position to the right and to the left, and the more to the left or to the right the position is, the less or more interesting the program is, respectively.

It should be noted that a method of obtaining the recording/playback viewer count placed together with the recording/playback viewer count icon 101, the count of users scheduled recording placed together with the icon 102 for count of users scheduled recording, and the live viewer data placed together with the live viewer icon 103, and the good impression index represented by the good impression index icon 104 will be described later.

Further, in a case where the link display "Details" 105 displayed on the statistical data layer screen is clicked on the web browser 42, the program information page creation server 55 generates a web page for a more detailed aggregate statistical data (hereinafter referred to as "detailed viewing information page" whenever applicable) for transmission to the web browser 42. Details of the detailed viewing information page will also be described later.

Figure 27:
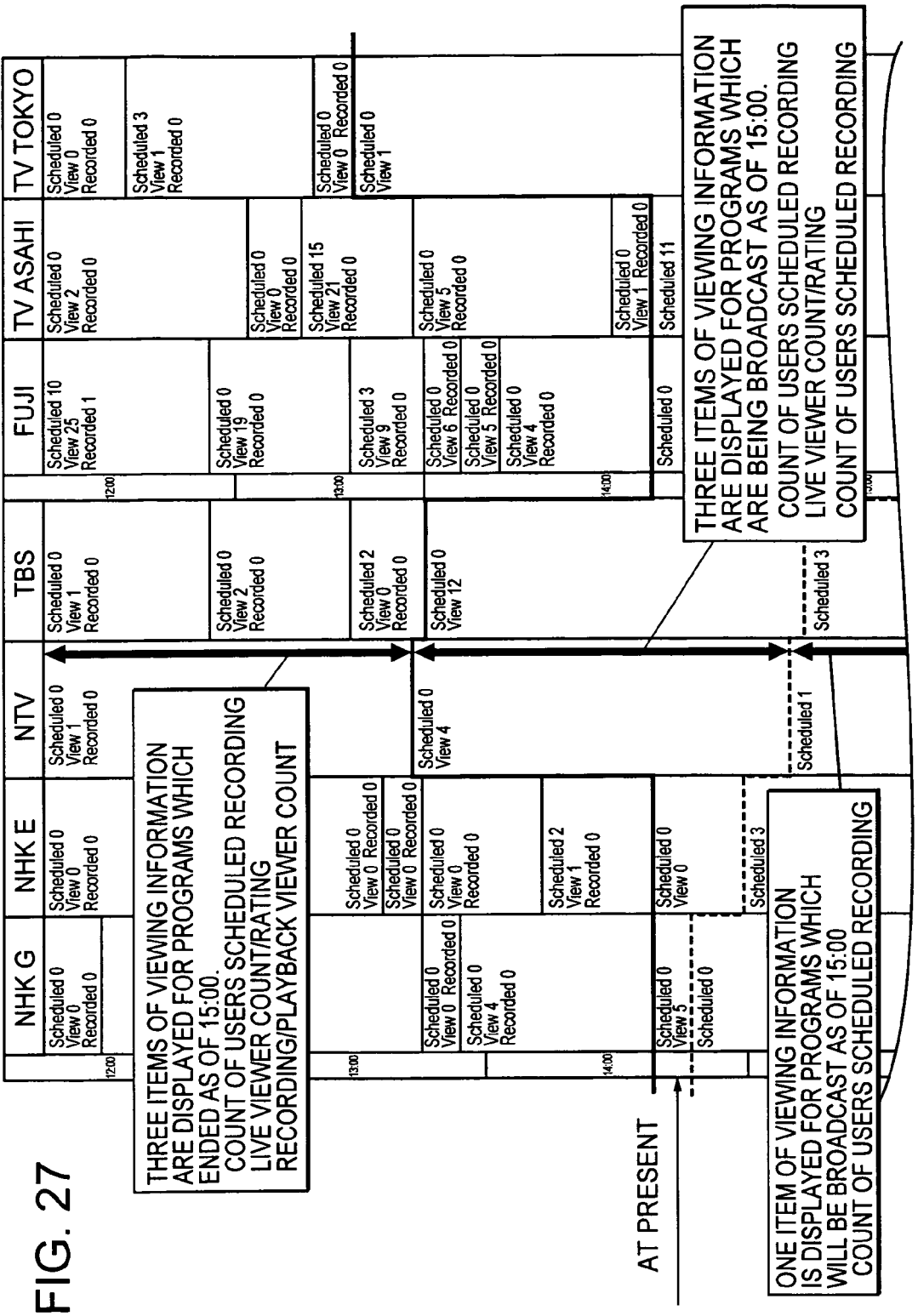
FIG. 27 is a diagram showing a screen of the statistical data layer.

Here, an actual image of the statistical data layer screen is shown in FIG. 27. It should be noted that in FIG. 28, it is assumed that a current time is 15:00 and that display of good impression index icons 104 and link displays "Details" 105 are omitted. Further, in FIG. 27, there are shown the recording/playback viewer counts placed together with recording/playback viewer count icons 101, the counts of users scheduled recording placed together with the icons 102 for count of users scheduled recording, live viewer data placed together with live viewer icons 103, but display of recording/playback viewer count icons 101, icons 102 for count of users scheduled recording, live viewer icons 103 themselves are omitted.

Figure 28:
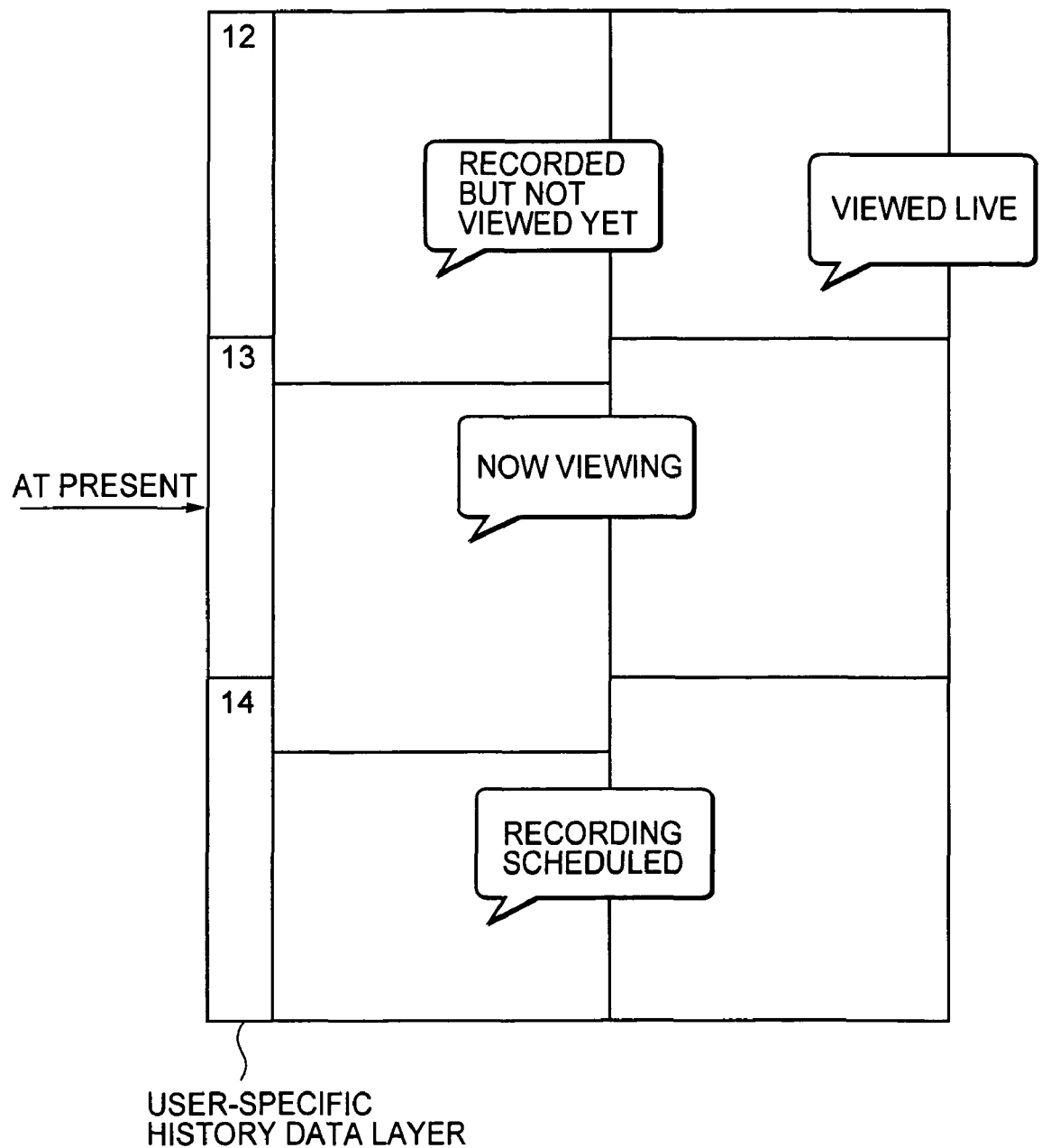
FIG. 28 is a diagram showing a screen of a user-specific history data layer.

Next, FIG. 28 schematically shows a screen of the user-specific history data layer generated in step S75 of FIG. 21.

The user-specific history data layer screen adopts the same layout as the EPG layer screen, in which, e.g., times are indicated in a vertical direction and broadcast stations are indicated in a horizontal direction, and is generated by placing (reflecting) action history data representing actions which a user took (is taking) on a program in a box of the program specified by a time and a broadcast station at and by which the program is broadcast.

That is, in a case where the user recorded a program but has not viewed the recorded program yet, for example, a message "Recorded, but not viewed yet." is placed in a box of the program as action history data representing an action which the user took.

Further, in a case where the user viewed a program whose broadcast ended, during the broadcast time of the program, for example, a message "Viewed live." is placed in a box of the program as action history data representing an action which the user took.

Furthermore, in a case where the user is viewing a program which is now being broadcast, for example, a message "Now viewing." is placed in a box of the program as action history data representing an action which the user is taking.

Furthermore, in a case where the user schedules a program for recording, for example, a message "Scheduled." is placed in a box of the program as action history data representing an action which the user has taken.

As described above, messages representing actions taken by the user on a program are displayed in a box of the program on the user-specific history data layer screen. And since the user-specific history data layer screen represents times in its vertical direction, it may be said that the user-specific history data layer screen displays a history of actions taken by the user on programs when viewed in the vertical direction.

Figure 29:
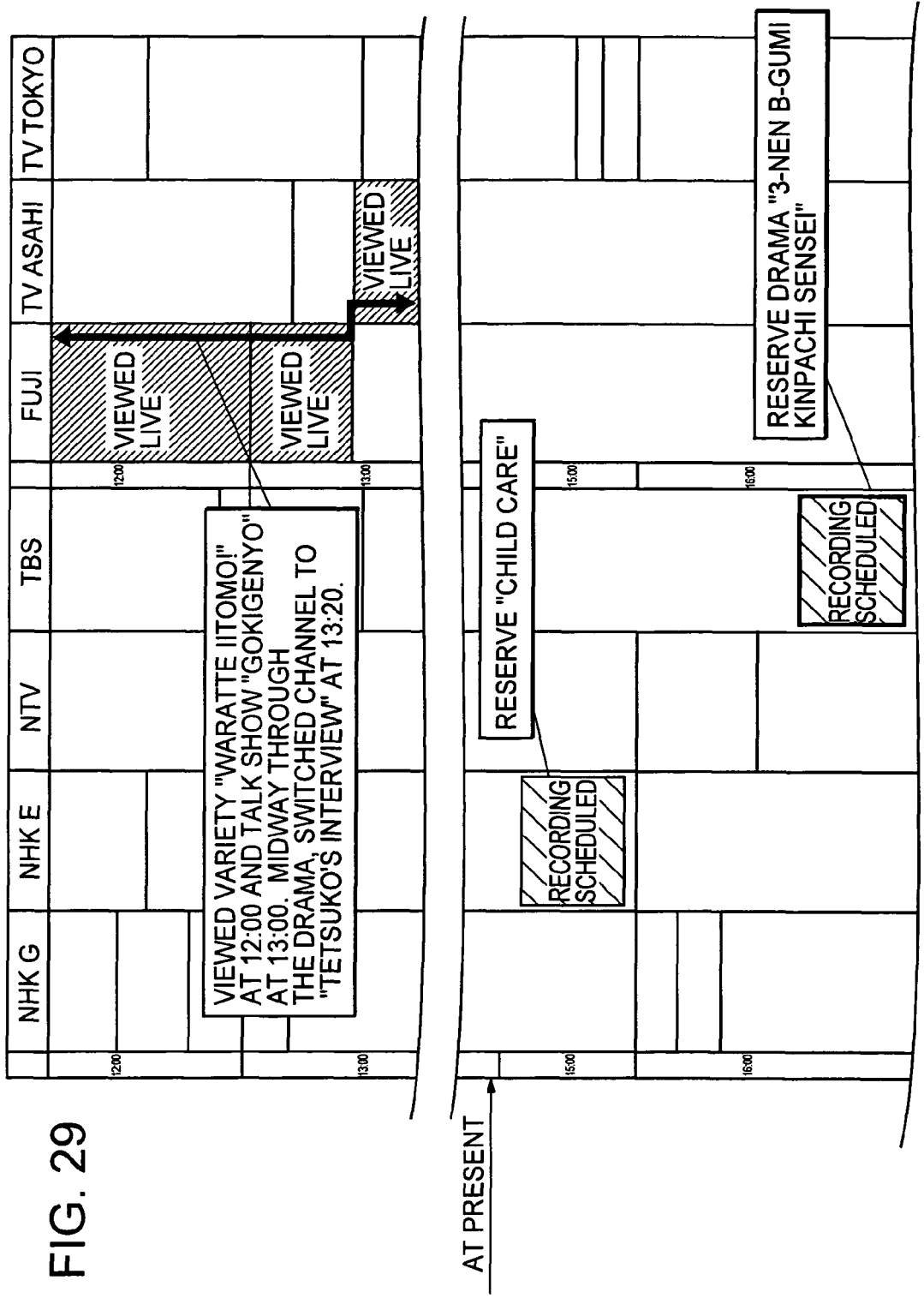
FIG. 29 is a diagram showing a screen of the user-specific history data layer.

Here, an actual image of the user-specific history data layer screen is shown in FIG. 29.

In the user-specific history data layer screen, a message "Live viewing" is adopted instead of the message "Viewed live.", and also a message "Schedule" is adopted instead of the message "Scheduled.".

It should be noted that the user-specific history data layer screen may place not only a message as action history data representing an action taken by the user on a program in a box of the program, but also may have the box patterned, shaded, or colored in a manner corresponding to the action history data.

By the way, the program information page creation server 55 generates the user-specific history data layer screen using the action history data for each user registered in the user-specific DB 61 in step S75 of FIG. 21, as mentioned above. The action history data is registered as classified into the live viewing history table, the recording/playback history table, and the recording schedule history table, as shown in FIG. 18 above. And, now paying attention to, e.g., the live viewing history table, a record of the live viewing table is formed of an actual viewing date/time of viewing information as a main key, together with a broadcast station name, a viewing area, a good impression level which are other members of the viewing information.

Therefore, according to the live viewing table, a program viewed by the user during its broadcast time may be specified from an actual viewing date/time and a broadcast station name in each record of the live viewing table, and further, a time at which the user viewed the program may also be specified from the actual viewing date/time.

As a result, e.g., in a case where the user starts viewing a program on a certain channel and stops viewing the program midway through the program to start viewing a program on another channel, the live viewing table may be checked to recognize what time the user started and ended viewing the program on the channel and also what time the user started and ended viewing the program on another channel.

Therefore, in the above-mentioned case, action history data representing actions taken by the user on a program is placed in each box of the program on the user-specific history data layer screen. However, on the user-specific history data layer screen, action history data representing actions taken by the user may be placed in a unit smaller than a box of a program, which is obtained by dividing each box of a program in a vertical direction in which times are indicated.

Specifically, e.g., in a case where the user starts viewing a program on a certain channel and stops viewing the program midway through the program to start viewing a program on another channel as mentioned above, a message "Viewed live." may be placed in a portion of a box of the program on the certain channel which extends from the start time to the time at which the user stopped viewing the program, and further a message "Viewed live." may be placed in a portion of a box of the program on another channel which extends from the time the user started viewing the program to the time at which the user ended viewing the program on the user-specific history data layer screen.

On the user-specific history data layer screen, action history data registered not only in the live viewing history table, but also in the recording/playback history table, the recording schedule history table may be placed in a unit smaller than each box of a program. In this case, the user-specific history data layer screen may reflect, e.g., information that an entire program was viewed or scheduled for recording, as well as, e.g., information that part of a program was viewed or scheduled for recording.

Figure 30:
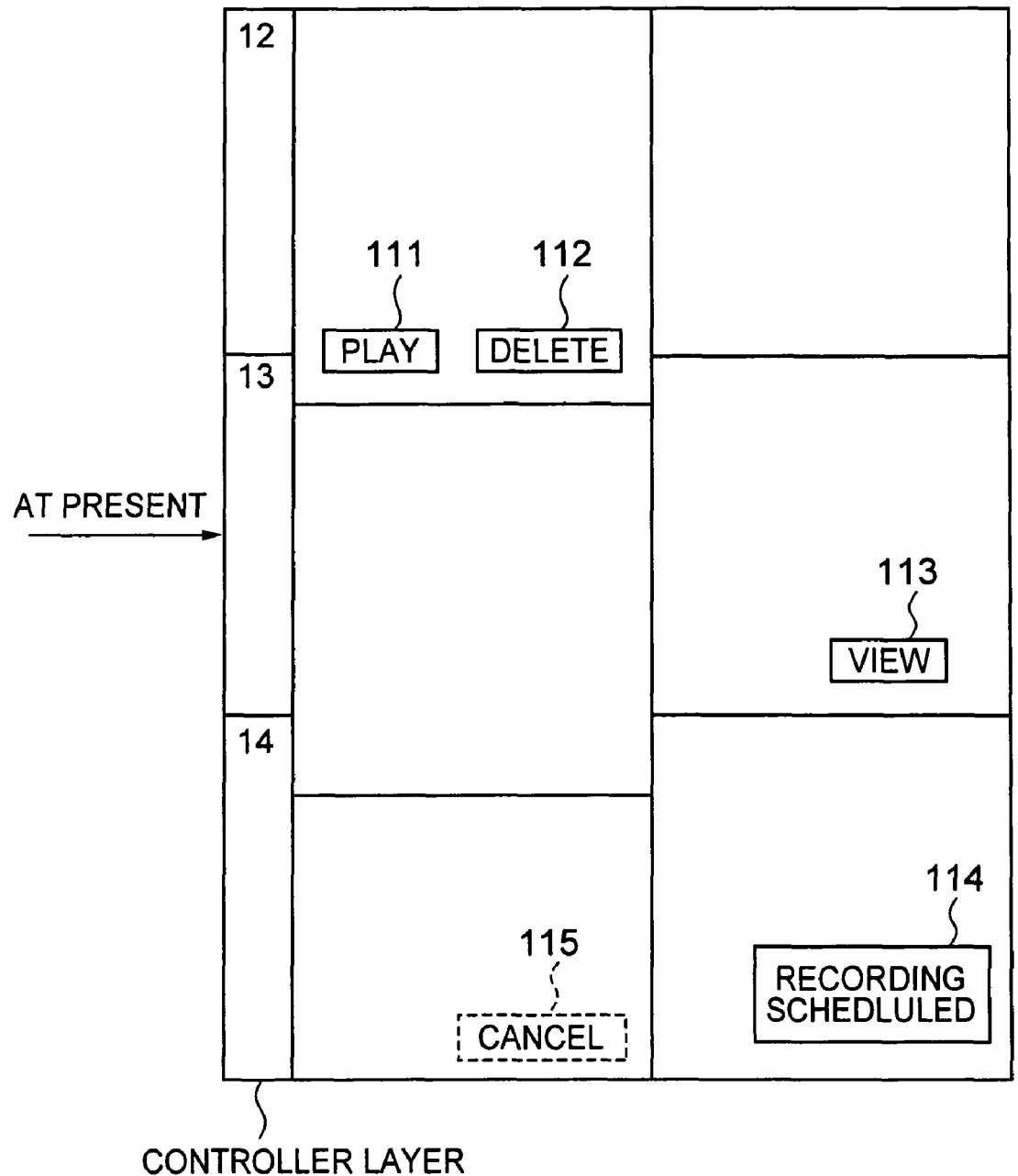
FIG. 30 is a diagram showing a screen of a controller layer.

Next, FIG. 30 schematically shows a screen of the controller layer generated in step S76 of FIG. 21.

The controller layer screen adopts the same layout as the EPG layer screen in which, e.g., times are indicated in a vertical direction and broadcast stations are indicated in a horizontal direction, and is generated by placing, in a box of a program specified by a time and a broadcast station at and by which the program is broadcast, operation data that is operated when the TV general application 43 of the user terminal 2 is caused to perform predetermined processing on the program.

That is, placed in a box of a program on the controller layer screen is necessary one(s) of, e.g., a play button 111, a delete button 112, a view button 113, a schedule button 114 as operation data.

A play button 111 is operated to play a program corresponding to a box in which the play button 111 is placed. That is, when the play button 111 is operated (e.g., clicked) with the controller layer screen displayed on the web browser 42 of the user terminal 2, in a case where the recording/playback program 44 is not activated, the recording/playback program 44 is activated, whereby a program corresponding to a box in which the play button 111 is placed is played in the display window 71 of FIG. 9 displayed by the recording/playback program 44.

Therefore, the play button 111 is displayed only in a box of a program recorded by the user terminal 2 and recorded on the HD 15 or the like.

A delete button 112 is operated to delete a program corresponding to a box in which the delete button 112 is placed. That is, when the delete button 112 is operated with the controller layer screen displayed on the web browser 42 of the user terminal 2, in a case where the recording/playback program 44 is not activated, the recording/playback program 44 is activated, whereby (a file of) a program, which corresponds to a box in which the operated delete button 112 is placed and which is recorded by the user terminal 2 and recorded on the HD 15, is deleted from the HD 15 by the recording/playback program 44.

Therefore, the delete button 112 is displayed only in a box of a program recorded in the user terminal 2 and recorded on the HD 15 or the like, similarly to the play button 111.

A view button 113 is operated when the user views a program corresponding to a box in which the play button 113 is placed. That is, when the view button 113 is operated with the controller layer screen displayed on the web browser 42 of the user terminal 2, in a case where the recording/playback program 44 is not activated, the recording/playback program 44 is activated, whereby a program corresponding to a box in which the operated view button 113 is placed is displayed in the display window 71 of FIG. 9 displayed by the recording/playback program 44.

Therefore, the view button 113 is displayed in a box of a program currently viewable, i.e., a program currently being broadcast. However, in a case where the recording/playback program 44 is activated in the user terminal 2 and a program currently being broadcast is displayed in the display window 71 of FIG. 9, it is not necessary to display the program in the display window 71 again because the program has already been displayed therein. Therefore, it may be configured such that a view button 113 is not displayed in a box of a program already displayed in the display window 71.

A schedule button 114 is operated to schedule for recording a program corresponding to a box in which the schedule button 114 is placed. That is, when the schedule button 114 is operated with the controller layer screen displayed on the web browser 42 of the user terminal 2, in a case where the recording/playback program 44 is not activated, the recording/playback program 44 is activated, whereby a program corresponding to a box in which the operated schedule button 114 is placed is scheduled for recording by the recording/playback program 44.

Therefore, the schedule button 114 is displayed only in a box of a program which may be recorded in the future, i.e., a program whose broadcast is not started yet.

It should be noted that in a case where a schedule button 114 is operated to schedule a program for recording, the recording schedule may be cancelled when the schedule button 114 is operated again. Whether a program is scheduled for recording or not may be checked through the user-specific history data layer screen described with reference to FIGS. 28 and 29 above.

Further, a cancel button 115 may be placed in a box of a program that has been scheduled for recording, as shown by a dotted line in FIG. 30. When a cancel button 115 is operated, the recording schedule made for a program corresponding to a box in which the cancel button 115 is placed is cancelled by the recording schedule program 45.

By the way, the present applicant has already proposed an internet EPG (iEPG), which is a web page for an EPG provided over the Internet, and is actually providing an iEPG in a web age linked from http://www.so-net.ne.jp/tv/.

In an iEPG, a link display "Schedule" is placed in a box of each program. The link display "Schedule" is a textual indication "Schedule" linked to a recording schedule data file in which information for specifying the program is described, and is used to schedule the program for recording.

Figure 31:
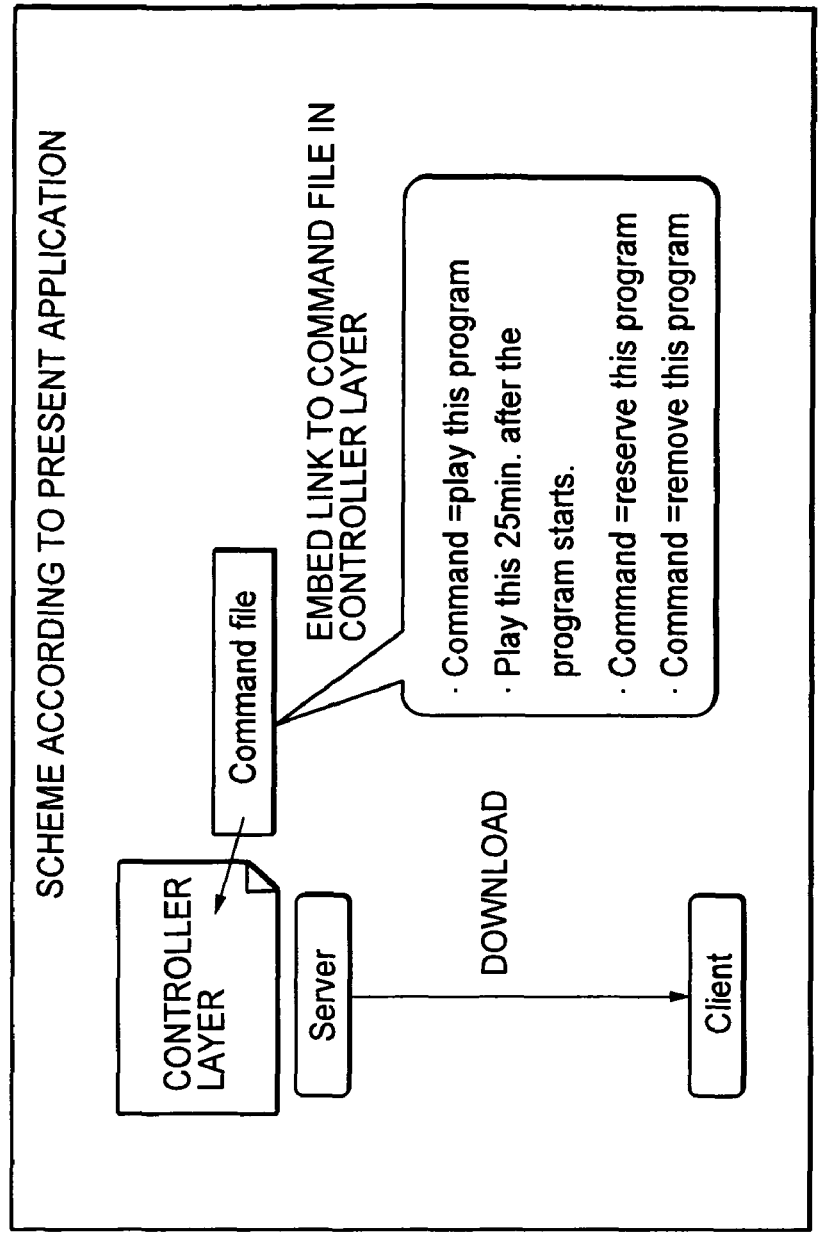
FIG. 31A is a diagram explaining a command file.
FIG. 31B is a diagram explaining a command file.

When a user clicks a link display "Schedule" in an iEPG on the side of a client, the client downloads a recording schedule data file linked from the link display "Schedule" from a server as shown in FIG. 31A to schedule for recording a program (program corresponding to a box in which the clicked link display "Schedule" is placed) specified by a description of the recording schedule data file. It should be noted that a special application program must be activated in order to make a recording schedule over an iEPG. Here, the special application program for scheduling recording includes, e.g., "GigaPocket" (registered trademark) developed by the present applicant.

On the other hand, the play button 111, the delete button 112, the view button 113, the schedule button 114 as operation data placed in a box of a program on the controller layer screen are linked to command files in which information including commands for instructing execution of the above-mentioned processing performed by the buttons being operated is described.

Therefore, in a case where the user operates a play button 111, a delete button 112, a view button 113, or a schedule button 114 as operation data in the user terminal 2 (client), the user terminal 2 downloads a command file linked from the operated operation data from the server system 4 (server) and may thus execute a command described in the command file, as shown in FIG. 31B.

As described above, in an iEPG, what is described in a recording schedule data file linked from the link display "Schedule" is information for specifying a program, and thus fixed processing such as scheduling for recording a program specified by the recording schedule data file is performed. On the other hand, on the controller layer screen, a command file linked from operation data includes not only information for specifying a program but also commands, and thus not only fixed processing such as making a recording schedule, but also various processing according to the commands may be performed.

It should be noted that "Command=play this program", "Play this 25 min. after the program starts.", "Command=reserve this program", "Command=delete this program" shown in FIG. 31B are some examples of commands described in command files.

A command "Command=play this program" is a command described in a command file linked from, e.g., a play button 111, and instructs playback of a program corresponding to a box in which the play button 111 is displayed.

A command "Play this 25 min. after the program starts." is a command that instructs, in a case where operation data linked to a command file in which the command is described is operated, playback of a program specified by the operation data to start 25 minutes from the start time of the program. It should be noted that a method of using such commands will be described later.

A command "Command=reserve this program" is a command described in a command file linked from, e.g., a schedule button 114, and instructs scheduling for recording a program corresponding to a box in which the schedule button 114 is placed.

A command "Command=remove this program" is described in a command file linked from, e.g., a delete button 112, and instructs deletion of a program (recorded program) corresponding to a box in which the delete button 112 is placed.

It should be noted that command files may be stored in, e.g., the EPG DB 64 of the server system 4 and that a command file corresponding to operation data operated by the user terminal 2 may be transmitted to the user terminal 2. Alternatively, the web server 52 may dynamically create a command file corresponding to operation data operated by the user terminal 2, for transmission to the user terminal 2.

Figure 32:
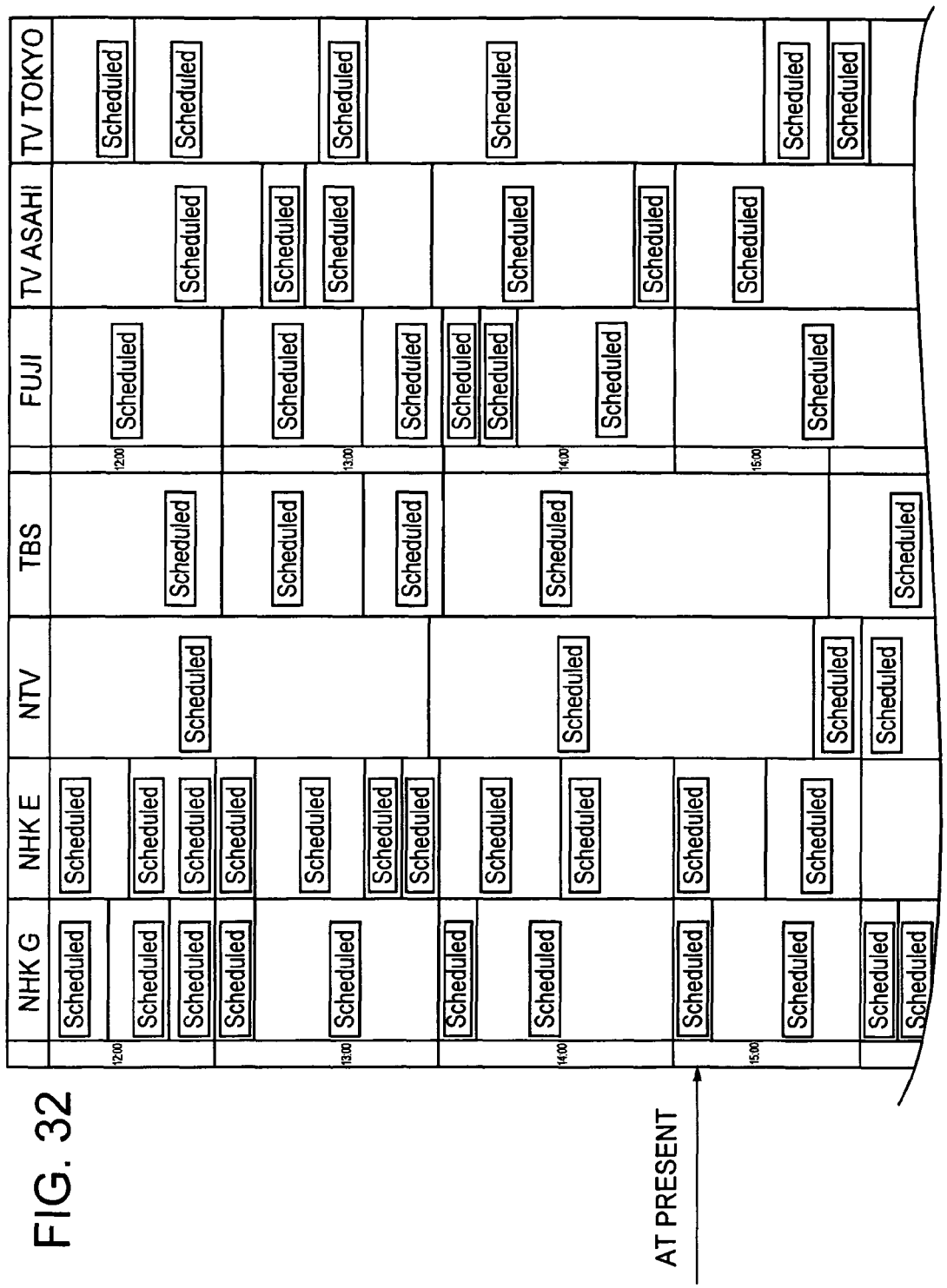
FIG. 32 is a diagram showing a screen of the controller layer.

Here, an actual image of the controller layer screen is shown in FIG. 32. It should be noted that in FIG. 32, only schedule buttons 114 in FIG. 30 are displayed, with display of play buttons 111, delete buttons 112, and view buttons 113 omitted.

Figure 33:
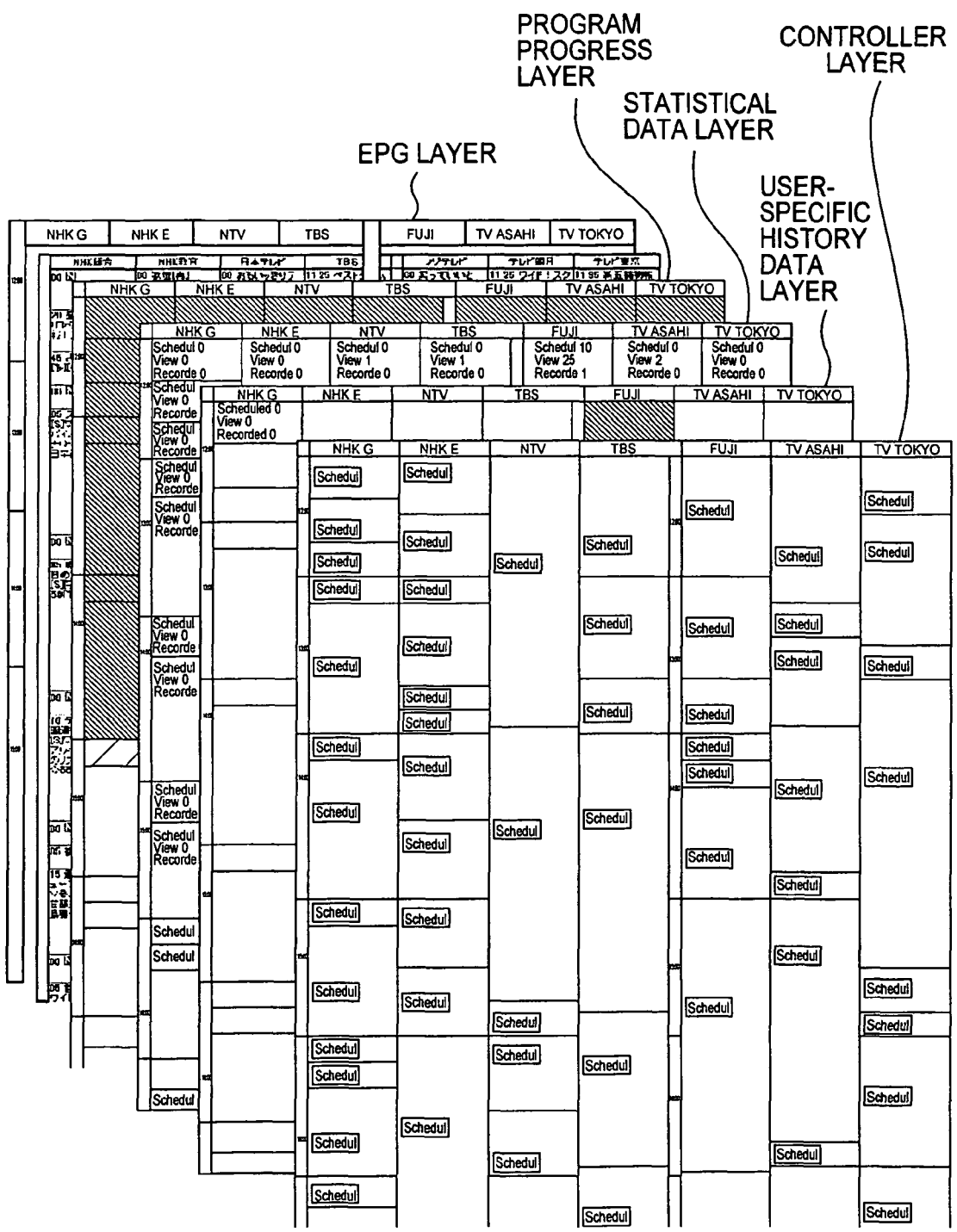
FIG. 33 is a diagram showing how the screens of the EPG layer, program progress layer, statistical data layer, personal history data layer, and controller layer are superimposed.

In step S77 of FIG. 21, conceptually, an EPG layer screen of FIG. 22, a program progress layer screen of FIG. 24, a statistical data layer screen of FIG. 26, a user-specific history data layer screen of FIG. 28, and a controller layer screen of FIG. 30 such as mentioned above are superimposed as shown in FIG. 33 to generate a final EPG page. Therefore, the EPG page includes all the information placed in these screens, as shown in FIG. 34.

Figure 34:
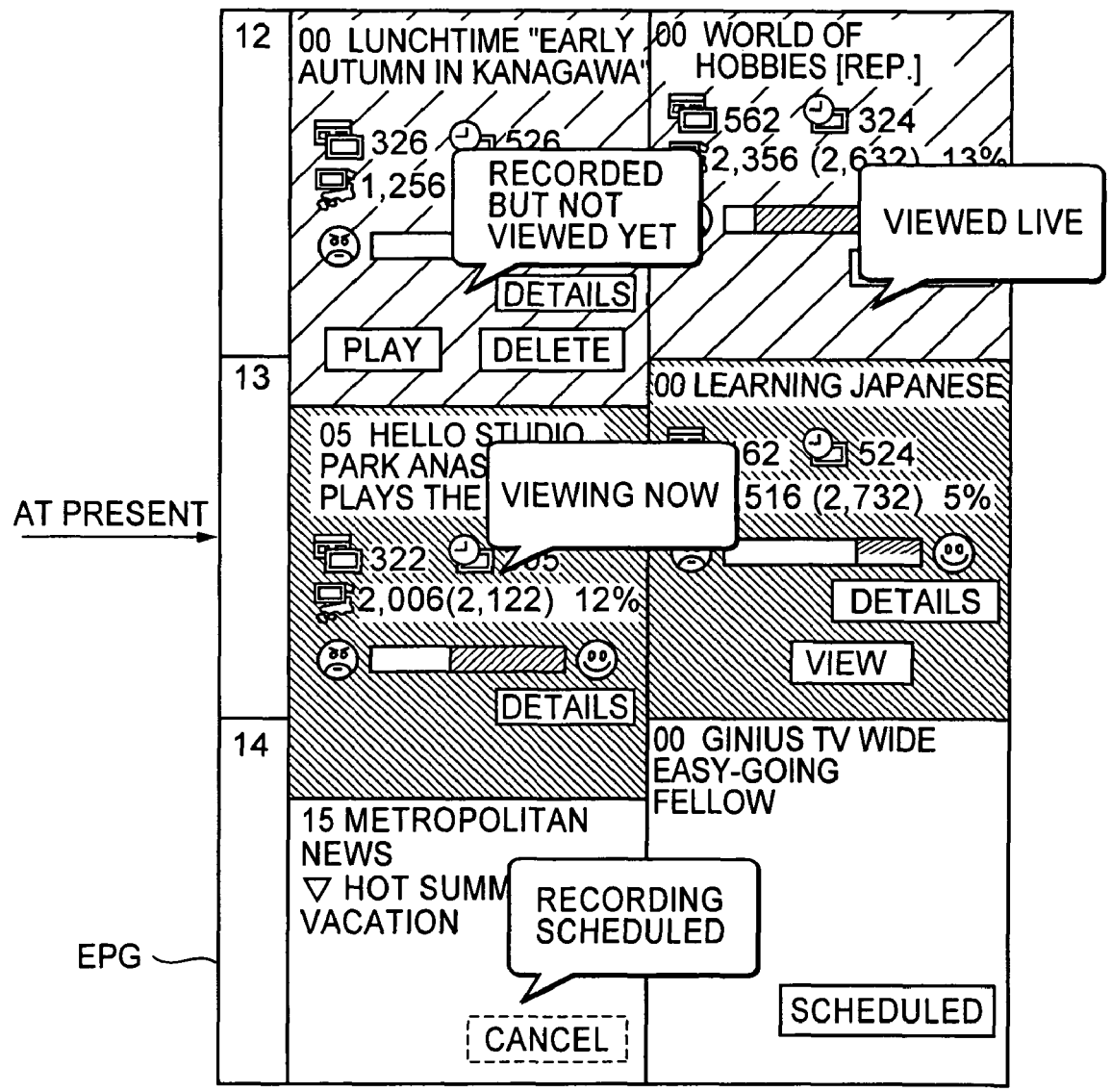
FIG. 34 is a diagram showing an EPG page.

Here, in FIG. 34, to avoid complication of the figure, display of reference numerals is omitted.

It should be noted that, of the layer screens constituting an EPG page, the EPG layer screen, the program progress layer screen, the statistical data layer screen are generated as screens to be shared among all users. However, the user-specific history data layer screen and the controller layer screen are generated for each user, and thus for their generation, users who have accessed the server system 4 must be identified.

Therefore, in a case where the server system 4 does not perform processing such as, e.g., user authentication for identifying a user of a user terminal 2 who has accessed the server system 4, the user who has accessed the server system 4 cannot be identified, and thus the user-specific history data layer screen and the controller layer screen cannot be generated. However, in this case, the server system 4 may generate an EPG page by, e.g., superimposing the EPG layer screen, the program progress layer screen, and the statistical data layer screen without using the user-specific history data layer screen and the controller layer screen, for provision to the user.

Figure 20:
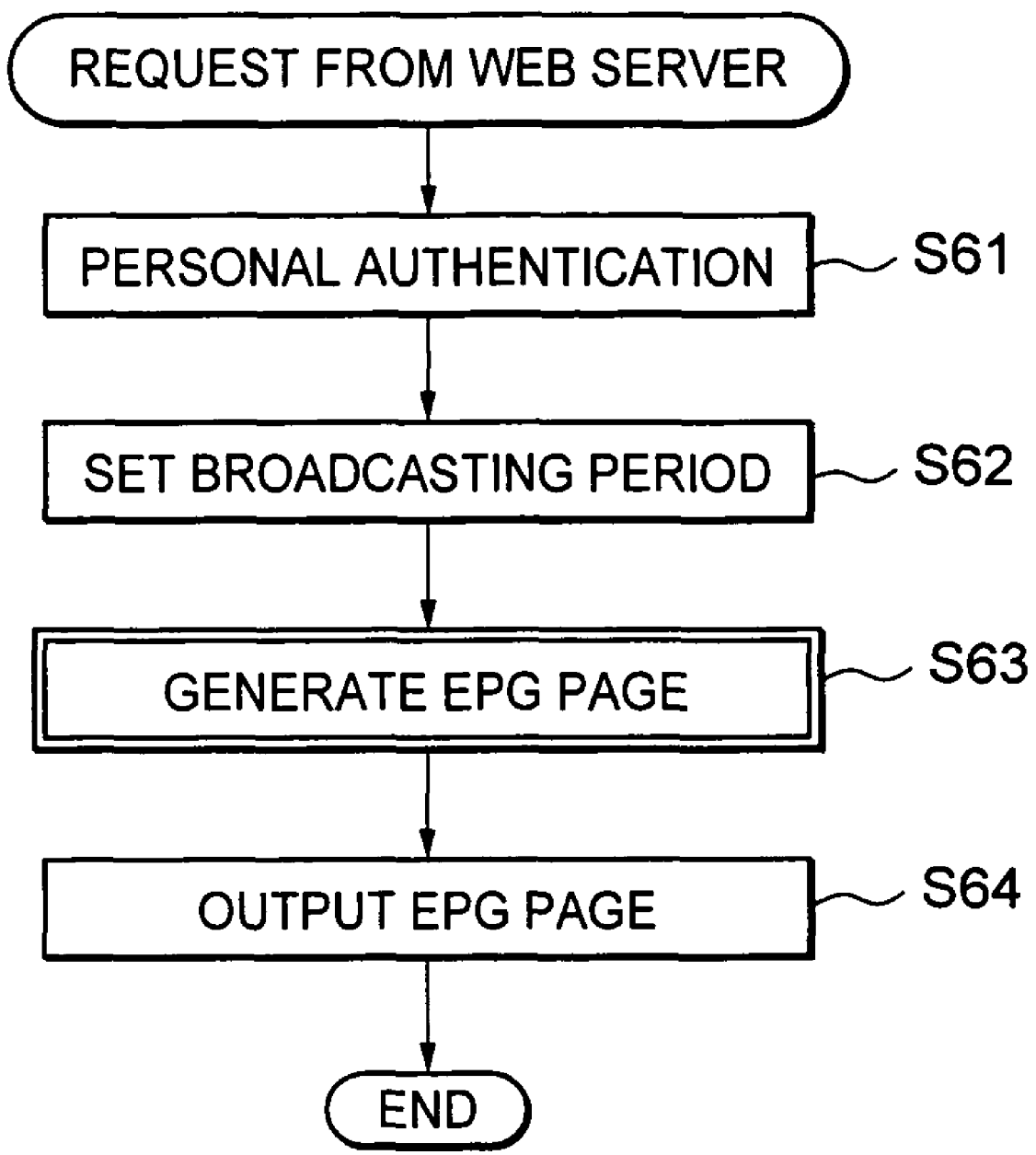
FIG. 20 is a flowchart explaining a process performed by a program information page creation server 55.

It should be noted that in the embodiment of FIG. 20, an EPG page shown in FIG. 34 above is generated and the EPG is thereafter transmitted to the user terminal 2. Alternatively, e.g., upon generation of each of the screens of the EPG layer, statistical data layer, user-specific data layer, controller layer, the generated screen may be transmitted to the user terminal 2. In this case, in the user terminal 2, the screens are superimposed from one layer to another to have the EPG page of FIG. 34 finally displayed.

Next, the program information page creation server 55 of the server system 4 generates an EPG layer screen having a size equal to one page, using program guide data on programs, e.g., for a day. Since the program progress layer screen, the statistical data layer screen, the user-specific history data layer screen, and the controller layer screen each adopt the same layout as the EPG layer screen as mentioned above, one-page screens each are generated as to programs for a day.

Figure 35:
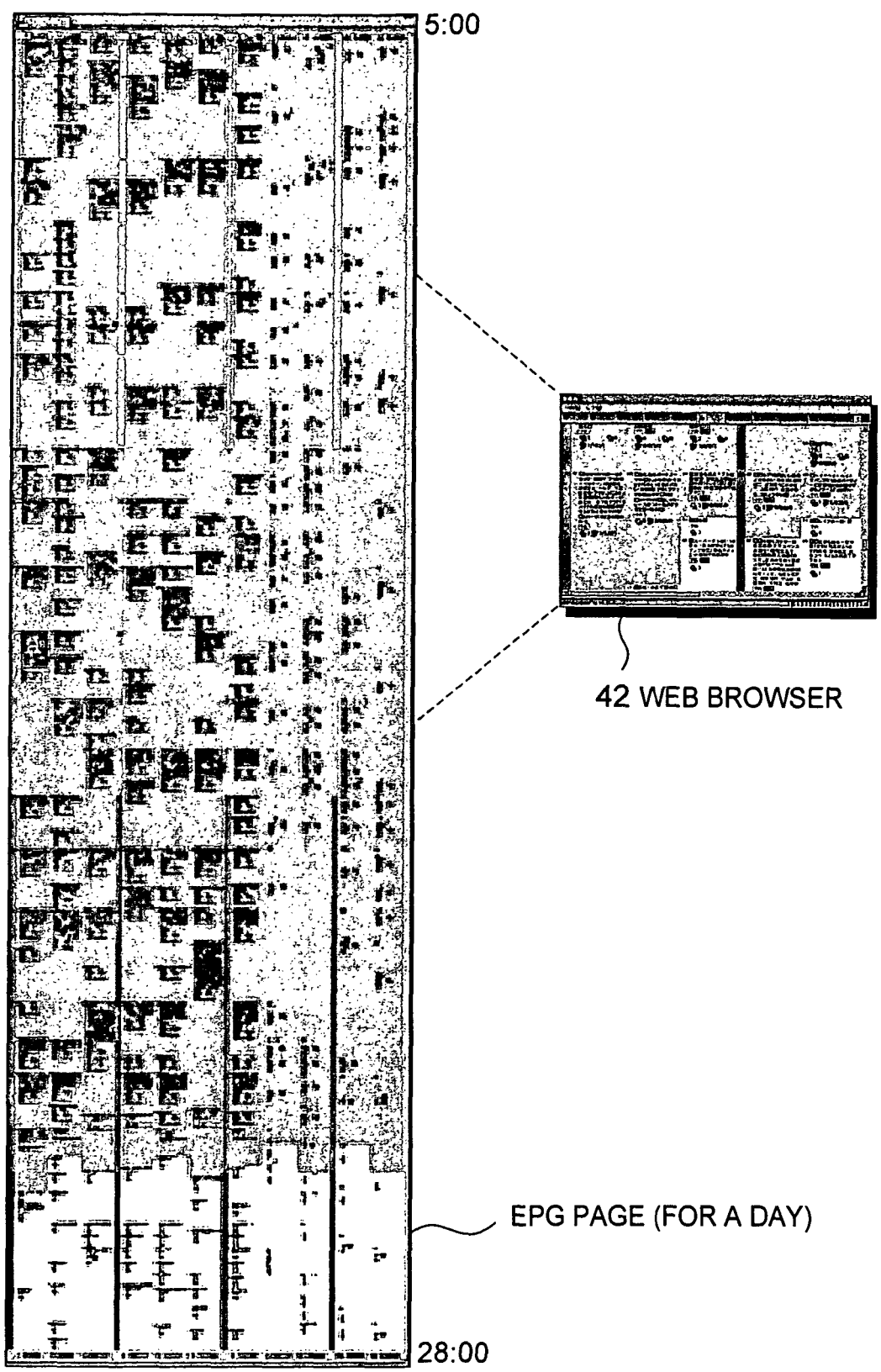
FIG. 35 is a diagram showing an EPG page in which program guide data for a day is placed.

Therefore, an EPG page generated by the program information page creation server 55 has program information for a day placed in one page, as shown in FIG. 35.

In this case, the web browser 42 of the user terminal 2 usually cannot display the entire EPG page for a day, and thus only a part of the EPG page is displayed, as shown in FIG. 35. However, the user may obtain information about the programs to be broadcast on the day instantly by scrolling the EPG page displayed on the web browser 42.

That is, a method of providing an EPG page in the server system 4 may include providing requested ones of time periods into which the EPG page is divided to the web browser 42 from the server system 4.

However, in this case, the user must request the server system 4 to provide an EPG page portion covering other time periods again if the user wishes to take a look at such other time periods. Further, it takes some time to transmit an EPG page from the server system 4 to the web browser 42, and thus the user must wait for some time until the user actually takes a look at the EPG page portion covering the other time periods, from the time at which the user wished to take a look at the EPG page portion.

By contrast, in a case where a one-day EPG page is transmitted from the server system 4 to the web browser 42, the user may obtain information about any arbitrary program of the day instantly merely by scrolling.

Here, although twenty-four hours of a day are usually measured from 00:00 to 23:00, time measured from a time at which broadcasting of programs for a day is started in a broadcast station may be adopted to display time represented in the vertical direction of an EPG page generated by the program information page creation server 55. That is, in a case where broadcasting of programs for a day is started at, e.g., 05:00 in a broadcast station, time represented in the vertical direction of an EPG generated by the program information page creation server 55 may be displayed from 05:00 to 28:00, using 05:00 as a reference.

Next, a process will be described which is performed when an EPG page such as shown in FIG. 34 above is displayed on the web browser 42 of the user terminal 2 and the user has operated a play button 111, a delete button 112, a view button 113, or a schedule button 114 (FIG. 30) as operation data. For example, a case where a schedule button 114 has been operated is taken as an example.

When the user, e.g., clicks the schedule button 114 placed in a box of a program which the user wishes to schedule for recording in an EPG page displayed on the web browser 42 of the user terminal 2, a command file linked from the schedule button 114 is requested to the web server 52 of the server system 4. The web server 52 reads (or dynamically generates) the command file linked to the schedule button 114 clicked by the user from, e.g., the EPG DB 64 upon request from the web browser 42, for transmission to the user terminal 2. The user terminal 2 receives the command file from the web server 52 and performs processing corresponding to a command described in the command file.

Here, FIG. 36 shows a command file.

A command file is formed such that an attribute and an attribute value are separated by a colon (:) in each line.

A first line of the command file "Content-type: application/x-tv-program-info; charset=shift_jis" indicates that information for specifying a program (application/x-tv-program-info) is described in the command file and further that a Shift JIS code (charset=shift_jis) is adopted for describing the command file.

A second line of the command file "version:1" indicates that the version of description regulations for the command file is 1.

A third line of the command file "command: Command=reserve this program" is a command for instructing scheduling for recording of a program specified by the information described in the command file (equal to a program corresponding to a box in which the schedule button 114 clicked by the user is placed).

The TV general application 43 of the user terminal 2 interprets the command "Command=reserve this program" which is an attribute value of an attribute "command", and performs processing corresponding to the command. In the current case, the command "Command=reserve this program" is a command for instructing a recording schedule to be made, and thus the recording schedule program 45 is activated to schedule for recording a program specified by the description of the command file.

A fourth line of the command file "station: Dai-nippon Television" indicates that the broadcasting name of a broadcast station that broadcasts the program is "Dai-nippon Television".

A command file permits broadcast station names to be described within a predetermined range of ambiguity. A broadcast station name is converted to a channel (on which a program is broadcast) of a broadcast station specified by the broadcast station name, by processing using a channel conversion file shown in FIG. 37.

That is, in a channel conversion file of FIG. 37, e.g., of character strings "14, 0, 0, 14, Dai-nippon Television, Dai-nippon Television, Dai-nittere, Dai-nippon Television Broadcasting Network, DTV", a first numeral from the left "14" represents a channel, and a numeral "14" located on the right of a third comma from the left represents data for displaying the channel. A character string "Dai-nippon Television" located on the right of a fourth comma from the left represents data for displaying a broadcast station name. Character strings ("Dai-nippon Television", "Dai-Nittere", "Dai-nippon Television Broadcasting Network", "DTV") located on the right of a fifth comma from the left and separated by commas are character strings for matching with the broadcast station name described next to the "station:" in the command file.

For example, in the command file of FIG. 36, "station: Dai-nippon Television" is described. In this case, the recording schedule program 45 determines whether or not the character string "Dai-nippon Television" following "station:" matches with any of the character strings located on the right of the fifth comma from the left in the channel conversion file.

In a case where the character strings "14, 0, 0, 14, Dai-nippon Television, Dai-nippon Television, Dai-nittere, Dai-nippon Television Broadcasting Network, DTV" are included in the channel conversion file, as shown in FIG. 37, the recording schedule program 45 determines that the "Dai-nippon Television" following the "station:" matches with the character string "Dai-nippon Television" (located on the right of the fifth comma from the left) described in the channel conversion file.

When the character string following the "station:" matches with a character string in the channel conversion file, the recording schedule program 45 recognizes the matched channel described in the same line of the channel conversion file as a channel on which the program is broadcast.

For example, when the character strings "14, 0, 0, 14, Dai-nippon Television, Dai-nippon Television, Dai-nittere, Dai-nippon Television Broadcasting Network, DTV" matches with the character string following the "station:" in the command file, the recording schedule program 45 recognizes "14" as a channel on which the program is broadcast.

Therefore, according to the channel conversion file of FIG. 37, e.g., even if the character string following the "station:" in the command file is any of "Dai-nippon Television", "Dai-nittere", "Dai-nippon Television Broadcasting Network", and "DTV", the recording schedule program 45 may recognize "14" as a channel on which the program is broadcast.

Thus, even if a broadcast station name described next to the "station:" is somewhat ambiguous in a command file, the recording schedule program 45 may recognize a channel of a broadcast station identified by the broadcast station name. It should be noted that channel conversion files are prepared, e.g., for individual viewing areas and that the TV general application 43 uses a channel conversion file corresponding to a viewing area set at the time of initial setting.

Returning to FIG. 36, a fifth line "year:1999", a sixth line "month:04", a seventh line "date:06" of the command file represent that a year in which the program is broadcast is 1999, that a month is April, that a day is 4th, respectively. An eighth line "start:21:00" and a ninth line "end:21:03" of the command file represent that the broadcasting start time of the program is 21:00 (twenty-one hundred hours) and that the end time is 21:03, respectively. A tenth line "program-title: Tuesday Suspense Quiz" and an eleventh line "program-subtitle: "Who's guilty?" of the command file represent that the title of the program is "Tuesday Suspense Quiz" and that the subtitle of the program is "Who's guilty?", respectively.

Since the command file is described by separating an attribute from its attribute value by a colon as mentioned above, what is represented by an attribute value described next to a colon may be judged from the corresponding attribute (attribute name) described immediately before the colon. Therefore, which set of an attribute and its attribute value is described in which line is not particularly limited.

Further, in an embodiment of FIG. 36, the command file is described in the Shift JIS code, which is one of text data. In this case, the user may, e.g., create and edit a command file easily using a general-purpose application program such as, e.g., a word processor or a text editor.

As mentioned above, the user terminal 2 performs processing corresponding to a command described in a command file.

That is, in a case where a command file is such as shown in, e.g., FIG. 36 above, the recording schedule program 45 is activated (however, if the recording schedule program 45 has already been activated, this activating step is skipped) in accordance with the command "Command=reserve this program" to schedule for recording a program specified by a description of the command file.

Specifically, e.g., the recording schedule program 45 causes (the display of) the output section 17 to display a start window for setting a channel and a broadcast station name as to a program to be recorded, and a start date and a start time of the recording. The recording schedule program 45 sets the channel and the broadcast station name, and the start date (broadcasting date) and the start time (broadcasting start time) (hours and minutes thereof are set in different fields in the example of the figure) as to the program specified by the command file of FIG. 36, to predetermined fields of the stat window, respectively.

Figure 39:
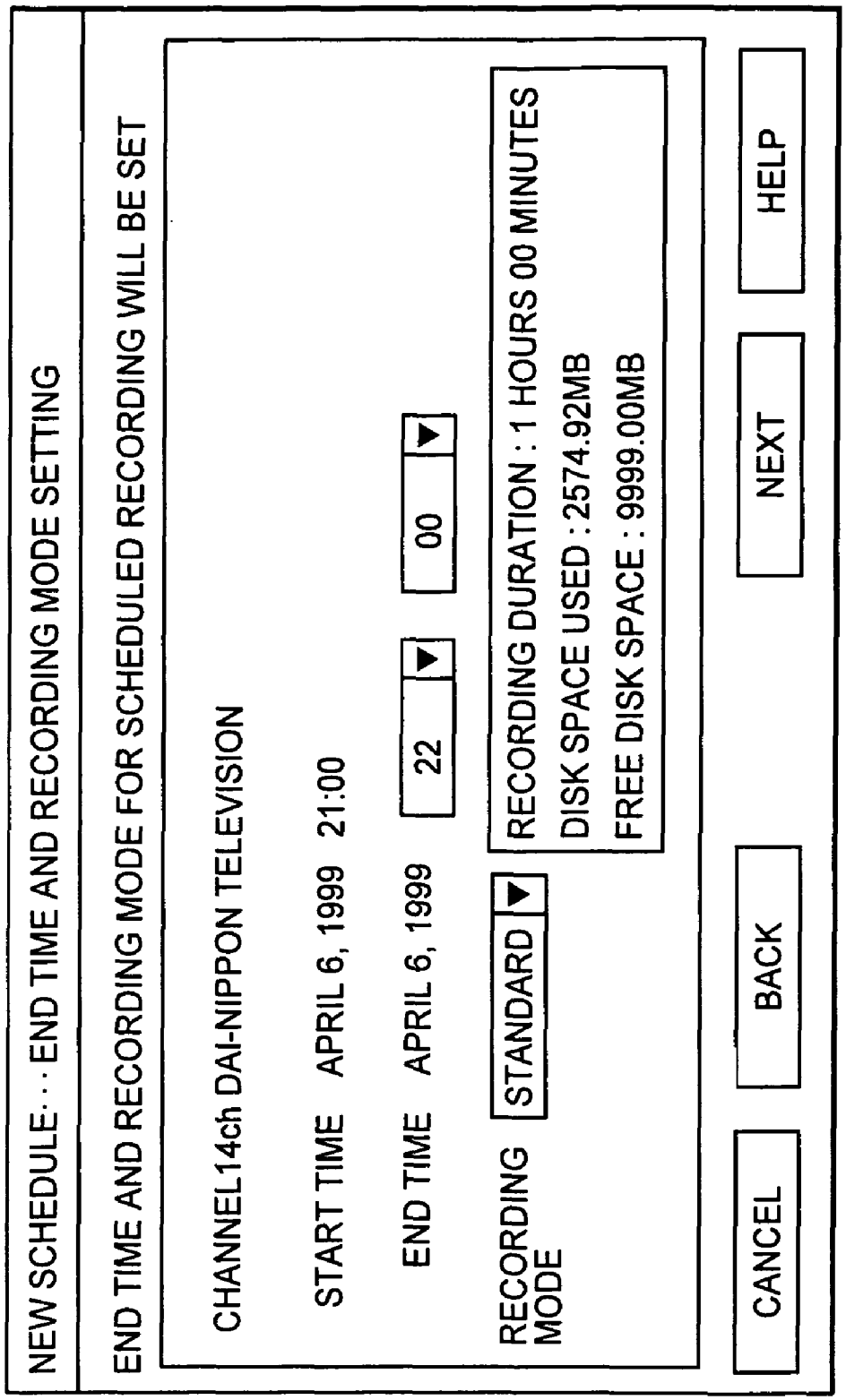
FIG. 39 is a diagram showing a window displayed when the recording scheduled is made.

When the user clicks a button indicated as "Next" after the channel and the broadcast station name, and the start date and the start time as to the program are set, the recording schedule program 45 switches display from the start window of FIG. 38 to an end window of FIG. 39.

In the end window of FIG. 39, the channel, and the start date and the start time as to the program respectively set to the predetermined fields of the start window of FIG. 38 are reflected. The recording schedule program 45 sets an end time (hours and minutes thereof are set to different fields in an example shown in the figure) of the program specified by the command file of FIG. 36 to predetermined fields of the end window of FIG. 39.

It should be noted that the end window of FIG. 39 includes a field for setting a recording mode. The recording mode is set, e.g., to "standard" by default.

Further, as to each of fields indicated with a symbol ▼ in the windows of FIGS. 38 and 39, the user may change a value set in the field indicated with the symbol ▼ by clicking the symbol ▼.

After setting the end time and the recording mode, the recording schedule program 45 calculates a recording duration of the program, a space of the HD 15 used for the recording and the like, and displays the calculated values in the end window of FIG. 39.

When the user thereafter clicks the button indicated as "Next" in the end window of FIG. 39, the recording schedule program 45 switches display from the window of FIG. 39 to a confirmation window of FIG. 40.

In the confirmation window of FIG. 40, information set in the start window of FIG. 38 and the end window of FIG. 39, i.e., the channel and the broadcast station name as to the program to be recorded, and the start date and the start time of the program, the end date and the end time of the program, the recording mode, and the like are displayed.

When the user clicks a button indicated as "Finish" in the confirmation window of FIG. 40, the recording schedule program 45 registers the information and the like displayed in the confirmation window of FIG. 40, in a recording schedule management file, which is a predetermined file on the HD 15, and closes the confirmation window of FIG. 40 to complete the scheduling of recording.

Thereafter, when a current time reaches the broadcasting start date/time of the program registered in the recording schedule management file, the recording schedule program 45 requests the recording/playback program 44 to record the program specified by the information described in the recording schedule file. As a result, the recording/playback program 44 records the program, and image data and sound data of the program are recorded on the HD 15.

Also in a case where operation data (a play button 111, a delete button 112, a view button 113, a cancel button 114) other than a schedule button 114 is operated in an EPG page, a command file corresponding to the operation data is downloaded to the user terminal 2 from the server system 4, whereby processing according to a command described in the command file is performed in the user terminal 2. That is, in a case where a play button 111 or a delete button 112 is operated, playback or deletion of image data and sound data on the HD 15 as to a program corresponding to a box in which the play button 111 or the delete button 112 is placed is performed, respectively. Further, in a case where a view button 113 is operated, a program corresponding to a box in which the view button 113 is placed is received by the TV tuner 20, and images and sound of the program are outputted. Furthermore, in a case where a cancel button 115 is operated, information registered in a recording schedule management file is deleted as to a program corresponding to a box in which the cancel button 115 is placed.

It should be noted that in a case where the recording schedule program 45 makes a recording schedule in accordance with a command described in a command file, display of the start window of FIG. 38 and the end window of FIG. 39 may be omitted and only the confirmation window of FIG. 40 may be displayed. Further, in the case where the recording schedule program 45 makes a recording schedule in accordance with a command described in a command file, display of all the windows of FIGS. 38 to 40 may also be omitted.

Referring next to a flowchart of FIG. 41, a process of generating the statistical data layer screen shown in FIG. 26 above will be described, which is performed in step S74 of FIG. 21.

First in step S81, the program information page creation server 55 acquires statistical data (hereinafter referred to as "statistical data for processing" whenever applicable) corresponding to time zones that are included in a desired broadcasting period, from the three statistical data tables stored in the statistical data DB 62 and shown in FIG. 19 above, which are the live viewer information table, the recording/playback viewer information tale, and the recording scheduling user information table, and then proceeds to step S82. In step S82, the program information page creation server 55 sets one of programs to be broadcast during the desired broadcasting period which is not designated as a spotlight program yet, as a spotlight program, and then proceeds to step S83.

In step S83, the program information page creation server 55 obtains an average of the numbers of users who have scheduled the spotlight program for recording (average count of users scheduled recording). That is, the program information page creation server 55 extracts the numbers of scheduling users who have made a recording schedule with a broadcast station broadcasting the spotlight program and which correspond to time zones included in the broadcast time of the spotlight program, from the numbers of scheduling users corresponding to time zones in the statistical data for processing acquired in step S81, and obtains an average obtained by dividing their sum by the number of time zones included in the broadcast time of the spotlight program, as an average scheduling count for the spotlight program.

Figure 42:
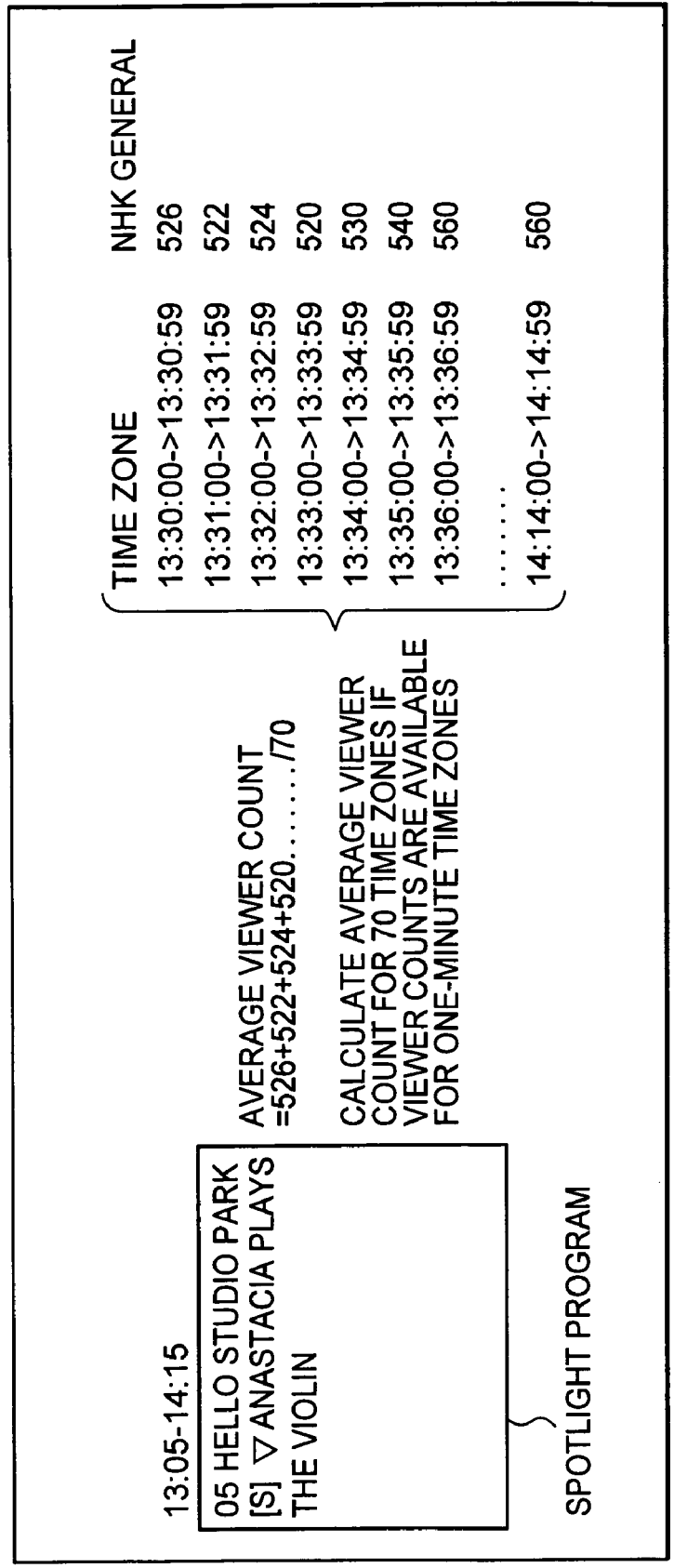
FIG. 42 is a diagram explaining a method of calculating an average count of users scheduled recording.

Here, a method of calculating the average count of users scheduled recording in step S83 is similar to a method of calculating an average viewer count to be described later with reference to FIG. 42.

After step S83, the program information page creation server 55 proceeds to step S84 to determine whether or not the spotlight program is a future program now to be broadcast (program whose broadcast is not started yet). In a case where it is determined in step S84 that the spotlight program is a future program now to be broadcast, the program information page creation server 55 proceeds to step S88 by skipping steps S85 and S86, to render the count of users scheduled recording for the spotlight program calculated in step S83 in a box of the spotlight program on the statistical data layer screen, together with an icon 102 for count of users scheduled recording (FIG. 26), and further proceeds to step S89.

On the other hand, in a case where it is determined in step S84 that the spotlight program is not a future program now to be broadcast, i.e., the spotlight program is a program now being broadcast or a program whose broadcast has already ended, the program information page creation server 55 proceeds to step S85 to obtain a transient maximum viewer count, an average viewer count, and an audience rating for the spotlight program.

That is, the program information page creation server 55 extracts viewer counts corresponding to a broadcast station broadcasting the spotlight program and corresponding to time zones included in the broadcast time of the spotlight program, from viewer counts corresponding to time zones in the statistical data for processing acquired in step S81, and obtains a maximum of the viewer counts corresponding to the time zones as a transient maximum viewer count.

Further, the program information page creation server 55 extracts viewer counts corresponding to a broadcast station broadcasting the spotlight program and corresponding to time zones included in the broadcast time of the spotlight program, from viewer counts corresponding to time zones in the statistical data for processing acquired in step S81, and obtains an average of the viewer counts corresponding to the time zones as an average viewer count.

That is, let it now be assumed, e.g., that the spotlight program is a program broadcast by a broadcast station whose broadcast station name is "NHK General", that its broadcast time extends from 13:30:00 to 14:14:59, and that time zones are provided a tone-minute intervals. In this case, the number of time zones included in the broadcast time of the spotlight program equals 70. Thus, in step S85, a viewer count corresponding to each of the 70 time zones included in the broadcast time of the spotlight program, out of the numbers of viewers who selected the broadcast station "NHK General" for viewing during its broadcast time, are extracted. The viewer counts corresponding to the respective 70 time zones are added up to obtain a sum and the sum is divided by 70, which is the number of time zones, to obtain an average viewer count for the spotlight program.

Further, the program information page creation server 55 divides, e.g., the average viewer count by an active user count to obtain the quotient as an audience rating.

Here, the active user count means the number of users who, e.g., uploaded viewing/schedule information a predetermined number of times or more within a predetermined time period, and is obtained by the program information page creation server 55 referring to the user-specific DB 61.

After step S85, the program information page creation server 55 proceeds to step S86 to obtain an average of the numbers of users who recorded the spotlight program and later viewed the recorded program by playback (recording/playback viewer counts).

That is, the program information page creation server 55 extracts recording/playback viewer counts corresponding to a broadcast station broadcasting the spotlight program and corresponding to time zones included in the broadcast time of the spotlight program, from viewer counts corresponding to time zones in the statistical data for processing acquired in step S81, and obtains an average of the recording/playback viewer counts corresponding to the time zones as an average recording/playback viewer count.

The program information page creation server 55 proceeds to step S87 to calculate a good impression index for the spotlight program.

That is, the program information page creation server 55 extracts average good impression indexes for live programs and average good impression indexes for recorded programs which correspond to a broadcast station broadcasting the spotlight program and which correspond to time zones included in the broadcast time of the spotlight program, from average good impression indexes for live programs and average good impression indexes for recorded programs corresponding to time zones in the statistical data for processing acquired in step S81. Further, the program information page creation server 55 obtains a total average of the extracted good impression indexes for both live programs and recorded programs as a good impression index for the spotlight program.

After having obtained the transient maximum viewer count, the average viewer count, the audience rating, the average recording/playback viewer count, the good impression index for the spotlight program in the above way, the program information page creation server 55 proceeds to step S88 to render these items of information in a box of the spotlight program on the statistical data layer screen, and then proceeds to step S89.

That is, in this case, in step S88, the average viewer count, the maximum viewer count, and the audience rating are rendered in the box of the spotlight program on the statistical data layer screen, together with a live viewer icon 103 (FIG. 26). Further, in step S88, the average of the playback viewer counts for the spotlight program is rendered in the box of the spotlight program on the statistical data layer screen, together with a recording/playback viewer count icon 101 (FIG. 26). Furthermore, in step S88, a good impression index icon 104 (FIG. 26) representing the good impression index for the spotlight program is rendered in the box of the spotlight program on the statistical data layer screen.

Thereafter, in step S89, the program information page creation server 55 determines whether or not all the programs to be broadcast during the desired broadcasting period are treated as a spotlight program. In a case where it is determined in step S89 that all the programs to be broadcast during the desired broadcasting period are not treated yet as a spotlight program, the program information page creation server 55 returns to step S82, where a program not treated as a spotlight program yet is newly set as a spotlight program and similar processing is repeated thereafter.

On the other hand, in a case where it is determined in step S89 that all the programs to be broadcast during the desired broadcasting period are treated as a spotlight program, the program information page creation server 55 proceeds to step S90 to render a link display "Details" 105 (FIG. 26) in each box of all the programs on the statistical data layer screen, and thereafter terminates the statistical data layer screen generating process.

As a result of the processing described above, the statistical data layer screen shown in FIG. 26 above is generated.

Figure 41:
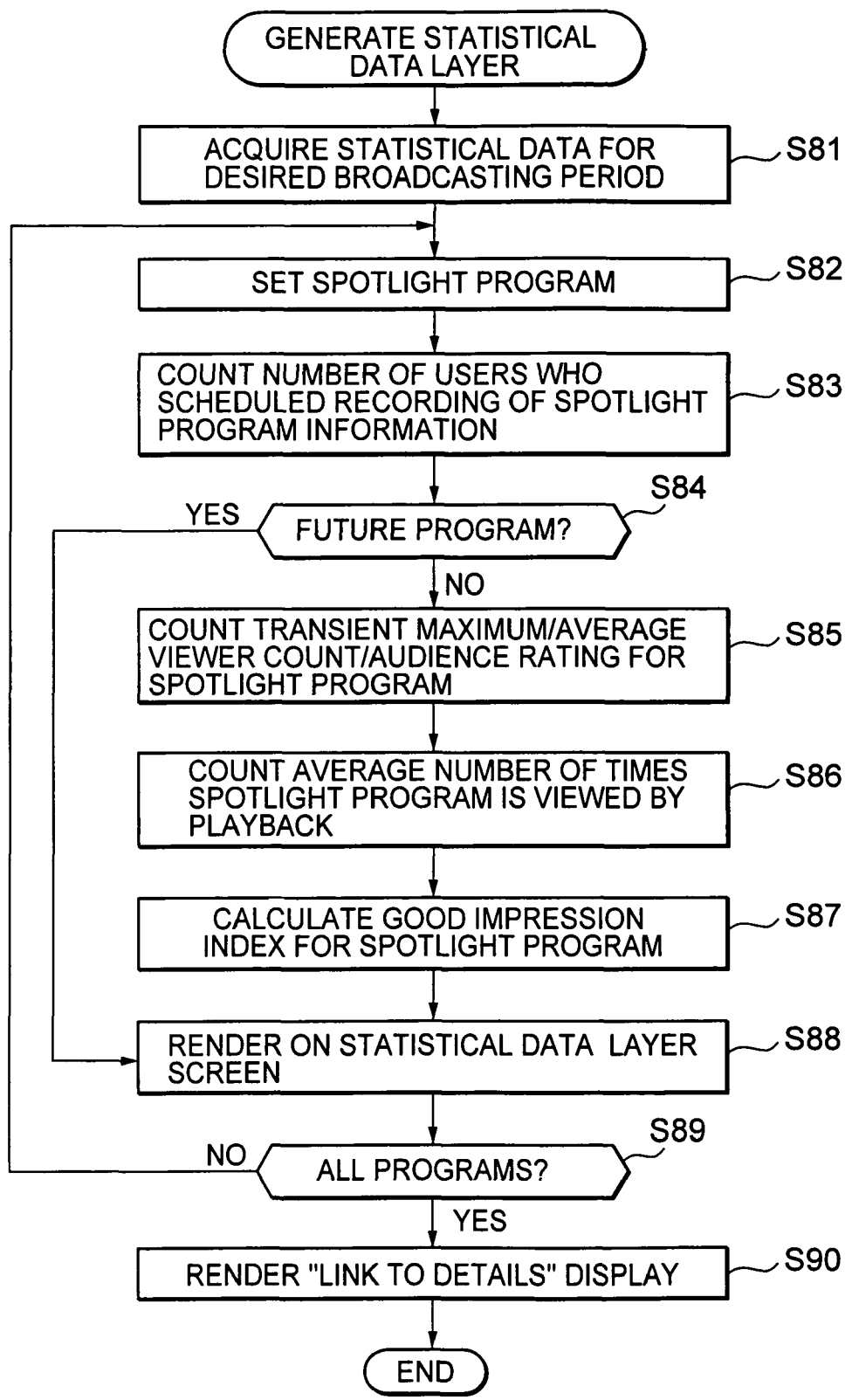
FIG. 41 is a flowchart explaining a process of generating the statistical data layer screen.

It should be noted that the statistical data layer screen generating process of FIG. 41 may involve, e.g., obtaining a "recording scheduling rating" and a "playback viewing rating" for a program by dividing an average count of users scheduled recording and an average recording/playback viewer count, for reflection on the statistical data layer screen. Further, the statistical data layer screen generating process may also involve, e.g., obtaining a total viewer count as a total viewer count for a program by adding an average viewer count and an average recording/playback viewer count for the program, and a "total audience rating" by dividing the total viewer count by an active user count, for reflection on the statistical data layer screen. Furthermore, the statistical data layer screen generating process may even involve, e.g., obtaining a "playback audience rating" representing what percentage of users who scheduled a program for recording viewed the program by playback, by dividing an average recording/playback viewer count for the program by an average count of users scheduled recording for the program, for reflection on the statistical data layer screen.

Figure 43:
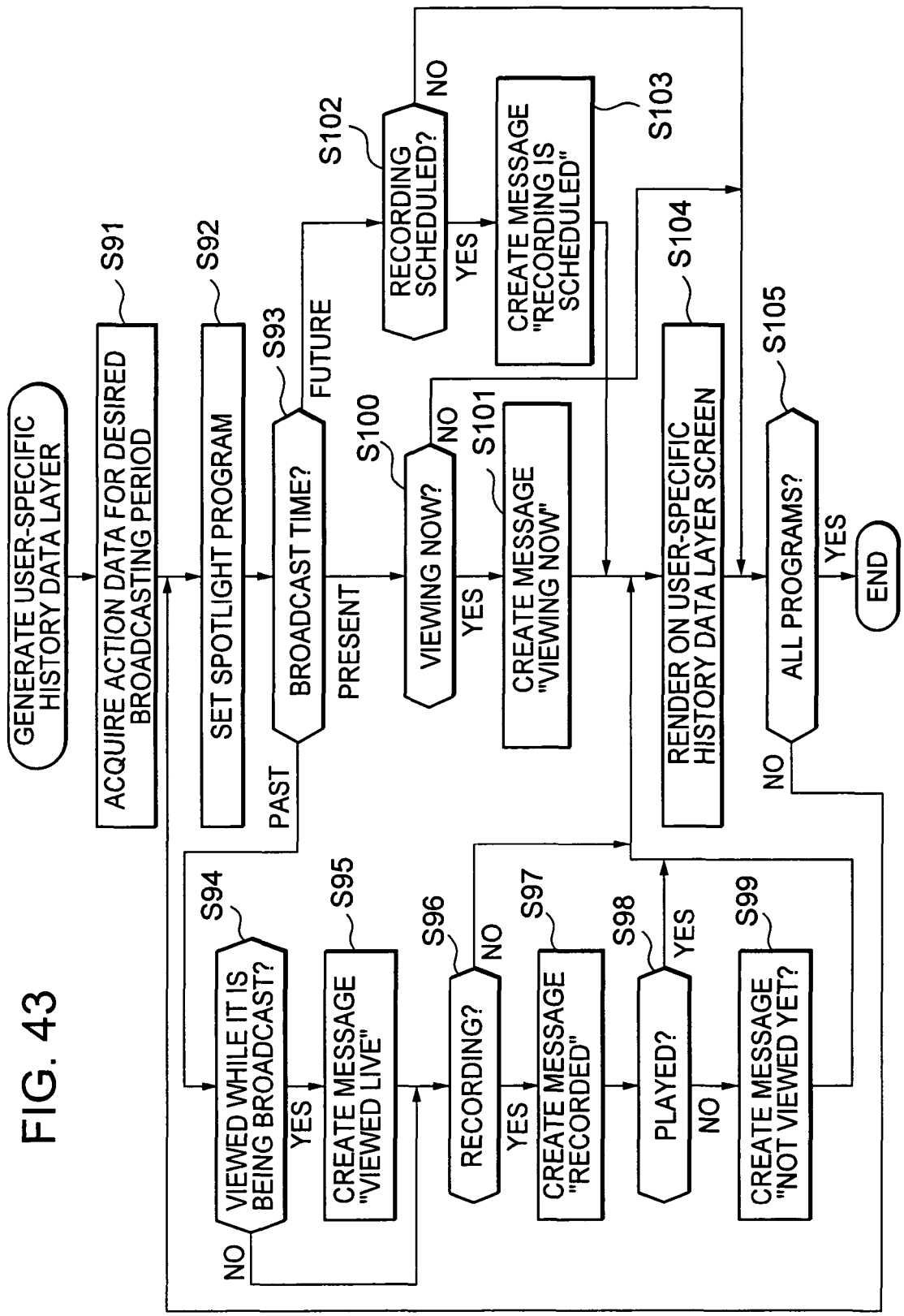
FIG. 43 is a flowchart explaining a process of generating the user-specific history data layer screen.

Referring next to a flowchart of FIG. 43, a process of generating the user-specific history data layer screen shown in FIG. 28 above will be described, which is performed in step S75 of FIG. 21.

First in step S91, the program information page creation server 55 acquires action history data (hereinafter referred to as "action history data for processing" whenever applicable) in which an actual viewing date/time, a broadcast time-based viewing date/time, or a recording start date/time as a main key is included in a desired broadcasting period, from any corresponding one of the three tables stored in the user-specific DB 61 and shown in FIG. 18 above, i.e., the live viewing history table, the recording/playback history table, and the recording schedule history table, which corresponding one of the tables belongs to a user who is authenticated in step S61 of FIG. 20, and then proceeds to step S92. In step S92, the program information page creation server 55 sets one of programs to be broadcast during the desired broadcasting period which is not designated as a spotlight program yet, as a spotlight program, and then proceeds to step S93.

In step S93, the program information page creation server 55 determines when the spotlight program is broadcast (was broadcast).

In a case where it is determined in step S93 that the spotlight program is a program whose broadcast has already ended (past program), the program information page creation server 55 proceeds to step S94 to refer to the action history data for processing acquired in step S91 to determine whether or not the user of the user terminal 2 viewed the spotlight program during its broadcast time. In a case where it is determined in step S94 that the user did not view the spotlight program during its broadcast time, the program information page creation server 55 skips step S95 to proceed to step S96.

On the other hand, in a case where it is determined in step S94 that the user viewed the spotlight program during its broadcast time, i.e., in a case where action history data representing that the user viewed the spotlight program during its broadcast time is found in the action history data for processing, the program information page creation server 55 proceeds to step S95 to create a message, e.g., "Viewed live" representing that the user took an action corresponding to the action history data, and then proceeds to step S96.

In step S96, the program information page creation server 55 refers to the action history data for processing acquired in step S91 to determine whether or not the spotlight program was recorded. In a case where it is determined in step S96 that the spotlight program was recorded, the program information page creation server 55 skips steps S97 to S99 to proceed to step S104.

On the other hand, in a case where it is determined in step S96 that the spotlight program was recorded, i.e., in a case where action history data representing that the user scheduled the spotlight program for recording is found in the action history data for processing (and in a case where action history data representing that the user cancelled the recording schedule for the spotlight program is not found), the program information page creation server 55 proceeds to step S97 to create a message, e.g., "Recorded" representing that the user took an action corresponding to the action history data, and then proceeds to step S98.

In step S98, the program information page creation server 55 refers to the action history data for processing acquired in step S91 to determine whether or not the spotlight program recorded by the user terminal 2 was played. In a case where it is determined in step S98 that the spotlight program was played, the program information page creation server 55 skips step S99 to proceed to step S104.

On the other hand, in a case where it is determined in step S98 that the spotlight program was not played, i.e., in a case where action history data representing that the user viewed the spotlight program by playback is not found in the action history data for processing, the program information page creation server 55 proceeds to step S99 to create a message, e.g., "Not viewed yet" representing that the user has not taken an action corresponding to the action history data, and then proceeds to step S104.

On the other hand, in a case where it is determined in step S93 that the spotlight program is a program being currently broadcast (present program), the program information page creation server 55 proceeds to step S100 to refer to the action history data for processing acquired in step S91 to determine whether or not the user of the user terminal 2 is actually viewing the spot light program. In a case where it is determined in step S100 that the user is not viewing the spotlight program, the program information page creation server 55 skips steps S101 and S104 to proceed to step S105.

On the other hand, in a case where it is determined in step S100 that the user is viewing the spotlight program, i.e., in a case where action history data representing that the user is viewing the spotlight program is found in the action history data for processing, the program information page creation server 55 proceeds to step S101 to create a message, e.g., "Viewing now" representing that the user took an action corresponding to the action history data, and then proceeds to step S104.

On the other hand, in a case where it is determined in step S93 that the spotlight program is a program which is not broadcast yet but is now to be broadcast (future program), the program information page creation server 55 proceeds to step S102 to refer to the action history data for processing acquired in step S91 to determine whether or not the user of the user terminal 2 has scheduled the spotlight program for recording. In a case where it is determined in step S102 that the user has not scheduled the spotlight program for recording, the program information page creation server 55 skips steps S103 and S104 to proceed to step S105.

On the other hand, in a case where it is determined in step S102 that the user has scheduled the spotlight program for recording, i.e., in a case where action history data representing that the user has scheduled the spotlight program for recording is found (and in a case where action history data representing that the user has cancelled the recording schedule for the spotlight program is not found) in the action history data for processing, the program information page creation server 55 proceeds to step S103 to create a message, e.g., "Scheduled" representing that the user took an action corresponding to the action history data, and then proceeds to step S104.

In step S104, the program information page creation server 55 renders a message created as to the spotlight program in a box of the spotlight program on the user-specific history data layer screen, and then proceeds to step S105. Note thin step S104 is skipped if a message is not created at any of steps S97, S99, S100, S103 as to the spotlight program.

In step S105, the program information page creation server 55 determines whether or not all the programs to be broadcast during the desired broadcasting period are treated as a spotlight program. In a case where it is determined in step S105 that all the programs to be broadcast during the desired broadcasting period are not treated as a spotlight program, the program information page creation server 55 returns to step S92, where a program not treated as a spotlight program yet is newly set as a spotlight program and similar processing is repeated thereafter.

On the other hand, in a case where it is determined in step S105 that all the programs to be broadcast during the desired broadcasting period are treated as a spotlight program, the program information page creation server 55 terminates the user-specific history data layer screen generating process.

As a result of the process described above, a user-specific history data layer screen shown in FIG. 28 above is generated.

Figure 44:
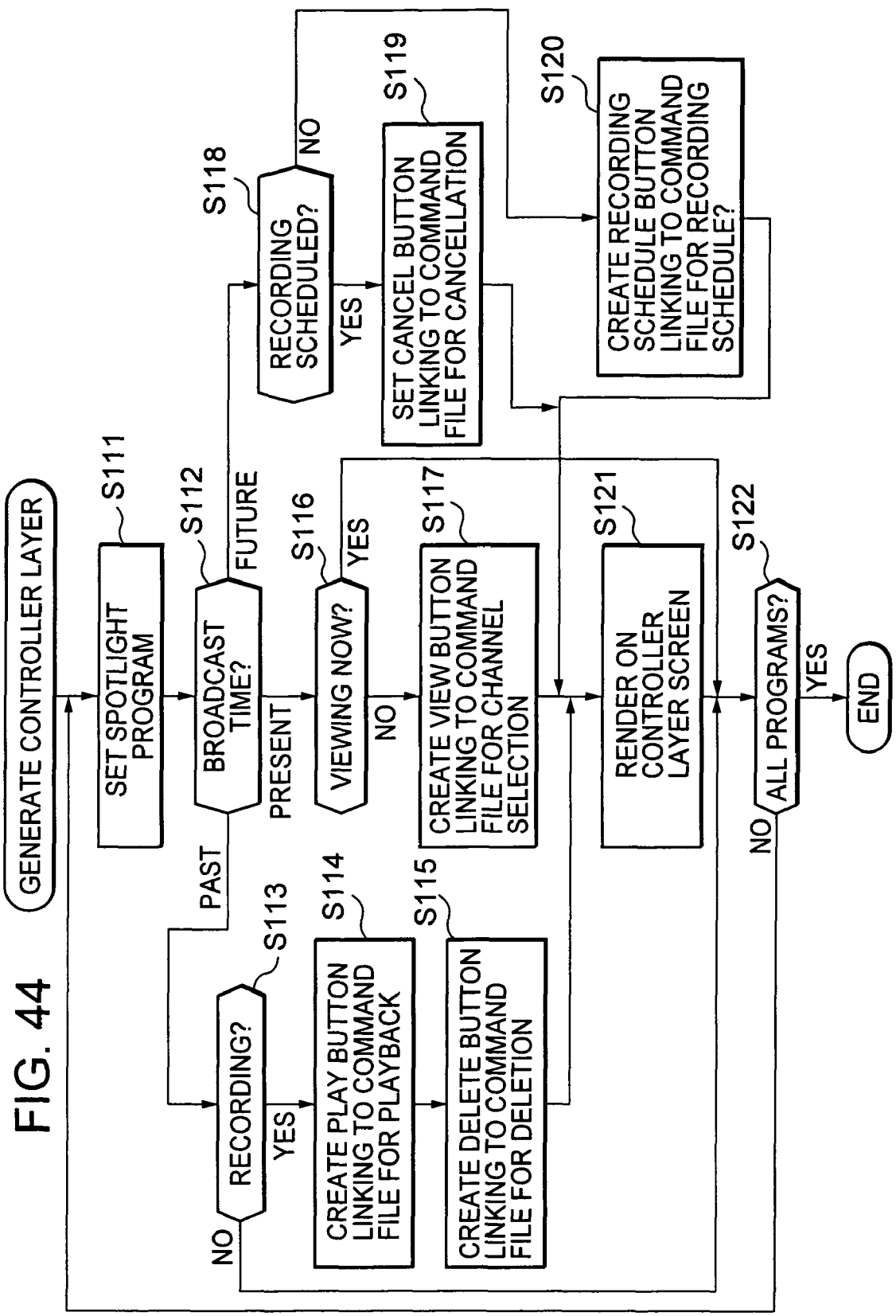
FIG. 44 is a flowchart explaining a process of generating the controller layer screen.

Referring next to a flowchart of FIG. 44, a process of generating the controller layer screen shown in FIG. 30 above will be described, which is performed in step S76 of FIG. 21.

First in step S111, the program information page creation server 55 sets one of programs to be broadcast during a desired broadcasting period which is not designated as a spotlight program yet, as a spotlight program, and then proceeds to step S112.

In step S112, the program information page creation server 55 determines when the spotlight program is broadcast (was broadcast).

In a case where it is determined in step S112 that the spotlight program is a program whose broadcast has already ended (past program), the program information page creation server 55 proceeds to step S113 to refer to action history data of a user of a user terminal 2 registered in the user-specific DB 61 and authenticated in step S61 of FIG. 20 to determine whether or not the spotlight program was recorded in the user terminal 2. In a case where it is determined in step S113 that the spotlight program was recorded, the program information page creation server 55 skips steps S114, S115, and S121 to proceed to step S122.

On the other hand, in a case where it is determined in step S113 that the spotlight program was recorded, i.e., in a case where action history data representing that the user scheduled the spotlight program for recording is found (and in a case where action history data representing that the user has cancelled the recording schedule for the spotlight program is not found) in the action history data for processing, the program information page creation server 55 proceeds to step S114 to create for acquisition a play button 111 (FIG. 30) for linking to a command file for playback, which is a command file instructing execution of processing for playing the recorded spotlight program, and then proceeds to step S115. In step S115, the program information page creation server 55 creates for acquisition a delete button 112 (FIG. 30) for linking to a command file for deletion, which is a command file instructing execution of processing for deleting the recorded spotlight program from the HD 15, and then proceeds to step S121.

On the other hand, in a case where it is determined in step S112 that the spotlight program is a program being currently broadcast (present program), the program information page creation server 55 proceeds to step S116 to refer to the action history data for processing of the user of the user terminal 2 registered in the user-specific DB 61 and authenticated in step S61 of FIG. 20 to determine whether or not the user of the user terminal 2 is actually viewing the spotlight program. In a case where it is determined in step S116 that the user is viewing the spotlight program, the program information page creation server 55 skips steps S117 and S121 to proceed to step S122.

On the other hand, in a case where it is determined in step S116 that the user is not viewing the spotlight program, i.e., in a case where action history data representing that the user is viewing the spotlight program is not found in the action history data for processing of the user of the user terminal 2, the program information page creation server 55 proceeds to step S117 to create for acquisition a view button 113 (FIG. 30) for linking to a command file for channel selection, which is a command file for instructing execution of processing by which the user selects a channel for the spotlight program not currently viewed for display, and then proceeds to step S121.

On the other hand, in a case where it is determined in step S112 that the spotlight program is a program now to be broadcast (future program), the program information page creation server 55 proceeds to step S118 to refer to the action history data for processing of the user of the user terminal 2 registered in the user-specific DB 61 and authenticated in step S61 of FIG. 20 to determine whether or not the user of the user terminal 2 has scheduled the spotlight program for recording. In a case where it is determined in step S118 that the user has scheduled the spotlight program for recording, i.e., in a case where action history data representing that the user has scheduled the spotlight program for recording is found (and in a case where action history data representing that the user has cancelled the recording schedule for the spotlight program is not found) in the action history data for processing of the user of the user terminal 2, the program information page creation server 55 proceeds to step S119 to create for acquisition a cancel button 115 (FIG. 30) for linking to a command file for cancellation, which is a command file for instructing execution of processing for canceling a recording schedule for the spotlight program scheduled to be recorded, and then proceeds to step S121.

On the other hand, in a case where it is determined in step S118 that the user has not scheduled the spotlight program for recording, i.e., in a case where action history data representing that the user has scheduled the spotlight program for recording is not found (or in a case where action history data representing that the user has scheduled the spotlight program for recording is found but action history data representing that the user has cancelled the recording schedule for the spotlight program is also found) in the action history data for processing belonging to the user of the user terminal 2, the program information page creation server 55 proceeds to step S120 to create for acquisition a schedule button 114 (FIG. 30) for linking to a command file for scheduling, which is a command file for instructing execution of processing for scheduling the spotlight program for recording, and then proceeds to step S121.

In step S121, the program information page creation server 55 renders the play button 111, the delete button 112, the view button 113, the schedule button 114 or the cancel button 115 created as to the spotlight program in a box of the spotlight program on the controller layer screen, and then proceeds to step S122. It should be noted that step S121 is skipped in a case where a button is not created at any of steps S114, S115, S117, S119, S120 as to the spotlight program.

In step S122, the program information page creation server 55 determines whether or not all the programs to be broadcast during the desired broadcasting period are treated as a spotlight program. In a case where it is determined in step S122 that all the programs to be broadcast during the desired broadcasting period are not treated as a spotlight program, the program information page creation server 55 returns to step S111, where a program not treated as a spotlight program yet is newly set as a spotlight program and similar processing is repeated thereafter.

On the other hand, in a case where it is determined in step S122 that all the programs to be broadcast during the desired broad casting period are treated as a spotlight program, the controller layer screen generating process is terminated.

As a result of the processing described above, the controller layer screen shown in FIG. 30 above is generated.

Next, in the EPG page shown in FIG. 34, the link display "Details" 105 is linked to a web page (hereinafter referred to as "detailed viewing information page" whenever applicable) for more detailed statistical data, as described with reference to FIG. 26 above.

Therefore, in a case where the EPG page shown in FIG. 34 above is displayed on the web browser 42 of the user terminal 2, when the user, e.g., clicks a link display "Details" 105 in a box of a certain program, the web browser 42 makes a request for a detailed viewing information page linked from the link display "Details" 105, to the server system 4. In this case, in the server system 4, the web server 52 receives the request for a detailed viewing information page, and the request is transmitted to the program information page creation server 55.

Figure 45:
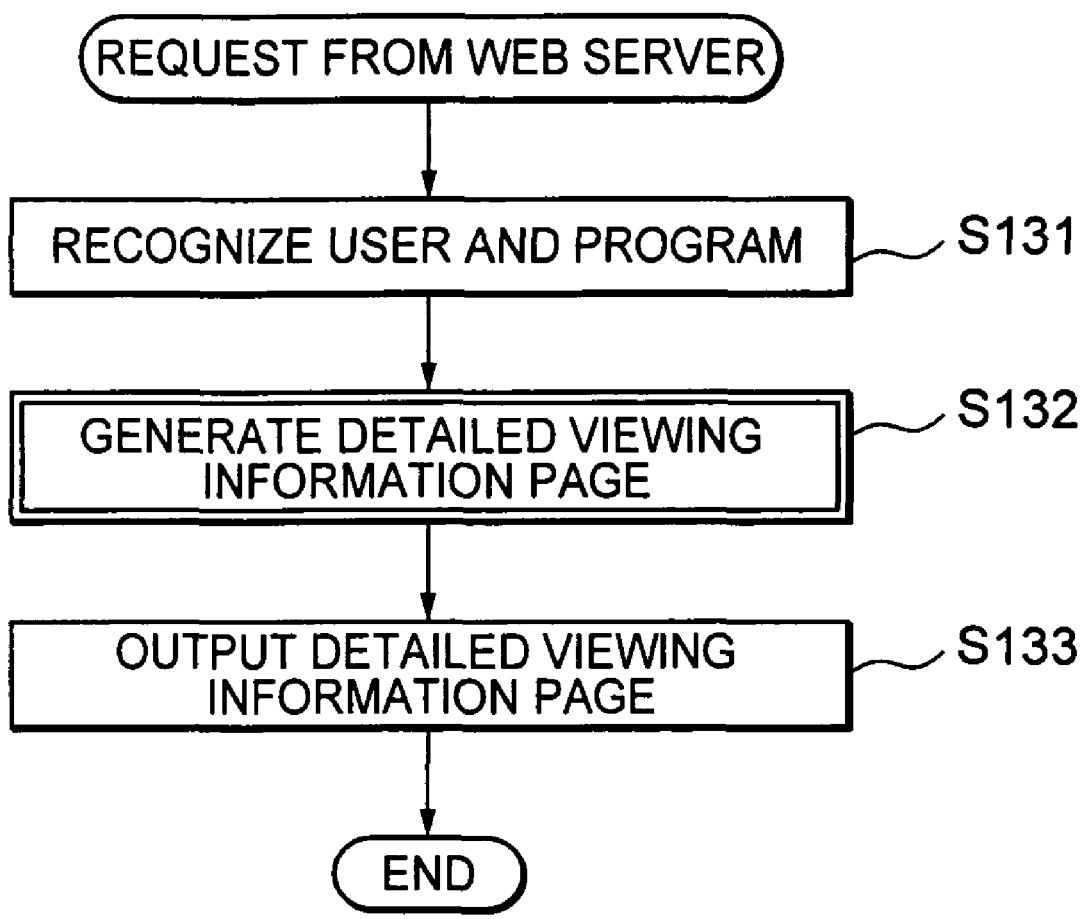
FIG. 45 is a flowchart explaining a process performed by the program information page creation server 55.

When having received the request for a detailed viewing information page from the web server 52, the program information page creation server 55 performs a process according to a flowchart of FIG. 45.

That is, first in step S131, the program information page creation server 55 recognizes a user of a user terminal 2 that transmitted the request for a detailed viewing information page, and also recognizes the program corresponding to the box in which the link display "Details" 105 linked to the requested detailed viewing information page is placed.

Here, the user of the user terminal 2 that transmitted the request for a detailed viewing information page may be recognized from, e.g., a result of user authentication performed in step S61 of FIG. 20 when an EPG page is requested from the web browser 42 of the user terminal 2.

Further, the request for a detailed viewing information page, which is transmitted from the web browser 42 when the link display "Details" 105 is clicked, includes information (e.g., a URL (Uniform Resource Locator) of the detailed viewing information page) for specifying the detailed viewing information page. Thus, the program corresponding to the box in which the link display "Details" 105 is placed may be recognized from the information.

After step S131, the program information page creation server 55 proceeds to step S132 to generate (create) the detailed viewing information page as to the program (hereinafter referred to as "recognized program" whenever applicable) recognized in step S131, using action history data registered in the user-specific DB 61 and belonging to the user (hereinafter referred to as "recognized user" whenever applicable) of the user terminal 2 recognized in step S131, and statistical data registered in the statistical data DB 62.

When having generated the detailed viewing information page in step S132, the program information page creation server 55 proceeds to step S133 to transmit the detailed viewing information page to the web browser 42 of the user terminal 2 of the recognized user via the web server 52 and the network 3, and thereafter terminates the process.

Figure 46:
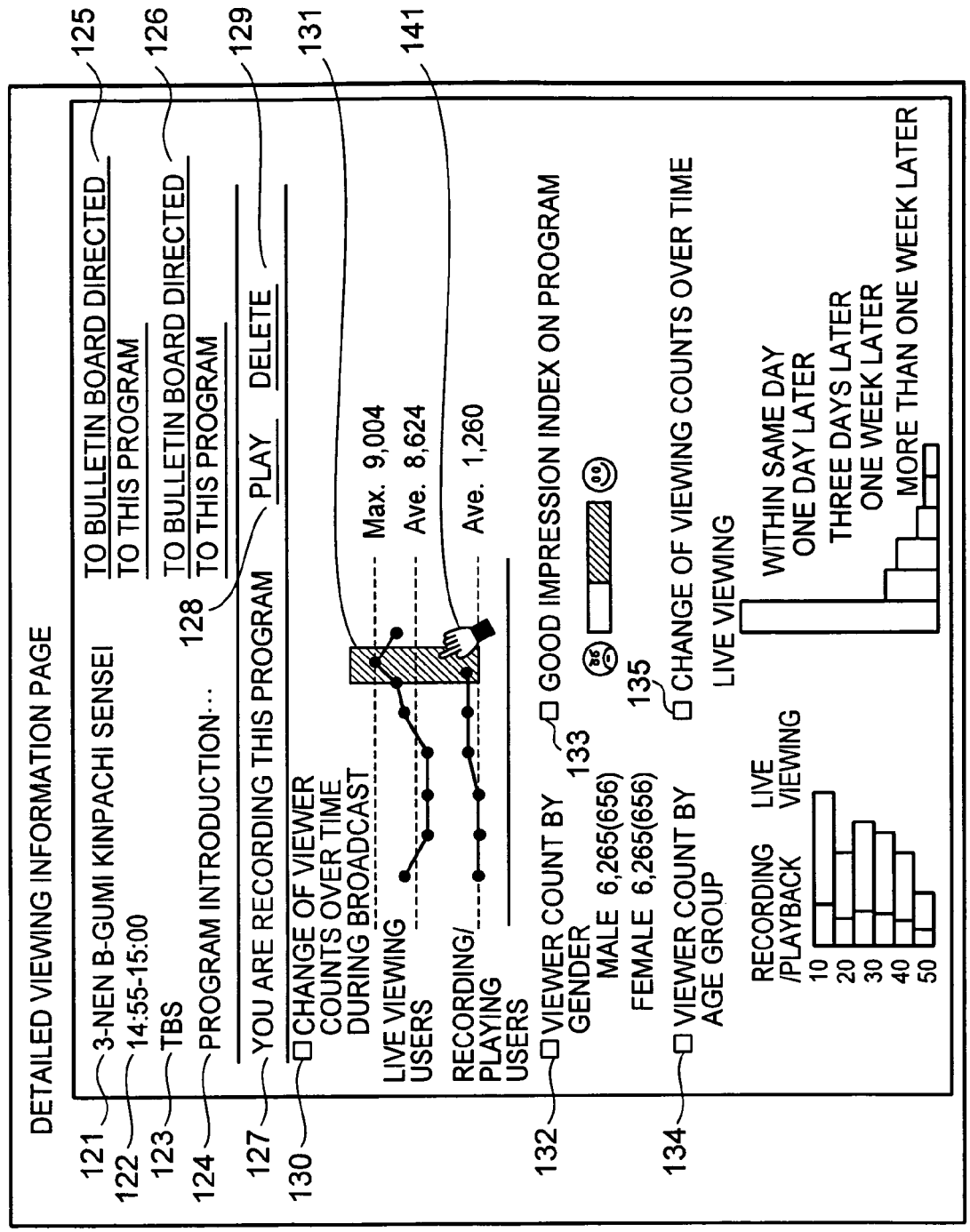
FIG. 46 is a diagram showing a detailed viewing information page.

FIG. 46 schematically shows the detailed viewing information page generated by the program information page creation server 55.

In a program title display section 121, the title of a recognized program is placed. In a broadcast time display section 122, a broadcasting start time and a broadcasting end time of the recognized program are placed. In a broadcast station name display section 123, a broadcast station name of a broadcast station that broadcasts the recognized program is placed. In a program introduction display section 124, a message for introducing contents of the recognized program is placed.

In a link display section 125, in a case where a web page about the recognized program is present over the network 3 that is the Internet, a link display in which a link to the web page is provided. In a link display section 126, in a case where a web page as a bulletin board which is a place for exchanging information about the recognized program is present over the network 3 that is the Internet, a link display in which a link to the web page is provided is placed.

Here, information placed in the program title display section 121 to the link display section 126 mentioned above is included in, e.g., program guide data registered in the EPG DB 64.

In a recording information display section 127, a message is placed, which represents whether or not the recognized user is recording the recognized program (whether or not the recognized program is being recorded in the user terminal 2 of the recognized user). Here, whether or not the recognized user is recording the recognized program is determined by referring to action history data (FIG. 18) of the recognized user, which are registered in the user-specific DB 61. In FIG. 46, in the recording information display section 127, a message "You are recording this program" representing that the user is recording the recognized program and that image data and sound data of the recognized program are being recorded on the HD 15.

In a link display section 128 or 129, a link display "Play" or "Delete" is placed which provides a link to a command file for instructing execution of processing for playing or deleting the recognized program in a case where the recognized user is recording/has recorded the recognized program. Therefore, when the link display "Play" or "Delete" is, e.g., clicked, processing similar to the case where a play button 111 or a delete button 112 mentioned above is operated is performed.

In a change-of-viewer-count-over-time display section 130, change-of-viewer-count-over-time information is placed which represents the number of users who viewed the recognized program in the form of a line graph at time intervals equal to integral multiples of a time zone.

Here, the change-of-viewer-count-over-time information placed in the change-of-viewer-count-over-time display section 130 is generated by referring to statistical data on a cell specified by a broadcast station name of a broadcast station that broadcasts the recognized program and by a time zone included in the broadcast time of the recognized program, of statistical data (FIG. 19) registered in the statistical data DB 62.

It should be noted that in the change-of-viewer-count-over-time information, the number of users who viewed the recognized program is displayed by classifying the users into, e.g., those who viewed the recognized program during its broadcast time (live viewing users), and those who recorded the recognized program and later viewed the recognized program by playback (recording/playing users).

Further, in the change-of-viewer-count-over-time information, e.g., a maximum (Max.) and a time-based average (Ave.) are displayed as to the number of live viewing users and the number of recorded/playing users.

Furthermore, in FIG. 46, the change-of-viewer-count-over-time information shows changes in the number of users (viewer count) over time, by indicating time in a horizontal direction and viewer counts in a vertical direction. The axis in the horizontal direction representing time is divided into several parts 131 each having a time interval. Each part 131 having a time interval is linked to a command file for instructing execution of playback of a portion of the recognized program corresponding to the time interval.

That is, in a part 131 having a time interval, e.g., positioned 25 minutes from the start of the recognized program is linked to the command file in which the command "Play this 25 min. after the program starts." and the like described with reference to FIGS. 31A and 31B above, are described.

The command "Play this 25 min. after the program starts." is a command that instructs playback of a program to be started 25 minutes after the start time of the program as mentioned above. Therefore, when the user moves a cursor 141 to a part 131 having a time interval positioned 25 minutes from the start of the recognized program and clicks thereon, a command file linked to the part 131 having a time interval is downloaded to the user terminal 2 from the server system 4. In the user terminal 2, the recognized program is played 25 minutes from the start time of the recognized program in accordance with the command file by the recording/playback program 45.

Therefore, the user does not view the recorded recognized program from its start to end by playback, but may view, e.g., only a portion of the recognized program which is viewed by a large number of viewers by playback.

In a viewer-count-by-gender display section 132, viewer counts of the recognized program are placed by gender. It should be noted that, in FIG. 46, a maximum and an average (a numeral in parentheses in FIG. 46) of viewer counts for individual time zones of the recognized program are placed in each gender.

In a good-impression-index-on-program display section 133, an icon is placed which is the same as the good impression index icon 104 (FIG. 26) placed in a box of the recognized program in an EPG page.

In a viewer-count-by-age-group display section 134, an average of the numbers of users who viewed the recognized program (an average of the numbers of users for individual time zones included in a broadcast time of the recognized program) is placed in each age group, while classified into live viewing users and recording/playing users.

In a change-of-viewer-count display section 135, change-of-viewer-count information representing that users viewed the recognized program after how much time elapsed from broadcast of the recognized program is placed in the form of a bar graph. In FIG. 46, the number of users who viewed the recognized program during its broadcast time, the number of users who recorded the recognized program and viewed the program by playback within the same day, the numbers of users who viewed the recognized program by playback one day later, two to three days later, four days to one week later, the number of users who viewed the recognized program by playback more than one week later are displayed in the form of a bar graph as the change-of-viewer-count information.

The viewer count for the recognized program in each gender placed in the change-of-viewer-count-by-gender display section 132, the viewer count for the recognized program in each age group placed in the change-of-viewer-count-by-age-group display section 134, and the change-of-viewer-count information placed in the change-of-viewer-count display section 135 above are generated by referring to statistical data on a cell specified by a broadcast station name of a broadcast station that is broadcasting the recognized program and by a time zone included in a broadcast time of the recognized program, of statistical data (FIG. 19) registered in the statistical data DB 62.

Next, the program information page creation server 55 of the server system 4 performs user authentication in step S61 of FIG. 20 as mentioned above, to recognize users who requested EPG pages, and thus provides, to each of the recognized users (recognized users), an EPG page in which action history data on the user-specific history data layer screen (FIG. 28) and operation data on the controller layer screen (FIG. 30) are placed, i.e., an EPG page customized for each recognized user, so to speak.

Figure 47:
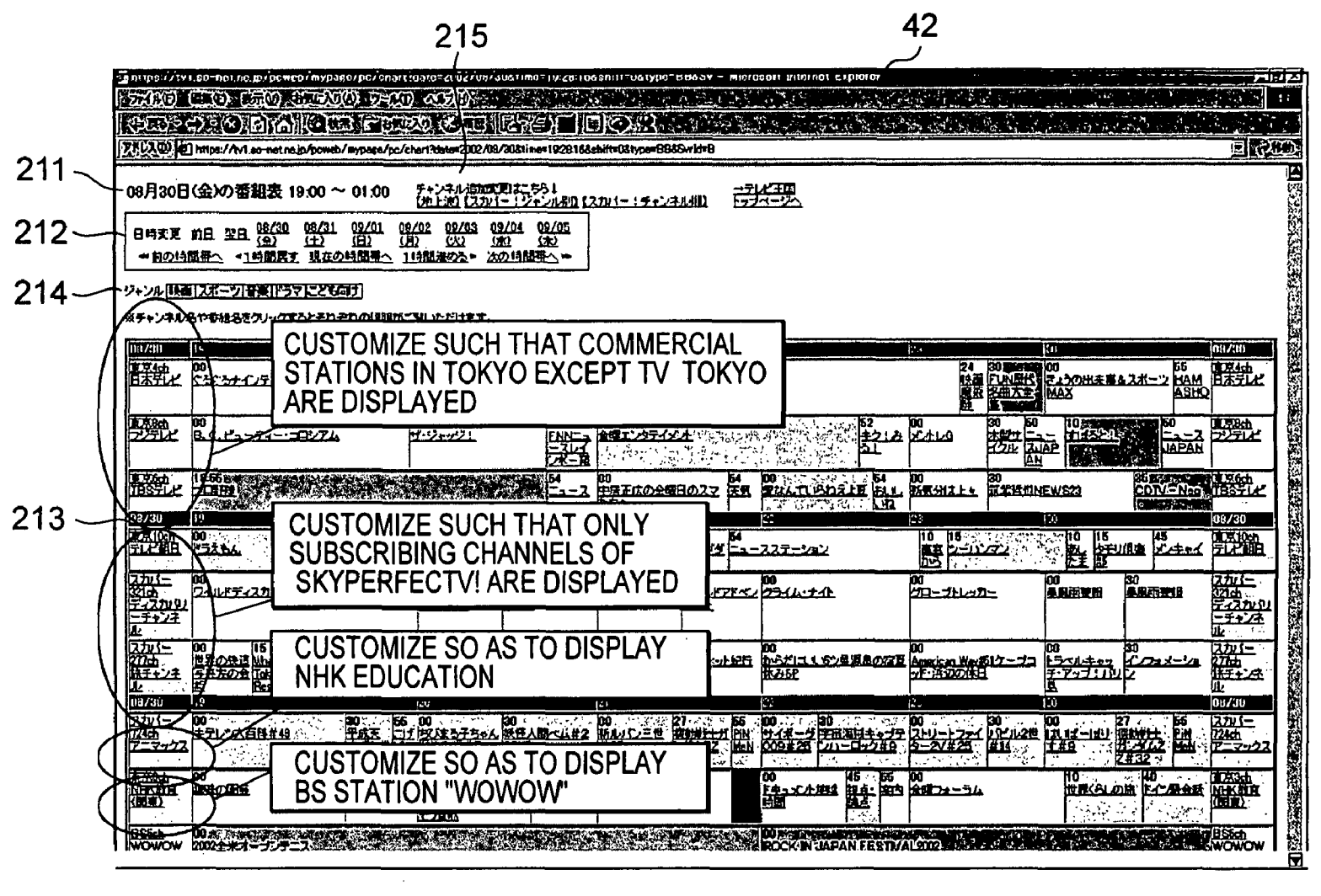

The program information page creation server 55 may customize an EPG page, e.g., as to a layout of its EPG layer screen (FIG. 22), besides action history data and operation data. FIG. 47 shows an EPG page whose EPG layer screen is customized, on the web browser 42 of the user terminal 2.

In a heading section 211, information is placed, which represents that an EPG (program guide) placed in an EPG section 213 is for programs to be broadcast as of when.

In a date/time changing section 212, a date/time of an EPG placed in the EPG 213 is placed in a manner linked to an EPG page corresponding to the date/time. When the date/time placed in the EPG 213 is, e.g., clicked, an EPG page is displayed, in which the EPG placed in the EPG section 213 is changed to an EPG corresponding to the date/time that is, e.g., clicked.

In the EPG section 213, an EPG is placed. Although an EPG of an EPG page, e.g., of FIG. 34 mentioned above indicates times in a vertical direction and broadcast station names in a horizontal direction, in FIG. 47, the layout of the EPG is customized such that broadcast station names are indicated in a vertical direction and times are indicated in a horizontal direction.

Additionally, the layout of an EPG may be customized such that information about programs to be broadcast by a certain broadcast station (channel) is displayed or is not displayed. In FIG. 47, the EPG is customized so as not to display information about programs to be broadcast by broadcast stations that broadcast programs which the user rarely views, or by broadcast stations that broadcast ones of subscription programs which the user does not subscribe to.

In a channel changing section 215, a link display is placed, which is linked to a web page for changing broadcast stations broadcasting programs to be displayed on an EPG displayed in the EPG section 213. When the link display placed in the channel changing section 215 is, e.g., clicked, the server system 4 transmits a web page for changing broadcast stations broadcasting programs to be displayed on an EPG placed in the EPG section 213, to the web browser 42 of the user terminal 2, whereby the user may change broadcast stations broadcasting programs to be displayed on the EPG, in the web page.

Next, while the server system 4 generates an EPG page to provide the EPG page to the user terminal 2 in the above-mentioned case, an EPG page may be generated by the user terminal 2.

Figure 48:
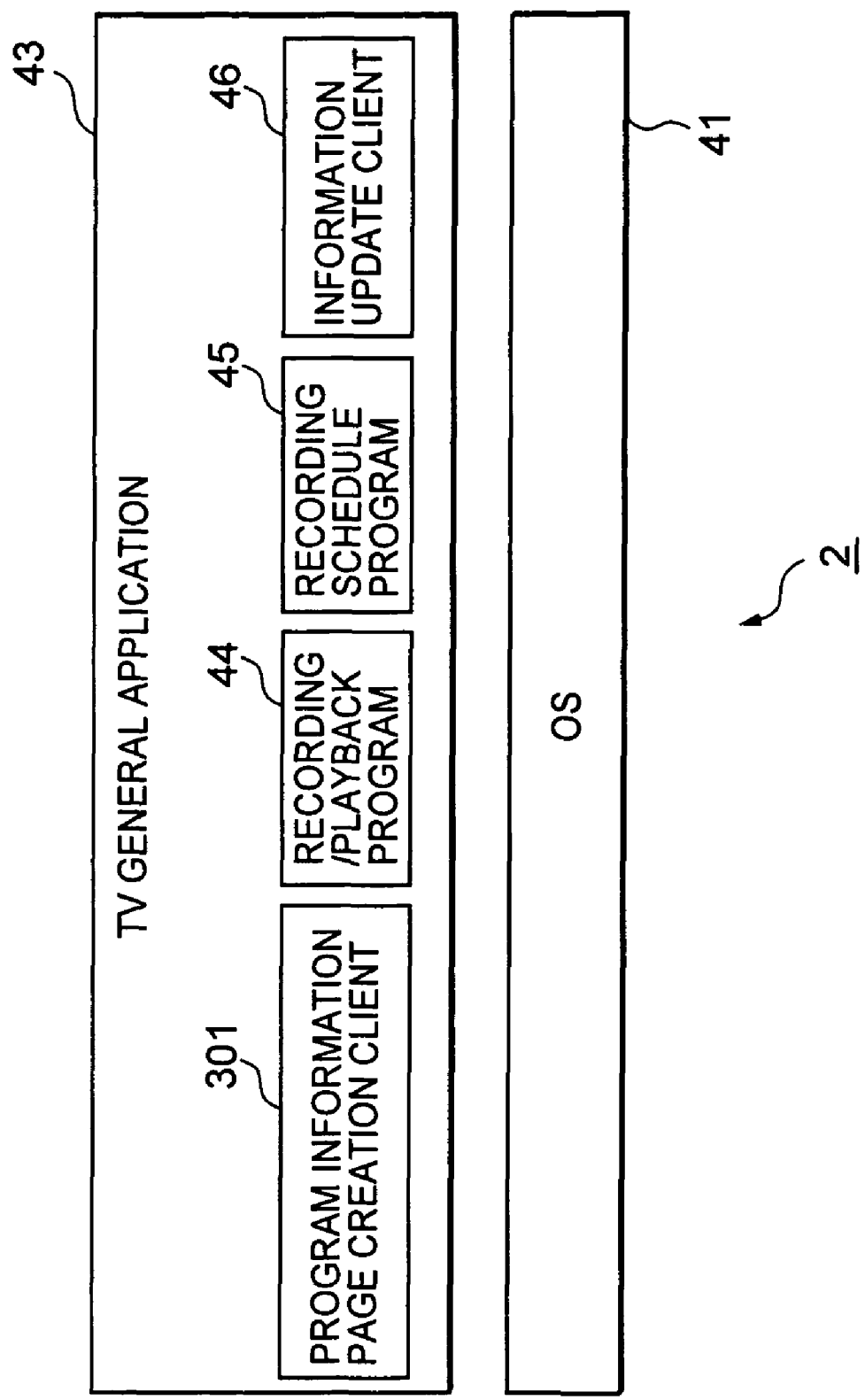
FIG. 48 is a diagram showing another example configuration of programs executed by the user terminal 2.

FIG. 48 shows an example configuration of programs executed by the CPU 11 (FIG. 2) of the user terminal 2. It should be noted that parts corresponding to the case of FIG. 4 are denoted by the same reference numerals, and that their descriptions are hereinafter omitted whenever applicable.

The configuration of programs of FIG. 48 is similar to the configuration of programs of FIG. 4 except that the web browser 42 is not provided and that a program information page creation client 301 is added as a program (module) constituting the TV general application 43.

The program information page creation client 301 generates (creates) an EPG page similarly to the program information page creation server 55.

Figure 49:
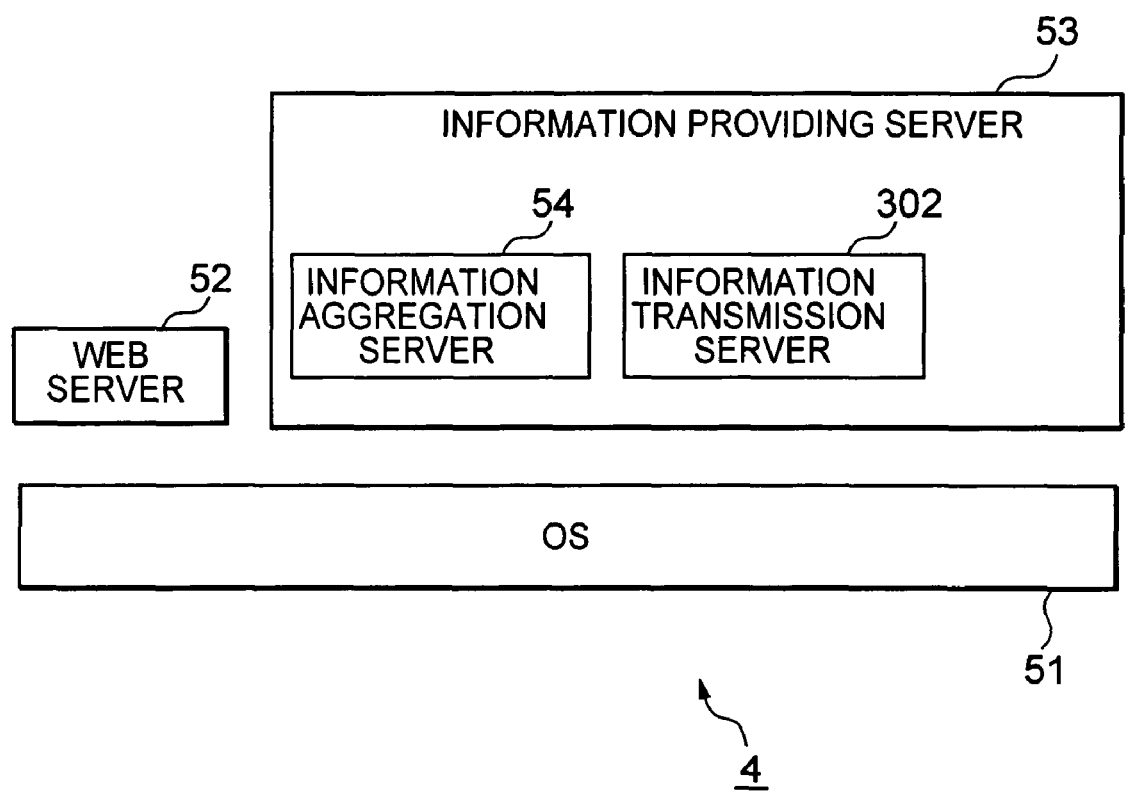
FIG. 49 is a diagram showing another example configuration of programs executed by the server system 4.

Next, FIG. 49 shows an example configuration of programs executed by the CPU 31 (FIG. 4) of the server system 4. It should be noted that parts corresponding to the case of FIG. 5 are denoted by the same reference numerals, and that their descriptions are hereinafter omitted whenever applicable.

The configuration of programs of FIG. 49 is similar to the configuration of programs of FIG. 5 except that an information transmission server 302 is provided in place of the program information page creation server 55.

The information transmission server 302 receives a request for data from the program information page creation client 301 of the user terminal 2 via the web server 52, and transmits the requested data to the program information page creation client 301 via the web server 52.

Figure 50:
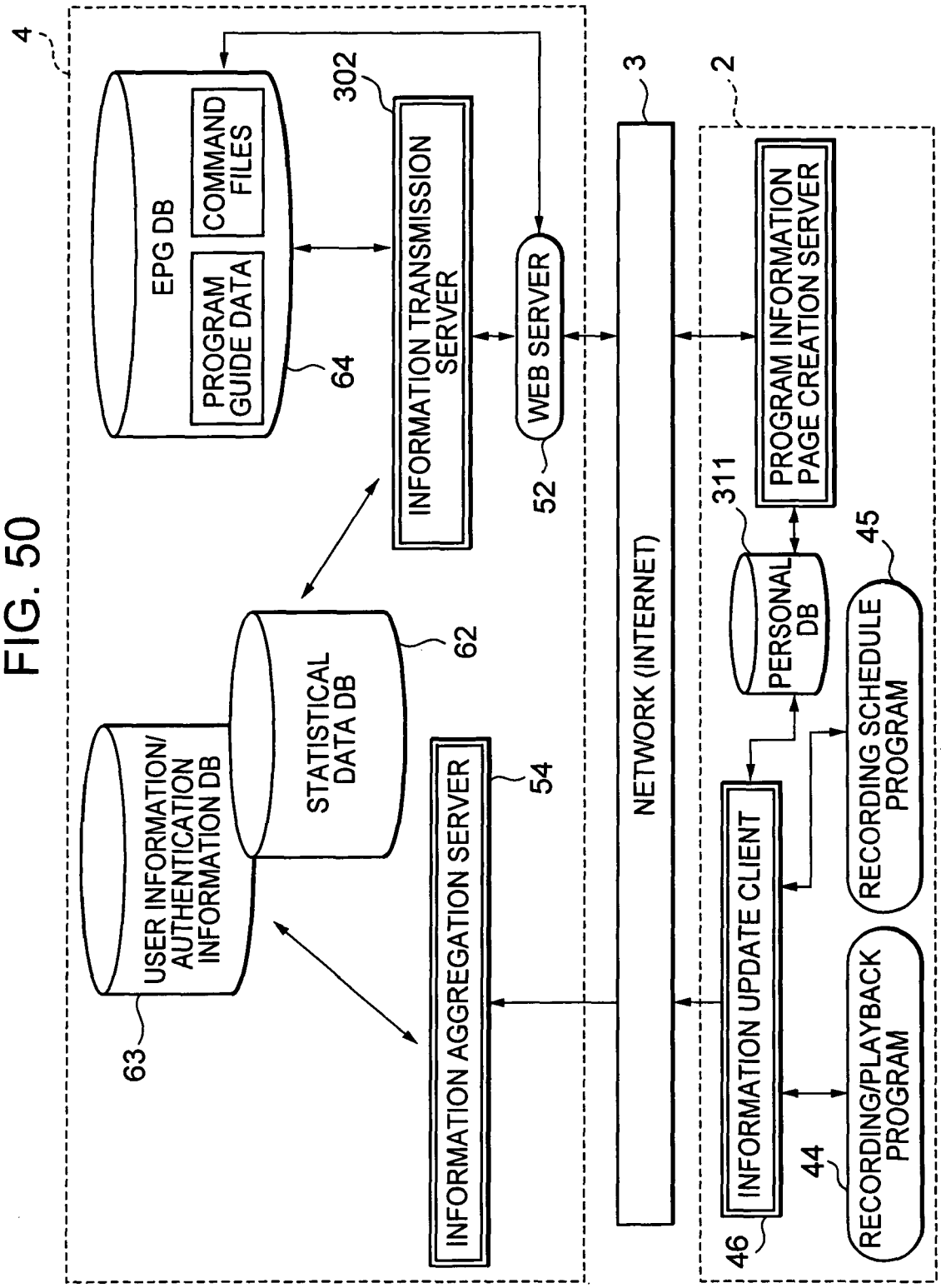
FIG. 50 is a diagram showing another example functional configuration of the user terminal 2 and the server system 4.

Next, FIG. 50 shows an example functional configuration of the user terminal 2 in the program configuration of FIG. 48 and the server system 4 in the program configuration of FIG. 49. It should be noted that parts corresponding to the case of FIG. 6 are denoted by the same reference numerals, and that their descriptions are hereinafter omitted whenever applicable.

That is, in FIG. 50, the user terminal 2 is configured similarly to the case in FIG. 6 except that the program information page creation server 301 is provided in place of the web browser 42 and that a personal DB 311 is newly provided. Further, in FIG. 50, the server system 4 is configured similarly to the case in FIG. 6 except that the information transmission server 302 is provided in place of the program information page creation server 55 and that the user-specific DB 61 is not provided.

The program information page creation client 301 also has a function as the web browser 42, and makes a request to the web server 52 for data necessary to generate an EPG page via the network 3 that is the Internet.

Here, the program information page creation client 301 may be configured without the function as the web browser 42. However, in this case, the program information page creation client 301 must use an application, such as the web browser 42 that allows exchange of data with the web server 52, for transmission/reception to/from the web server 52. Further, the program information page creation client 301 may also be configured such that it may communicate with the information transmission server 302 by a predetermined communication protocol, without the function as the web browser 42 In this case, the program information page creation client 301 may communicate with the information transmission server 302 directly, and thus there is no need to provide the web server 52 in the server system 4.

When receiving a request for data from the program information page creation client 301, the web server 52 transfers the request for data to the information transmission server 302. The information transmission server 302 reads the requested data from the statistical data DB 62, the user information/authentication information DB 63, or the EPG DB 64 for transmission to the program information page creation client 301 via the web server 55 and the network 3.

The program information page creation client 301 generates an EPG page using the data transmitted thereto from the information transmission server 302, and further data stored in the personal DB 311 as necessary, for display on (the display of) the output section 17.

The personal DB 311 is a file on the HD 15, and stores action information (action history data) of a user of a user terminal 2. That is, the personal DB 311 is supplied with action information which the information update client 46 updates to the information aggregation server 54, and the personal DB 311 stores the action information. Therefore, the personal DB 311 stores action information similarly to the user-specific DB 61 of FIG. 6. However, in the user-specific DB 61 of FIG. 6, action information uploaded to the server system 4 from many users is stored while divided for individual users as mentioned above, whereas in the personal DB 311 of FIG. 50, only action information about a user of a user terminal 2 is stored.

It should be noted that in an embodiment of FIG. 50, the personal DB 311 is provided in the user terminal 2. However, even in the embodiment of FIG. 50, the user-specific DB 61 may be provided in the server system 4 instated of the personal DB 311 being provided in the user terminal 2 to allow the information transmission server 302 of the server system 4 to transmit data within the user-specific DB 61 which the program information page creation client 301 of the user terminal 2 needs, to the program information page creation client 301.

Figure 51:
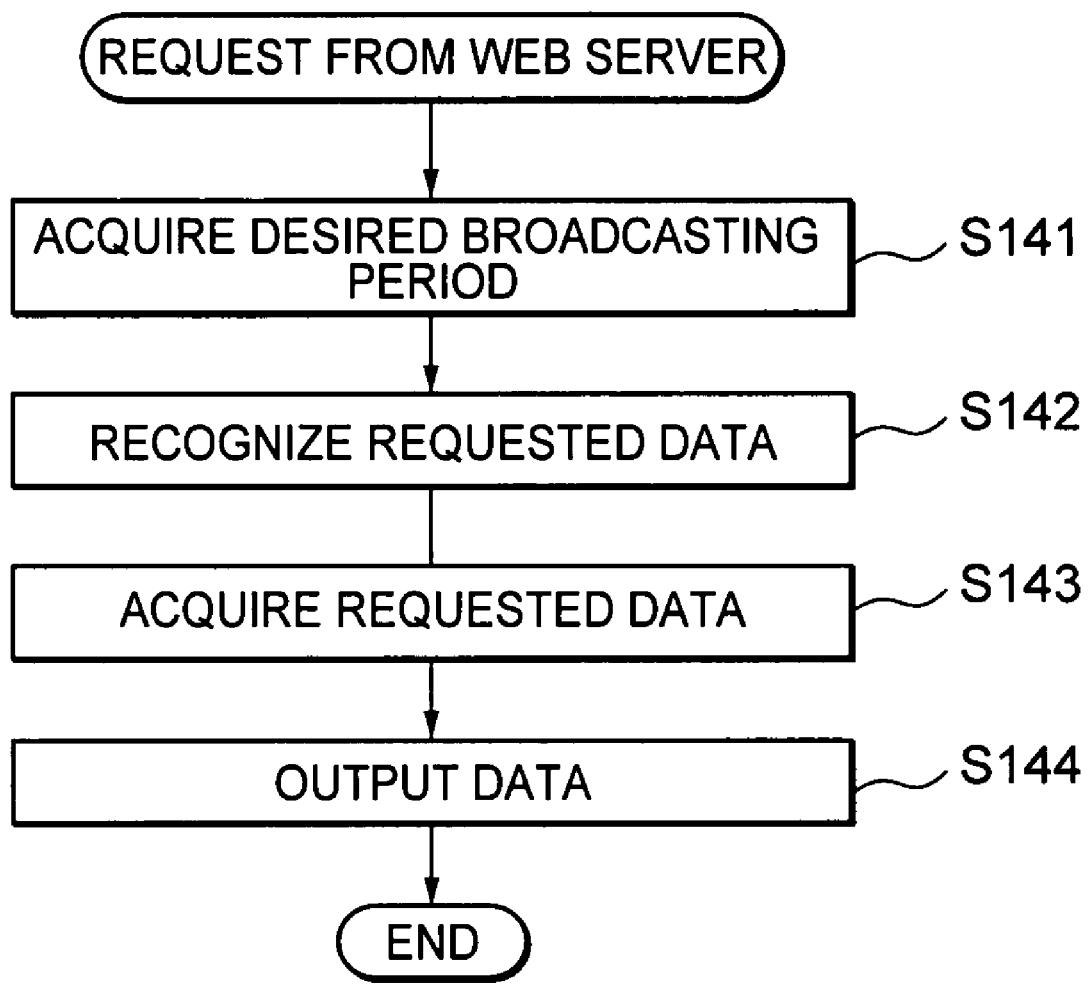
FIG. 51 is a flowchart explaining a process performed by an information transmission server 302.

Referring next to a flowchart of FIG. 51, a process performed by the information transmission server 302 of the server system 4 will be described.

In the server system 4, when having received a request for data necessary to generate an EPG page from the program information page creation client 301 of the user terminal 2 via the network that is the Internet, the web server 52 makes a request to the information transmission server 302 for the data requested from the program information page creation client 301.

When having received the request for data from the web server 52, the information transmission server 302 starts the process.

That is, first at step S141, the information transmission server 302 acquires a desired broadcasting period. That is, the program information page creation client 301 is configured to transmit a broadcasting period for programs as to which program guide data and the like are desired (desired broadcasting period), e.g., at the time of its requesting the web server 52 for data, and the information transmission server 302 acquires the desired broadcasting period transmitted thereto from the program information page creation client 301 via the web server 52.

It should be noted that the program information page creation client 301 does not necessarily have to transmit a desired broadcasting period. In a case where a desired broadcasting period is not transmitted from the program information page creation client 301, the information transmission server 302 may set, e.g., a current day (today) as a desired broadcasting period.

Further, the information transmission server 302 may perform user authentication (personal authentication) before acquiring a desired broadcasting period in step S141, similarly to the case in step S61 of FIG. 20.

After step S141, the information transmission server 302 proceeds to step S142 to recognize the data requested from the program information page creation client 301 as to all the programs to be broadcast during the desired broadcasting period, and then proceeds to step S143.

In step S143, the information transmission server 302 reads for acquisition the data recognized in step S143 from the statistical data DB 62 in which statistical data are stored, the EPG DB 64 in which program guide data and command files are stored, and then proceeds to step S144.

In step S144, the information transmission server 302 transmits the data acquired in step S143 to the program information page creation client 301 via the web server 52 and the network 3, and thereafter terminates the process.

Referring next to a flowchart of FIG. 52, a process performed by the program information page creation client 301 (FIG. 50) of the user terminal 2 will be described.

When the program information page creation client 301 is activated in the user terminal 2, first in step S151, the program information page creation client 301 connects to the web server 55 of the server system 4 via the network 3, and then proceeds to step S152.

Figure 13:
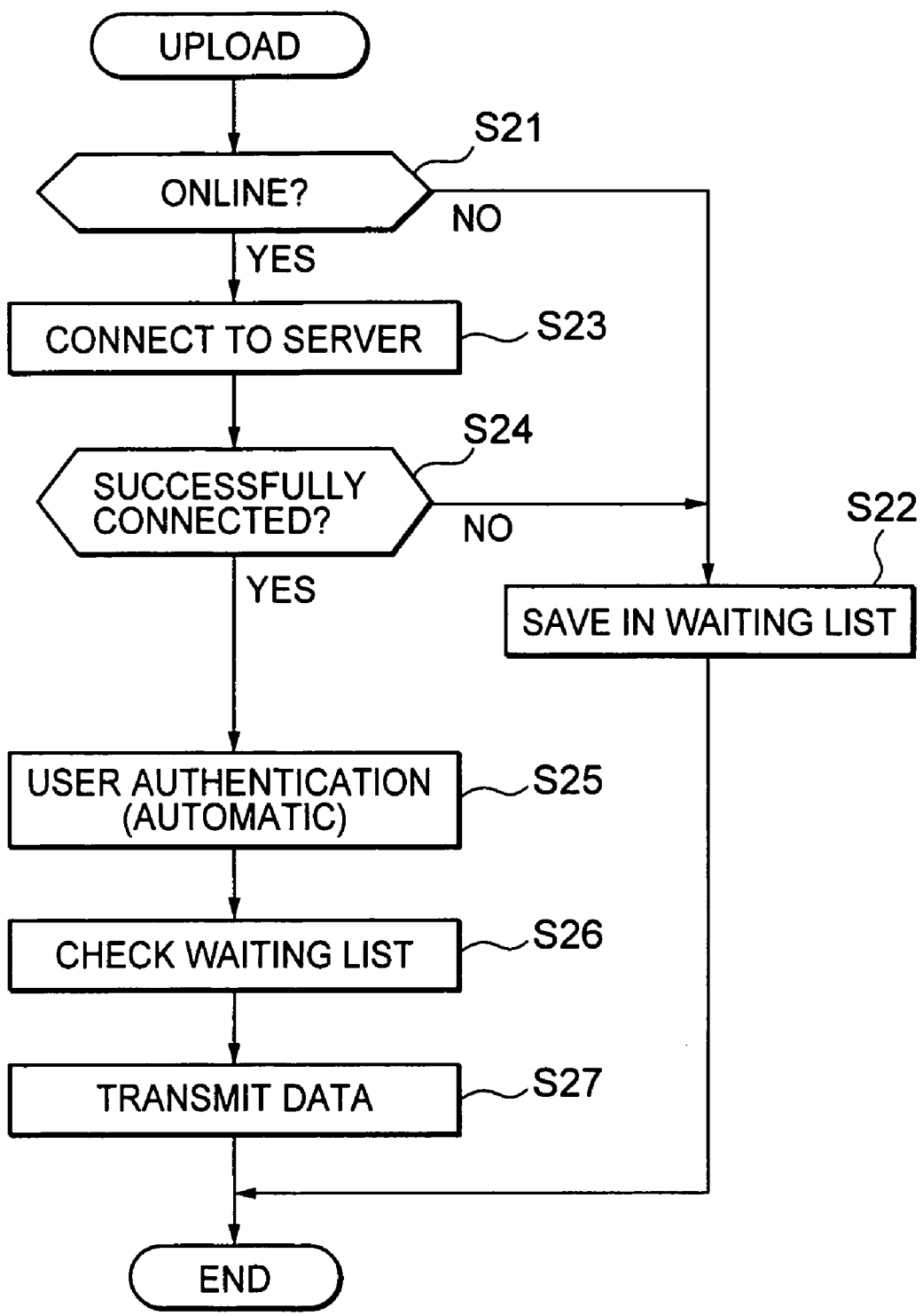
FIG. 13 is a flowchart explaining a process of uploading information.

In step S152, user authentication is performed similarly to the case in step S25 of FIG. 13. Then, the program information page creation client 301 proceeds to step S153 to display, e.g., a message prompting the user to input a desired broadcasting period, and set a period inputted by the user in accordance with the message, as the desired broadcasting period.

Here, in a case where the user does not input a desired broadcasting period, the program information page creation client 301 sets, e.g., a current day as the desired broadcasting period.

The program information page creation client 301 proceeds to step S154 to acquire data necessary for generating an EPG page as to programs to be broadcast during the desired broadcasting period by making a request to the server system 4, or acquire the data from the personal DB 311, to generate the EPG page shown in FIG. 34 above. Here, in describing the EPG page, e.g., HTML (Hyper Text Markup Language) is used, which is generally adopted in the WWW constructed on the Internet.

When having generated an EPG page in step S154, the program information page creation client 301 proceeds to step S155 to display the EPG page on (the display of) the output section 17, and thereafter terminates the process.

As described above, the program information page creation client 301 displays data acquired by request to the server system 4 and data acquired from the personal DB 311 to generate an EPG page for display.

Here, in step S154, the generation of an EPG page by the program information page creation client 301 is performed similarly to the generation of an EPG page by the program information page creation server 55 described above with reference to FIG. 21.

However, program guide data necessary for generating the EPG layer screen and statistical data necessary for generating the statistical data layer screen are acquired by the program information page creation server 55 making a request to the information transmission server 302 of the server system 4 therefor. Action history data necessary for generating the user-specific history data layer screen and the controller layer screen is acquired from the personal DB 311 of the user terminal 2.

It should be noted that in a case where the program information page creation client 301 of the user terminal 2 generates an EPG page, the program information page creation client 301 generates the controller layer screen, and thus this facilitates placement of not only operation data in which a link to a command file stored in the EPG DB 64 of the server system 4 is provided, but also a button to which a function of executing processing (e.g., playback or deletion of a recorded program) by a command described in the command file is directly allocated, on the controller layer screen.

As described above, program guide data and statistical data are acquired to generate an EPG page in which the program guide data and the statistical data are superimposed (reflected), whereby the user may easily decide whether to view or record a program by taking a look at the EPG page. That is, the user may select a program for viewing or recording by, e.g., comparing programs to be broadcast on different channels during the same time period in terms of which program on which channel exhibits high audience ratings.

Further, statistical data placed in an EPG page includes the number of users who viewed a program during its broadcast time, audience ratings for the program during its broadcast time, the number of users who scheduled the program for recording, the number of users who viewed the program recorded during its broadcast time by playback, a good impression level representing how the users feel about the program, or the like. Therefore, the user may check not only audience ratings for the program, but also the number of users who made recording schedules (this may be understood as a predicted audience ranging of the program to be broadcast in the future), the number of users who viewed the recorded program by playback (e.g., this allows the number of users who actually viewed the program and the like to be obtained by combining this with the number of users who viewed the program during its broadcast), and other factors such as how other users feel about the program into consideration to recognize degree of interest in the program shown by many users before the user decides to view or record the program.

And as the server system 4 provides an EPG page highly useful to users such as described above, the number of users who access the EPG page increases, whereby in a case where advertisements are displayed on the EPG page, tremendous amounts of profits may be earned from the advertisements.

Further, it becomes possible that the user terminal 2 automatically schedule for recording a popular program, so to speak, which many users made recording schedules, on an EPG page. In this case, information to the effect that recording of a popular program has been scheduled for recording is uploaded to the server system 4 from the user terminal 2, and thus the number of users who scheduled the popular program for recording, to be reflected in the EPG page, further increases. As a result, the popular program is evaluated as a more popular program (super popular program), and this would mean that an EPG page creates the popularity of a program.

Furthermore, of statistical data, audience ratings are obtained using the number of users of user terminals that transmitted information a predetermined times or more within a predetermined period as a population parameter, and thus highly accurate audience ratings may be obtained covering users who, e.g., view a program with a relatively high frequency.

Furthermore, in the server system 4, an EPG page is generated using data stored in the user-specific DB 61, the statistical data DB 62, the user information/authentication information DB 63, the EPG DB 64 when requested by a user, and thus the user may recognize audience ratings and the like for a program in real time. It should be noted that in a case where the web browser 42 of FIG. 6 or the program information page creation client 301 of FIG. 50 has an automatic updating function for updating (re-loading) a web page at predetermined time intervals, an EPG page displayed by the web browser 42 or the program information page creation client 301 may be updated to the latest one without particularly involving user operation.

Furthermore, it is configured such that action history data of a user is acquired to generate an EPG page in which not only program guide data and statistical data but also action history data are superimposed (reflected), whereby the user may easily recognize actions, such as viewing a program and scheduling a program for recording, which the user took, i.e., the program viewed, the program recorded, and the like, by taking a look at the EPG page.

Furthermore, it is configured such that operation data is acquired to generate an EPG page in which not only program guide data and statistical data but also operation data are superimposed (reflected), whereby the user may recognize the contents of a program by taking a look at the EPG page, and may switch recording schedules or channels on the EPG page in a case where the user finds an interesting program.

Furthermore, in an EPG page, program guide data is displayed differently according to broadcast statuses of programs, i.e., for example, for each of a program whose broadcast ended, a program now being broadcast, a program not broadcast yet, whereby the user may instantly check and see programs currently viewable and programs that may be scheduled for recording, by merely taking a look at the EPG page.

Furthermore, an EPG page may be displayed by a web browser, whereby the user may use the EPG page without having to purchase a new application. It should be noted that it may be configured such that an EPG page may be generated, displayed only by a dedicated browser such as the program information page creation client 301 (FIG. 50) mentioned above.

Furthermore, it is configured such that the user terminal 2 uploads, to the server system 4, not only information representing that the user viewed a program during its broadcast time, but also information representing that the user viewed a program recorded during its broadcast time by playback, information representing that the user scheduled a program for recording or cancelled the recording schedule, and further a good impression level representing how the user feels about a program, whereby the server system 4 may aggregate not only so-called audience ratings, but also the number of users who recorded a program, and further the number of users who viewed the recorded program by playback, how the user feels about the program, and the like.

Furthermore, it is configured such that the user terminal 2 uploads the information representing that the user viewed a program recorded during its broadcast time by playback while including an actual viewing date/time (actual viewing date/time) at which the user viewed the recorded program and a viewing date/time (broadcast time-based viewing date/time) at which the recorded program is viewed which uses the broadcast date/time of the recorded program as a reference, whereby how (e.g., how much time later) the recorded program is viewed by playback after the recording may be investigated.

Furthermore, it is configured such that statistical data aggregated for each time zone is registered in the statistical data DB 62, whereby the user may check and see not only viewer counts, counts of users scheduled recording, and the like covering the whole program, but also viewer counts, counts of users scheduled recording, and the like covering a part of the program may be checked using the time zone as a minimum unit.

Furthermore, it is configured such that action history data is registered (stored) in the user-specific DB 61 for each user, whereby an EPG page may be provided, which is customized for each user using the action history data.

Furthermore, it is configured such that the server system 4 determines whether or not information transmitted thereto from the user terminal 2 is valid and takes only valid information for aggregation of statistical data to be registered in the statistical data DB 62, whereby correct statistical data may be obtained.

Furthermore, it is configured such that the server system 4 aggregates information transmitted thereto from the user terminal 2 according to attributes such as the age group, gender, and the like of a user, whereby information aggregated according to such user attributes may be provided to the user.

Furthermore, it is configured such that an EPG page displays program guide data for one day in one page, whereby the user may obtain information about the programs of the day instantly.

In the foregoing, a case where the present invention is applied to a user terminal 2 that is a personal computer installing therein the TV general application 43 that is software having a function of recording/playing television broadcast programs has been described. Alternatively, the present invention is applicable to AV (Audio Visual) equipment, such as a television receiver, a VTR (Video Tape Recorder), and further, a HDD (HD Drive) recorder called a PVR (Personal Video Recorder).

Furthermore, in the present embodiment, it is configured such that the user terminal 2 performs all processing of receiving, recording, playing a program, uploading information to the server system 4, displaying an EPG page. However, e.g., a process of receiving, recording, playing a program, a process of uploading information to the server system 4, and a process of displaying an EPG page may be performed by different apparatuses, respectively.

That is, it may be configured such that, e.g., a VTR is connected to a personal computer via a LAN or the like, and also the personal computer is made connectable to the Internet, and the VTR receives, records, plays a program, whereas the personal computer uploads information to the server system through monitoring the VTR, and an EPG page is displayed by a portable telephone.

Specifically, in this case, when the VTR, e.g., records a program, information to the effect that, e.g., the recording has been made is uploaded to the server system 4 from the personal computer. On the other hand, the user acquires an EPG page, e.g., away from home using the portable telephone. And when the user operates, e.g., a schedule button 114 (FIG. 30) on the EPG page, a command file linked to the schedule button 114 is downloaded from the server system 4 through the portable telephone, whereby the personal computer sets a recording schedule on the VTR in accordance with the command file.

Here, in the above-mentioned case, it may also be configured such that the command file is directly downloaded to the personal computer from the server system 4. That is, in a case where the user operates the schedule button 114 on the EPG page using the portable telephone, the server system 4 stores an action that the operation button 114 is operated. On the other hand, the personal computer is set so as to check the sever system 4 whether or not the action that the operation button 114 or the like is operated is stored regularly or irregularly. In this case, when the personal computer recognizes the action that the operation button 114 or the like is operated is stored as a result of its checking the server system 4, the personal computer downloads a command file linked to the operated operation button 114 or the like from the server system 4. However, in a case where the personal computer stays connected to the server system 4 all the time, it may be configured such that by registering the personal computer with, e.g., the server system 4, when the server system 4 receives a message to the effect that the schedule button 114 or the like on the EPG page from the portable telephone, a command file linked to the operated schedule button 114 or the like is downloaded to the registered personal computer.

It should be noted that, roughly saying, at present, the user terminal 2 may access the network 3 that is the Internet by a method of continuous connection via ADSL or CATV and a method of dial-up connection via a telephone line. In a case where the user accesses the network 3 by continuous connection, no problem would arise even if the user immediately uploads information about an action, such as scheduling a program for recording, every time the user takes such an action. However, in a case where the user accesses the network by dial-up connection, every time the user, e.g., schedules a program for recording, the user is charged with telephone fees every time the user uploads information to that effect, and thus the user may not wish to upload such information in some cases. Thus, in the case where the user terminal 2 accesses the network 3 by dial-up connection, it may be configured such that the user may make a selection from a mode in which every time the user, e.g., schedules a program for recording, information to that effect is uploaded to the server system 4 immediately, and a mode in which the information is uploaded at a timing at which a certain amount of the information is pooled or at a predetermined cycle.

Further, in the present embodiment, HTML is adopted in describing an EPG page, whereby the program information page creation server 55 or the program information page creation client 301 may easily be implemented as the web server 52 or the web browser 42, respectively.

INDUSTRIAL APPLICABILITY

As described in the foregoing, according to the present invention, an EPG as a user interface, which further facilitates decision on whether to view or record a program, may be provided.

The invention claimed is:

1. A data processing apparatus that performs data processing to generate an EPG (Electronic Program Guide) to be displayed on a display, comprising:
   means for acquiring program guide data that gives guidance on programs;
   means for acquiring statistical data including data indicating scheduling of recordings of a plurality of programs and data indicating viewing of the recordings of the programs, the data indicating scheduling of recordings including data indicating a number of scheduled recordings of each of the programs for each of a plurality of broadcast time zones of the program;
   means for averaging, for each of the programs, the data indicating scheduling of recordings based upon a sum of the number of scheduled recordings of the program divided by a number of broadcast time zones of the program, to obtain an average scheduling count of the program;
   means for generating an EPG including a statistical data layer superimposed upon a program guide data layer as a two-dimensional grid guide format, the statistical data layer including, respective to a programming box for each of the plurality of broadcast time zones of each of the programs, simultaneous display of an indicator of the average scheduling count of the program and an indicator of the data indicating viewing of the recordings of the program; and
   means for displaying, on the display, the EPG including the statistical data layer superimposed upon the program guide data layer as a two-dimensional grid guide format.

2. The data processing apparatus according to claim 1, wherein
   the statistical data is obtained on the basis of information transmitted from user terminals, and
   said means for generating an EPG includes means for determining an audience rating of the programs based on a number of said user terminals which transmitted the information a predetermined number of times or more within a predetermined period, as a population parameter.

3. The data processing apparatus according to claim 1, further comprising:
   means for transmitting the EPG generated by said means for generating an EPG to a user of a user terminal.

4. The data processing apparatus according to claim 1, further comprising:
   means for acquiring history data for individual users, the history data including a history of actions related to program viewing taken by each of the individual users, wherein
   said means for generating an EPG includes means for generating an EPG in which the program guide data, the statistical data, and the history data are superimposed.

5. The data processing apparatus according to claim 1, further comprising:
   means for acquiring operation data indicating when a user terminal of a user is caused to perform a predetermined process, wherein
   said means for generating an EPG includes means for generating an EPG in which the program guide data, the statistical data, and the operation data are superimposed.

6. The data processing apparatus according to claim 1, wherein
   said means for generating an EPG includes means for generating an EPG in which the program guide data is displayed in a different manner for each different broadcast status of a program.

7. The data processing apparatus according to claim 6, wherein
   said means for generating an EPG includes means for generating an EPG in which the program guide data is displayed in different manners for a program which ended, a program which is being broadcast, and a program which will be broadcast.

8. The data processing apparatus according to claim 1, wherein
   the EPG generated by said means for generating an EPG is generated to be interpreted by a web browser.

9. The data processing apparatus according to claim 1, wherein
   the EPG generated by said means for generating an EPG is generated to be interpreted by a dedicated browser.

10. The data processing apparatus according to claim 1, further comprising:

means for aggregating information transmitted from user terminals and obtaining said statistical data, wherein
said means for acquiring statistical data includes means for acquiring the statistical data obtained by said means for aggregating information.

11. The data processing apparatus according to claim 10, wherein
the information transmitted from said user terminals is first information indicating that a program is being viewed during a broadcast time thereof, second information indicating that a program recorded during a broadcast time thereof is being viewed by playback, or third information indicating that a program is being scheduled for recording or that a scheduled recording of the program is being cancelled.

12. The data processing apparatus according to claim 11, wherein
the first information includes information which specifies the program as being viewed by a user at a viewing date/time of the program,
the second information includes information which specifies a recorded program as being viewed by the user and a viewing date/time, using a broadcast date/time of the recorded program viewed by the user as a reference, and
the third information includes information which specifies that the program is being scheduled for recording and a recording schedule of the program or that the scheduled recording of the program is being cancelled and a cancellation schedule.

13. The data processing apparatus according to claim 12, wherein further comprising:
means for generating a good impression level of a program based on the first and second information.

14. The data processing apparatus according to claim 12, wherein
the second information further includes an actual viewing date/time at which the user viewed the recorded program.

15. The data processing apparatus according to claim 10, wherein
the information transmitted from said user terminal includes date/time information about broadcast dates/times of the programs, and
said means for aggregating includes means for aggregating the information transmitted from said user terminals for predetermined time intervals on the basis of the date/time information.

16. The data processing apparatus according to claim 10, wherein
said means for aggregating includes means for sorting and storing the information transmitted from said user terminals.

17. The data processing apparatus according to claim 10, wherein
said means for aggregating includes means for determining whether or not the information transmitted from said user terminals is valid, and accepts only valid information for aggregation.

18. The data processing apparatus according to claim 10, wherein
said means for aggregating includes means for attributing the information transmitted from said user terminals to individual users, for each of a plurality of users.

19. The data processing apparatus according to claim 10, wherein
the information transmitted from said user terminals includes a good impression level representing how users feel about the programs, and
said means for aggregating further includes a means for aggregating the good impression level for the programs.

20. The data processing apparatus according to claim 1, wherein
the EPG displays program guide data for one day on one page.

21. The data processing apparatus according to claim 1, wherein
the statistical data further includes data indicating live viewing of the programs, the data indicating live viewing including, for each of the programs, a number of persons who viewed the program for each of the plurality of broadcast time zones of the program.

22. The data processing apparatus according to claim 21 further comprising:
means for averaging, for each of the programs, the data indicating live viewing of the programs based upon a sum of the number of persons who viewed the program divided by the number of broadcast time zones of the program, to obtain an average live viewing count for the program, wherein
said means for generating an EPG includes means for generating an EPG in which the statistical data layer includes, respective to the programming box for each of the plurality of broadcast time zones of each of the programs, an indicator of the live viewing count of the program.

23. The data processing apparatus according to claim 1, wherein
the data indicating viewing of recordings of the programs includes, for each of the programs recorded, a number of persons who viewed the recording of the program for each of the plurality of broadcast time zones the program was recorded.

24. The data processing apparatus according to claim 23, further comprising:
means for averaging, for each of the programs recorded, the data indicating viewing of recordings of the programs based upon a sum of the number of persons who viewed the recording of the program divided by the number of broadcast time zones the program was recorded, to obtain an average playback count for the program, wherein
said means for generating an EPG includes means for generating an EPG in which the statistical data layer includes, respective to the programming box for each of the plurality of broadcast time zones of each of the programs, an indicator of the average playback count of the program.

25. The data processing apparatus according to claim 1, wherein
the statistical data further includes data indicating live viewing of the programs, the data indicating live viewing including, for each of the programs, a number of persons who viewed the program for each of the plurality of broadcast time zones of the program, and
the data indicating viewing of recordings of the programs includes, for each of the programs recorded, a number of persons who viewed the recording of the program for each of the plurality of broadcast time zones the program recorded.

26. The data processing apparatus according to claim 25, further comprising:

means for averaging, for each of the programs, the data indicating live viewing of the programs based upon a sum of the number of persons who viewed the program divided by the number of broadcast time zones of the program, to obtain an average live viewing count of the program; and means for averaging, for each of the programs recorded, the data indicating viewing of recordings of the programs based upon a sum of the number of persons who viewed the recording of the program divided by the number of broadcast time zones the program recorded, to obtain an average playback count for the program, wherein said means for generating an EPG includes means for generating an EPG in which the statistical data layer further includes, respective to the programming box for each of the plurality of broadcast time zones of each of the programs, an indicator of the average live viewing count of the program and an indicator of the average playback count of the program.

27. A data processing method of performing data processing to generate an EPG (Electronic Program Guide) to be displayed on a display, comprising:

acquiring program guide data that gives guidance on programs;

acquiring, by an information processing unit of a data processing apparatus, statistical data including data indicating scheduling of recordings of a plurality of programs and data indicating viewing of the recordings of the programs, the data indicating scheduling of recordings including data indicating a number of scheduled recordings of each of the programs for each of a plurality of broadcast time zones of the program;

averaging, for each of the programs, the data indicating scheduling of recordings based upon a sum of the number of scheduled recordings of the program divided by a number of broadcast time zones of the program, to obtain an average scheduling count of the program;

generating an EPG including a statistical data layer superimposed upon a program guide data layer as a two-dimensional grid guide format, the statistical data layer including, respective to a programming box for each of the plurality of broadcast time zones of each of the programs, simultaneous display of an indicator of the average scheduling count of the program and an indicator of the data indicating viewing of the recordings of the program; and displaying, on the display, the EPG including the statistical data layer superimposed upon the program guide data layer as a two-dimensional grid guide format.

28. A non-transitory computer readable storage medium encoded with computer program instructions that, when executed by a processor of a computer, cause the computer to perform data processing to generate an EPG (Electronic Program Guide) that is displayed on display means displaying information, comprising:

acquiring program guide data that gives guidance on programs;

acquiring statistical data including data indicating scheduling of recordings of a plurality of programs and data indicating viewing of the recordings of the programs, the data indicating scheduling of recordings including data indicating a number of scheduled recordings of each of the programs for each of a plurality of broadcast time zones of the program;

averaging, for each of the programs, the data indicating scheduling of recordings based upon a sum of the number of scheduled recordings of the program divided by a number of broadcast time zones of the program, to obtain an average scheduling count of the program;

generating an EPG including a statistical data layer superimposed upon a program guide data layer as a two-dimensional grid guide format, the statistical data layer including, respective to a programming box for each of the plurality of broadcast time zones of each of the programs, simultaneous display of an indicator of the average scheduling count of the program and an indicator of the data indicating viewing of the recordings of the program; and displaying, on the display, the EPG including the statistical data layer superimposed upon the program guide data layer as a two-dimensional grid guide format.

29. A data processing system including:

a server for transmitting information; and a user terminal for receiving information from said server, wherein either said server or said user terminal includes means for acquiring program guide data that gives guidance on programs;

means for acquiring statistical data including data indicating scheduling of recordings of a plurality of programs and data indicating viewing of the recordings of the programs, the data indicating scheduling of recordings including data indicating a number of scheduled recordings of each of the programs for each of a plurality of broadcast time zones of the program;

means for averaging, for each of the programs, the data indicating scheduling of recordings based upon a sum of the number of scheduled recordings of the program divided by a number of broadcast time zones of the program, to obtain an average scheduling count of the program;

means for generating an EPG including a statistical data layer superimposed upon a program guide data layer as a two-dimensional grid guide format, the statistical data layer including, respective to a programming box for each of the plurality of broadcast time zones of each of the programs, simultaneous display of an indicator of the average scheduling count of the program and an indicator of the data indicating viewing of the recordings of the program; and means for displaying, on the display, the EPG including the statistical data layer superimposed upon the program guide data layer as a two-dimensional grid guide format.

30. A data processing apparatus that performs data processing to generate an EPG (Electronic Program Guide) to be displayed on a display, comprising:

an information aggregation unit that aggregates program guide data that gives guidance on programs, and acquires statistical data including data indicating scheduling of recordings of a plurality of programs and data indicating viewing of the recordings of the programs, the data indicating scheduling of recordings including data indicating a number of scheduled recordings of each of the programs for each of a plurality of broadcast time zones of the program;

a guide page creation unit that averages, for each of the programs, the data indicating scheduling of recordings based upon a sum of the number of scheduled recordings of the program divided by a number of broadcast time zones of the program, to obtain an average scheduling count of the program, and generates an EPG including a statistical data layer superimposed upon a program guide data layer as a two-dimensional grid guide format, the statistical data layer including, respective to a programming box for each of the plurality of broadcast time zones of each of the programs, simultaneous display of an indicator of the average scheduling count of the program and an indicator of the data indicating viewing of the recordings of the program; and a display unit that displays, on the display, the EPG including the statistical data layer superimposed upon the program guide data layer as a two-dimensional grid guide format.

* * * * *